(12) United States Patent
Kitajima

(10) Patent No.: US 9,677,251 B2
(45) Date of Patent: Jun. 13, 2017

(54) CONSTRUCTION MACHINE CONTROL SYSTEM, CONSTRUCTION MACHINE, AND METHOD OF CONTROLLING CONSTRUCTION MACHINE

(71) Applicant: Komatsu Ltd., Tokyo (JP)

(72) Inventor: Jin Kitajima, Ohiso-machi (JP)

(73) Assignee: Komatsu Ltd., Tokyo (JP)

( * ) Notice: Subject to any disclaimer, the term of this patent is extended or adjusted under 35 U.S.C. 154(b) by 181 days.

(21) Appl. No.: 14/396,213

(22) PCT Filed: Jun. 2, 2014

(86) PCT No.: PCT/JP2014/064646
§ 371 (c)(1),
(2) Date: Oct. 22, 2014

(87) PCT Pub. No.: WO2015/186179
PCT Pub. Date: Dec. 10, 2015

(65) Prior Publication Data
US 2016/0289928 A1    Oct. 6, 2016

(51) Int. Cl.
*E02F 9/20*    (2006.01)
*E02F 9/26*    (2006.01)
(Continued)

(52) U.S. Cl.
CPC ............... *E02F 9/265* (2013.01); *E02F 3/32* (2013.01); *E02F 3/3677* (2013.01); *E02F 3/435* (2013.01);
(Continued)

(58) Field of Classification Search
CPC ....... E02F 9/20; E02F 9/26; E02F 3/84; E02F 3/85
(Continued)

(56) References Cited

U.S. PATENT DOCUMENTS 6,098,322 A * 8/2000 Tozawa ................... E02F 3/437
                                                                    37/414
8,103,417 B2   1/2012 Gharsalli et al.
(Continued)

FOREIGN PATENT DOCUMENTS

CN    101377684 A    3/2009
CN    202787345 U    3/2013
(Continued)

OTHER PUBLICATIONS

International Search Report and Written Opinion dated Oct. 7, 2014, issued for PCT/JP2014/064646.

*Primary Examiner* — Tan Q Nguyen
(74) *Attorney, Agent, or Firm* — Locke Lord LLP; Howard M. Gitten

(57) ABSTRACT

A control system controls a construction machine that includes a work machine including a bucket having a plurality of tilting mechanisms. The control system includes: a tilt angle sensor that is provided in the bucket so as to detect tilt angle data including a rotation angle of the bucket about the tilt shaft, the tilt angle sensor being capable of detecting an inclination angle with respect to a horizontal plane; a data acquisition unit to which the tilt angle data is output from the tilt angle sensor; a data fixing unit that fixes the tilt angle data output to the data acquisition unit based on a fixing command to generate fixed data; and a work machine control unit that controls the work machine based on the fixed data until the fixing command is disabled.

9 Claims, 28 Drawing Sheets

(51) Int. Cl.
  *E02F 3/32* (2006.01)
  *E02F 3/36* (2006.01)
  *E02F 3/43* (2006.01)
  *E02F 9/02* (2006.01)
  *E02F 3/84* (2006.01)

(52) U.S. Cl.
  CPC .............. *E02F 9/02* (2013.01); *E02F 9/2033* (2013.01); *E02F 9/262* (2013.01); *E02F 9/264* (2013.01)

(58) Field of Classification Search
  USPC .......................................................... 701/50
  See application file for complete search history.

(56) References Cited

U.S. PATENT DOCUMENTS

| | | | |
|---|---|---|---|
| 8,965,642 B2 | 2/2015 | Johnson et al. | |
| 2006/0291987 A1* | 12/2006 | Osanai | B66F 9/065 414/685 |
| 2009/0056961 A1 | 3/2009 | Gharsalli et al. | |
| 2009/0158625 A1 | 6/2009 | Pope et al. | |
| 2012/0003070 A1* | 1/2012 | Tochizawa | E02F 9/202 414/685 |
| 2012/0130601 A1 | 5/2012 | Banerjee et al. | |
| 2013/0103247 A1 | 4/2013 | Ogawa et al. | |
| 2013/0302124 A1 | 11/2013 | Matsuyama | |
| 2013/0315699 A1 | 11/2013 | Matsuyama | |
| 2013/0345939 A1* | 12/2013 | Magaki | E02F 9/2214 701/50 |
| 2014/0100744 A1 | 4/2014 | Johnson et al. | |
| 2015/0039189 A1* | 2/2015 | Wu | E02F 3/436 701/50 |

FOREIGN PATENT DOCUMENTS

| | | |
|---|---|---|
| JP | 2014-074319 A | 4/2014 |
| KR | 10-1999-0082460 A | 11/1999 |
| WO | 9826132 A1 | 6/1998 |
| WO | WO-2012/127913 A1 | 9/2012 |
| WO | WO-2012/127914 A1 | 9/2012 |
| WO | WO-2014/054354 A1 | 4/2014 |

* cited by examiner

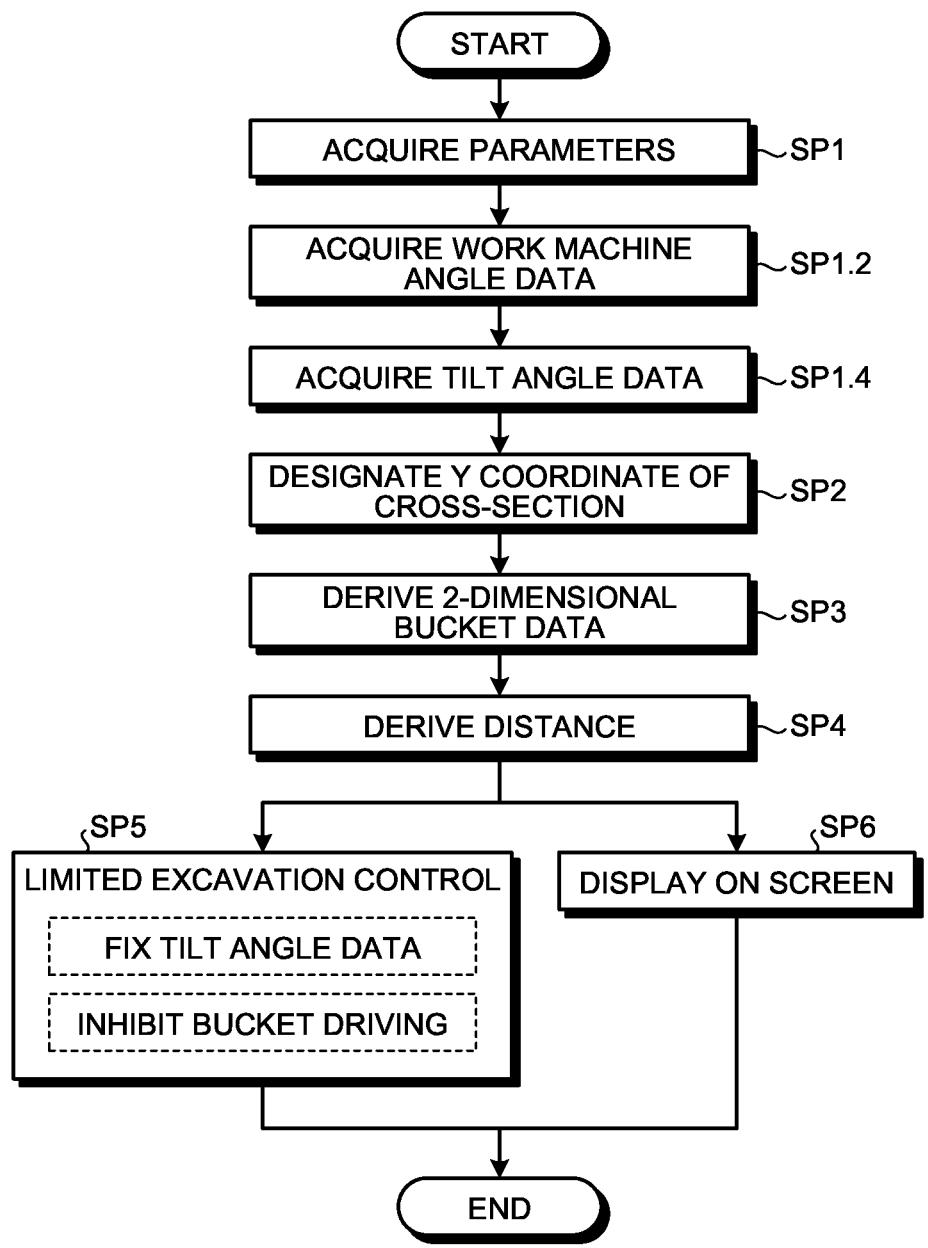

CONSTRUCTION MACHINE CONTROL SYSTEM, CONSTRUCTION MACHINE, AND METHOD OF CONTROLLING CONSTRUCTION MACHINE

FIELD

The present invention relates to a construction machine control system, a construction machine, and a method of controlling a construction machine.

BACKGROUND

A construction machine like an excavator includes a work machine that includes a boom, an arm, and a bucket. As a method of controlling a construction machine, Patent Literatures 1 and 2 disclose limited excavation control in which a bucket is moved based on a target excavation landform which is a target shape of an excavation object.

CITATION LIST

Patent Literature

Patent Literature 1: WO 2012/127914 A
Patent Literature 2: WO 2012/127913 A

SUMMARY

Technical Problem

In a construction machine, a tilt bucket that can be tilted is known. The tilt bucket is tilted by a tilt actuator that tilts a bucket in relation to an arm. In the tilt bucket, tilt angle data of the bucket may be acquired using a tilt angle sensor. The bucket is inclined in relation to a horizontal surface according to a raising operation or a lowering operation of at least one of a boom and an arm as well as the driving of the tilt actuator. Thus, it may be difficult for the tilt angle sensor to acquire tilt angle data based on the driving of the tilt actuator due to the raising operation or the lowering operation of at least one of the boom and the arm. As a result, there is a possibility that excavation accuracy decreases and intended construction cannot be executed.

An object of some aspects of the present invention is to provide a construction machine control system, a construction machine, and a method of controlling the construction machine capable of suppressing a decrease in excavation accuracy even when a tilt bucket is used.

Solution to Problem

A first aspect of the present invention provides a construction machine control system for a construction machine that includes a work machine comprising: a boom capable of rotating in relation to a vehicle body about a boom shaft; an arm capable of rotating in relation to the boom about an arm shaft parallel to the boom shaft; and a bucket capable of rotating in relation to the arm about each of a bucket shaft parallel to the arm shaft and a tilt shaft orthogonal to the bucket shaft, the system comprising: a tilt angle sensor that is provided in the bucket so as to detect tilt angle data including a rotation angle of the bucket about at least the tilt shaft, the tilt angle sensor being capable of detecting an inclination angle with respect to a horizontal plane; a data acquisition unit to which the tilt angle data is output from the tilt angle sensor; a data fixing unit that fixes the tilt angle data output to the data acquisition unit based on a fixing command to generate fixed data; and a work machine control unit that controls the work machine based on the fixed data until the fixing command is disabled.

In the first aspect of the present invention, it is preferable that the construction machine control system, further comprises: a first acquisition unit that acquires dimension data including dimensions of the boom, the arm, and the bucket; a second acquisition unit that acquires target excavation landform data indicating a target excavation landform which is a target shape of an excavation object; a third acquisition unit that acquires work machine angle data including boom angle data indicating a rotation angle of the boom about the boom shaft, arm angle data indicating a rotation angle of the arm about the arm shaft, and bucket angle data indicating a rotation angle of the bucket about the bucket shaft; and a calculation unit that calculates bucket position data indicating a present position of the bucket based on the work machine angle data, the dimension data, and the fixed data, wherein the work machine control unit determines a speed limit according to a distance between the bucket and the target excavation landform based on the target excavation landform data and the bucket position data and executes limited excavation control so that a speed in a direction in which the work machine approaches the target excavation landform is equal to or smaller than the speed limit, and the fixing command is output to the data fixing unit so that the work machine is controlled based on the fixed data in at least a portion of a period in which the limited excavation control is executed.

In the first aspect of the present invention, it is preferable that the fixing command is output to the data fixing unit when the limited excavation control starts and is disabled when the limited excavation control ends.

In the first aspect of the present invention, it is preferable that the construction machine control system, further comprises: a driving inhibiting unit that inhibits driving of the bucket in the limited excavation control.

In the first aspect of the present invention, it is preferable that the construction machine control system, further comprises: an operating device that outputs an operation signal for operating a hydraulic cylinder capable of driving the bucket, wherein the driving inhibiting unit disables the operation signal output from the operating device.

In the first aspect of the present invention, it is preferable that the construction machine control system, further comprises: a fourth acquisition unit that acquires shape data of the bucket, wherein the target excavation landform data is 2-dimensional target shape of the excavation object in a working plane orthogonal to the bucket shaft, the calculation unit calculates 2-dimensional bucket data which indicates an outer shape of the bucket in the working plane and includes the bucket position data based on the work machine angle data, the dimension data, the shape data, and the fixed data, and the work machine control unit controls the work machine based on the 2-dimensional bucket data.

In the first aspect of the present invention, it is preferable that the calculation unit calculates a relative position between the bucket and the target excavation landform based on the 2-dimensional bucket data, vehicle body position data indicating a present position of the vehicle body, and vehicle body attitude data indicating an attitude of the vehicle body.

A second aspect of the present invention provides a construction machine comprising: a lower traveling structure; an upper revolving structure that is supported by the lower traveling structure; a work machine that includes a boom, an arm and a bucket and is supported by the upper revolving structure; and the control system according to the first aspect of the present invention.

A third aspect of the present invention provides a method of controlling a construction machine that includes a work machine comprising: a boom capable of rotating in relation to a vehicle body about a boom shaft; an arm capable of rotating in relation to the boom about an arm shaft parallel to the boom shaft; and a bucket capable of rotating in relation to the arm about a bucket shaft parallel to the arm shaft and a tilt shaft orthogonal to the bucket shaft, the method comprising: detecting tilt angle data indicating a rotation angle of the bucket about the tilt shaft using a tilt angle sensor that is provided in the bucket and that can detect an inclination angle with respect to a horizontal plane; acquiring the tilt angle data output from the tilt angle sensor; fixing the tilt angle data based on a fixing command to generate fixed data; and controlling the work machine based on the fixed data until the fixing command is disabled.

Advantageous Effects of Invention

According to the aspects of the present invention, a decrease in excavation accuracy is suppressed.

BRIEF DESCRIPTION OF DRAWINGS

FIG. 16 is a flowchart illustrating an example of a method of controlling a construction machine.

DESCRIPTION OF EMBODIMENTS

Hereinafter, embodiments according to the present invention are described with reference to the drawings, and the present invention is not limited thereto. Constituent components of the respective embodiments described hereinafter may be appropriately combined with each other. Moreover, some constituent components may be not used.

In the following description, a global coordinate system and a local coordinate system are set and the positional relation of respective portions will be described with reference to these coordinate systems. The global coordinate system is a coordinate system based on an origin Pr (see FIG. 4) fixed to the earth. The local coordinate system is a coordinate system based on an origin P0 (see FIG. 4) fixed to a vehicle body 1 of a construction machine CM. The local coordinate system may be referred to as a vehicle body coordinate system.

In the following description, the global coordinate system is represented by an XgYgZg orthogonal coordinate system. As will be described later, the reference position (origin) Pg of the global coordinate system is positioned in a work area. A direction within a horizontal plane is defined as an Xg-axis direction, a direction orthogonal to the Xg-axis direction within the horizontal plane is defined as a Yg-axis direction, and a direction orthogonal to the Xg-axis direction and the Yg-axis direction is defined as a Zg-axis direction. Moreover, rotational (inclination) directions about the Xg, Yg, and Zg-axes are defined as θXg, θYg, and θZg-directions, respectively. The Xg-axis is orthogonal to a YgZg plane. The Yg-axis is orthogonal to an XgZg plane. The Zg-axis is orthogonal to an XgYg plane. The XgYg plane is parallel to the horizontal plane. The Zg-axis direction is a vertical direction.

In the following description, the local coordinate system is represented by an XYZ orthogonal coordinate system. As will be described later, the reference position (origin) P0 of the local coordinate system is positioned at the revolution center AX of a revolving structure 3. A direction within a certain plane is defined as an X-axis direction, a direction orthogonal to the X-axis direction within the plane is defined as a Y-axis direction, and a direction orthogonal to the X-axis direction and the Y-axis direction is defined as a Z-axis direction. Moreover, rotational (inclination) directions about the X, Y, and Z-axes are defined as θX, θY, and θZ-directions, respectively. The X-axis is orthogonal to the YZ plane. The Y-axis is orthogonal to the XZ plane. The Z-axis is orthogonal to the XY plane.

[Overall Structure of Excavator]

Figure 1:
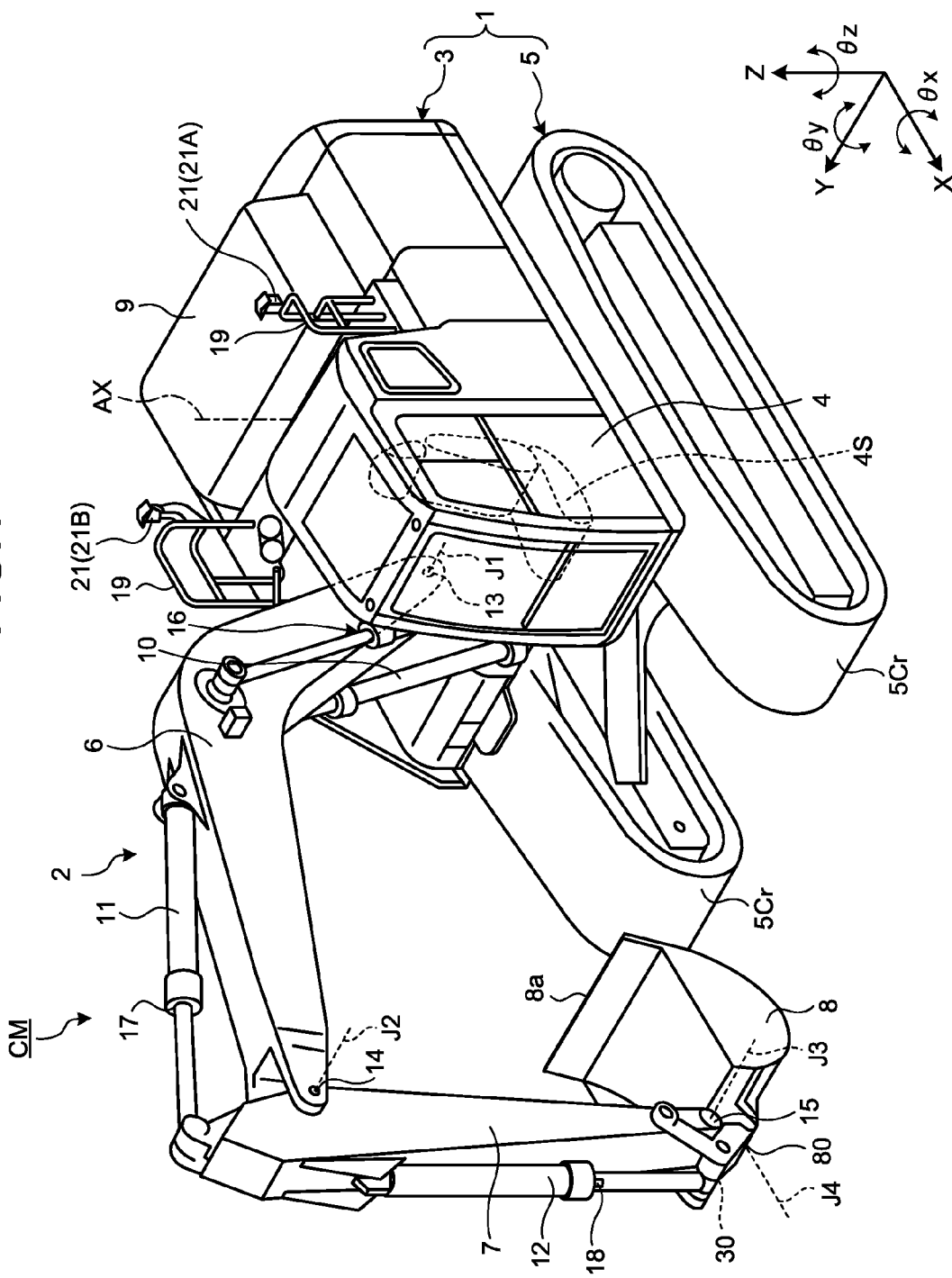
FIG. 1 is a perspective view illustrating an example of a construction machine.

FIG. 1 is a perspective view illustrating an example of a construction machine CM according to the present embodiment. In the present embodiment, an example in which the construction machine CM is an excavator CM that includes a work machine 2 operating with hydraulic pressure.

As illustrated in FIG. 1, the excavator CM includes the vehicle body 1 and the work machine 2. As will be described later, a control system 200 that executes excavation control is mounted on the excavator CM.

The vehicle body 1 includes the revolving structure 3, a cab 4, and a traveling device 5. The revolving structure 3 is disposed on the traveling device 5. The traveling device 5 supports the revolving structure 3. The revolving structure 3 may be referred to as an upper revolving structure 3. The traveling device 5 may be referred to as a lower traveling structure 5. The revolving structure 3 can revolve about a revolution axis AX. A driver's seat 4S on which an operator sits is provided in the cab 4. The operator operates the excavator CM in the cab 4. The traveling device 5 includes a pair of crawler belts 5Cr. With rotation of the crawler belts 5Cr, the excavator CM travels. The traveling device 5 may include wheels (tires).

In the present embodiment, a positional relation of respective portions is described based on the driver's seat 4S. A front-rear direction is defined based on the driver's seat 4S. A left-right direction is defined based on the driver's seat 4S. The left-right direction is identical to a vehicle width direction. A direction in which the driver's seat 4S faces the front is defined as a front direction and a direction opposite to the front direction is defined as a rear direction. The right and left sides in a lateral direction when the driver's seat 4S faces the front are defined as right and left directions, respectively. In the present embodiment, the front-rear direction is the X-axis direction and the left-right direction is the Y-axis direction. The direction in which the driver's seat 4S faces the front is the front direction (+X direction) and the direction opposite to the front direction is the rear direction (−X direction). One direction of the vehicle width direction when the driver's seat 4S faces the front is the right direction (+Y direction) and the other direction of the vehicle width direction is the left direction (−Y direction).

The revolving structure 3 includes an engine room 9 in which an engine is stored and a counterweight provided at the rear portion of the revolving structure 3. A handrail 19 is provided in a portion of the revolving structure 3 on the front side of the engine room 9. An engine, a hydraulic pump, and the like are disposed in the engine room 9.

The work machine 2 is connected to the revolving structure 3. The work machine 2 includes a boom 6 connected to the revolving structure 3 with a boom pin 13 interposed, an arm 7 connected to the boom 6 with an arm pin 14 interposed, a bucket 8 connected to the arm 7 with a bucket pin 15 and a tilt pin 80 interposed, a boom cylinder 10 driving the boom 6, an arm cylinder 11 driving the arm 7, a bucket cylinder 12 driving the bucket 8, and a tilt cylinder 30. A base end (boom foot) of the boom 6 is connected to the revolving structure 3. A distal end (boom top) of the boom 6 is connected to a base end (arm foot) of the arm 7. A distal end (arm top) of the arm 7 is connected to a base end of the bucket 8. The boom cylinder 10, the arm cylinder 11, the bucket cylinder 12, and the tilt cylinder 30 are hydraulic cylinders driven by operating oil.

The work machine 2 includes a first stroke sensor 16 disposed in the boom cylinder 10 so as to detect a stroke length (boom cylinder length) of the boom cylinder 10, a second stroke sensor 17 disposed in the arm cylinder 11 so as to detect a stroke length (arm cylinder length) of the arm cylinder 11, and a third stroke sensor 18 disposed in the bucket cylinder 12 so as to detect a stroke length (bucket cylinder length) of the bucket cylinder 12.

The boom 6 can rotate about a boom shaft J1 which is a rotating shaft in relation to the revolving structure 3. The arm 7 can rotate about an arm shaft J2 which is a rotating shaft parallel to the boom shaft J1 in relation to the boom 6. The bucket 8 can rotate about a bucket shaft J3 which is a rotating shaft parallel to the boom shaft J1 and the arm shaft J2 in relation to the arm 7. The bucket 8 can rotate about a tilt shaft J4 which is a rotating shaft orthogonal to the bucket shaft J3 in relation to the arm 7. The boom pin 13 includes the boom shaft J1. The arm pin 14 includes the arm shaft J2. The bucket pin 15 includes a bucket shaft J3. The tilt pin 80 includes the tilt shaft J4.

In the present embodiment, the boom shaft J1, the arm shaft J2, and the bucket shaft J3 are parallel to the Y-axis. The boom 6, the arm 7, and the bucket 8 can rotate in the θY-direction. In the present embodiment, the XZ plane includes a so-called vertical rotation plane of the boom 6 and the arm 7.

In the following description, the stroke length of the boom cylinder 10 will be appropriately referred to as a boom cylinder length or a boom stroke, the stroke length of the arm cylinder 11 will be appropriately referred to as an arm cylinder length or an arm stroke, the stroke length of the bucket cylinder 12 will be appropriately referred to as a bucket cylinder length or a bucket stroke, and the stroke length of the tilt cylinder 30 will be appropriately referred to as a tilt cylinder length. Moreover, in the following description, the boom cylinder length, the arm cylinder length, the bucket cylinder length, and the tilt cylinder length will be appropriately collectively referred to as cylinder length data L.

[Bucket]

Figure 2:
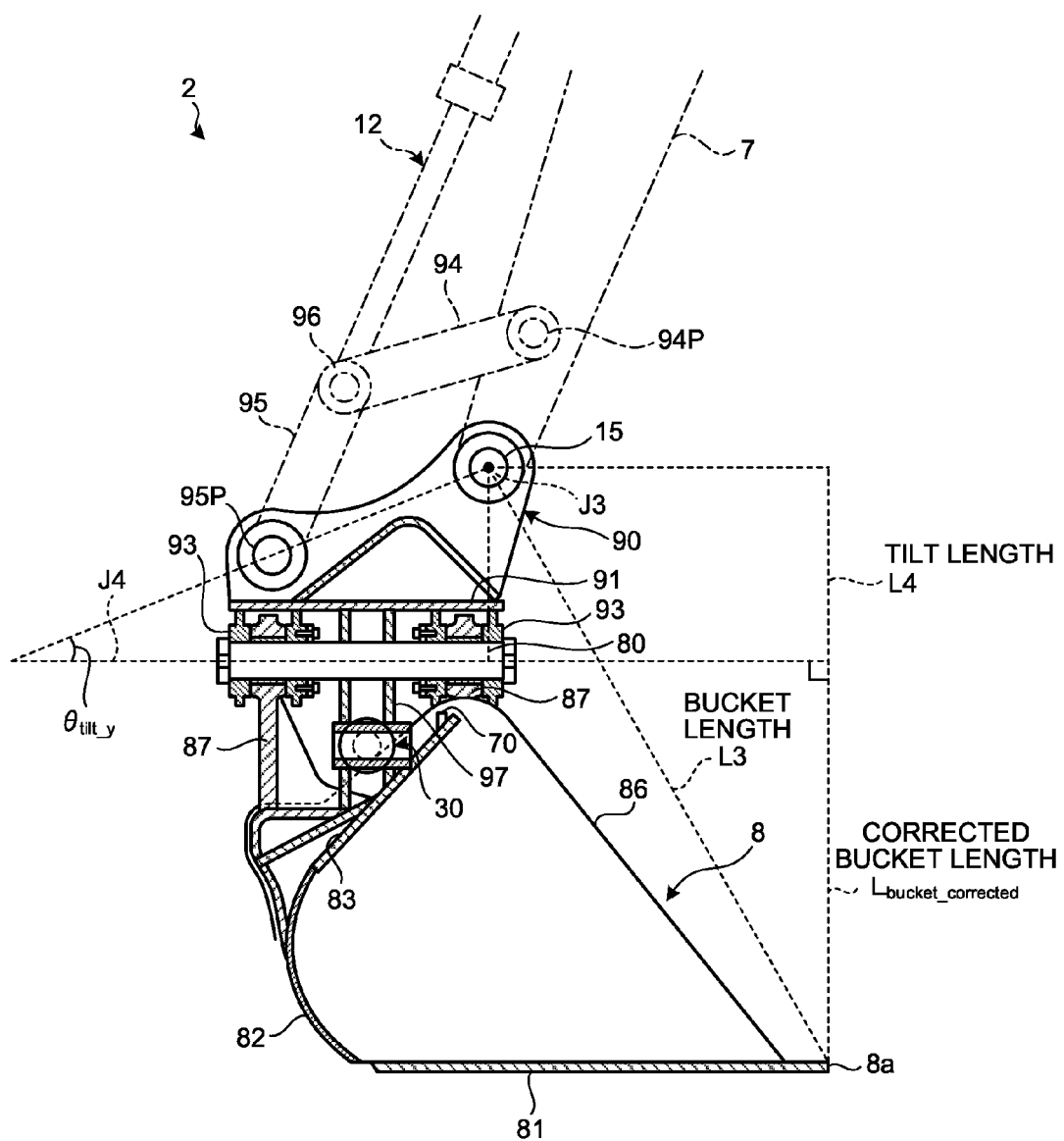
FIG. 2 is a side sectional view illustrating an example of a bucket.
Figure 3:
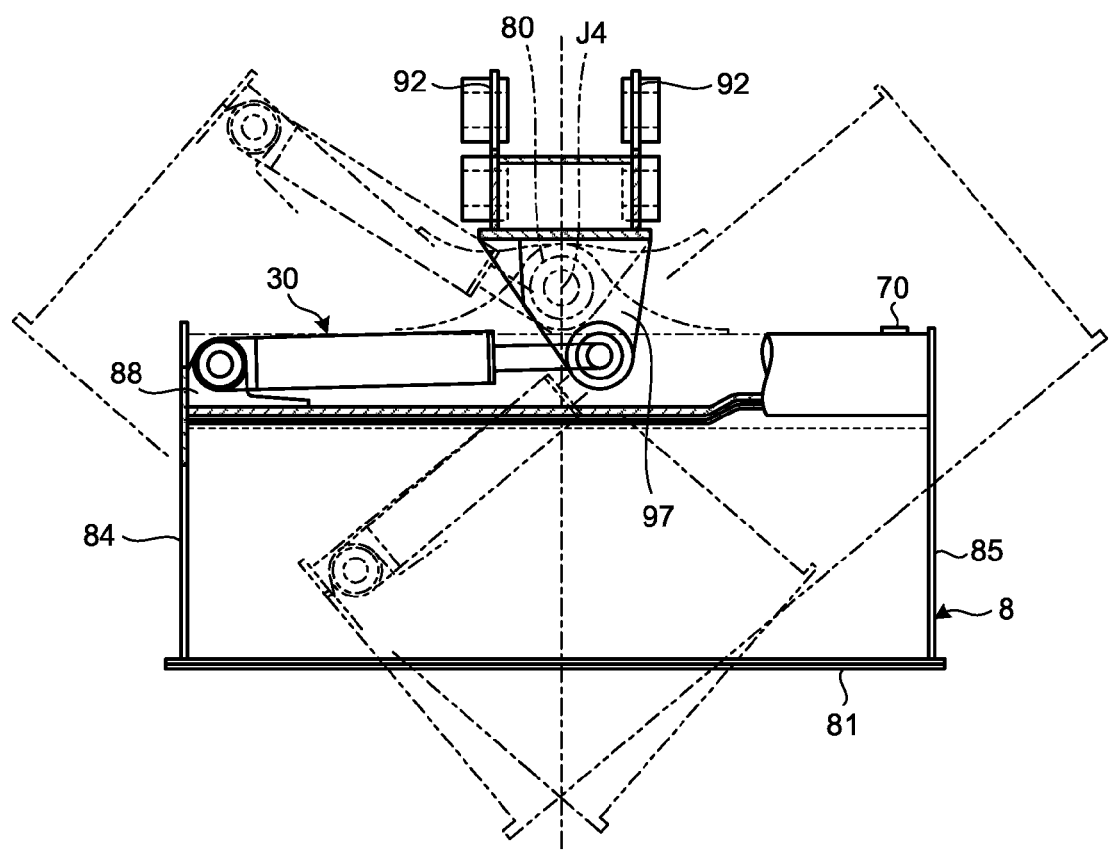
FIG. 3 is a front view illustrating an example of a bucket.

Next, the bucket 8 according to the present embodiment will be described. FIG. 2 is a side sectional view illustrating an example of the bucket 8 according to the present embodiment. FIG. 3 is a front view illustrating an example of the bucket 8 according to the present embodiment. In the present embodiment, the bucket 8 is a tilt bucket.

As illustrated in FIGS. 2 and 3, the work machine 2 has the bucket 8 that can rotate in relation to the arm 7 about the bucket shaft J3 and the tilt shaft J4 orthogonal to the bucket shaft J3. The bucket 8 is rotatably supported by the arm 7 about the bucket pin 15 (bucket shaft J3). The bucket 8 is rotatably supported by the arm 7 about the tilt pin 80 (the tilt shaft J4). The bucket shaft J3 and the tilt shaft J4 are orthogonal to each other. The bucket 8 is rotatably supported by the arm 7 about the bucket shaft J3 and the tilt shaft J4 orthogonal to the bucket shaft J3.

The bucket 8 is connected to the distal end of the arm 7 with a connection member (an underframe) 90 interposed. The bucket pin 15 connects the arm 7 and the connection member 90. The tilt pin 80 connects the connection member 90 and the bucket 8. The bucket 8 is rotatably connected to the arm 7 with the connection member 90 interposed.

The bucket 8 includes a bottom plate 81, a back plate 82, a top plate 83, a side plate 84, and a side plate 85. The bottom plate 81, the top plate 83, the side plate 84, and the side plate 85 form an opening 86 of the bucket 8.

The bucket 8 has a bracket 87 provided in an upper portion of the top plate 83. The bracket 87 is provided at an anteroposterior position of the top plate 83. The bracket 87 is connected to the connection member 90 and the tilt pin 80.

The connection member 90 includes a plate member 91, a bracket 92 provided on an upper surface of the plate member 91, and a bracket 93 provided on a lower surface of the plate member 91. The bracket 92 is connected to the arm 7 and a second link pin 95 (described later). The bracket 93 is provided in an upper portion of the bracket 87 and is connected to the tilt pin 80 and the bracket 87.

The bucket pin 15 connects the bracket 92 of the connection member 90 and the distal end of the arm 7. The tilt pin 80 connects the bracket 93 of the connection member 90 and the bracket 87 of the bucket 8. Due to this, the connection member 90 and the bucket 8 can rotate about the bucket shaft J3 in relation to the arm 7 and the bucket 8 can rotate about the tilt shaft J4 in relation to the connection member 90.

The work machine 2 includes a first link member 94 that is rotatably connected to the arm 7 with a first link pin 94P interposed and a second link member 95 that is rotatably connected to the bracket 92 with a second link pin 95P interposed. A base end of the first link member 94 is connected to the arm 7 with the first link pin 94P interposed. A base end of the second link member 95 is connected to the bracket 92 with the second link pin 95P interposed. The distal end of the first link member 94 and the distal end of the second link member 95 are connected by a bucket cylinder top pin 96.

The distal end of the bucket cylinder 12 is rotatably connected to the distal end of the first link member 94 and the distal end of the second link member 95 with the bucket cylinder top pin 96 interposed. When the bucket cylinder 12 is operated so as to be extended and retracted, the connection member 90 rotates about the bucket shaft J3 together with the bucket 8.

The tilt cylinder 30 is connected to a bracket 97 provided in the connection member 90 and a bracket 88 provided in the bucket 8. The rod of the tilt cylinder 30 is connected to the bracket 97 with a pin interposed. The body portion of the tilt cylinder 30 is connected to the bracket 88 with the pin interposed. When the bucket cylinder 30 is operated so as to be extended and retracted, the bucket 8 rotates about the tilt shaft J4.

In this manner, the bucket 8 rotates about the bucket shaft J3 according to the operation of the bucket cylinder 12. The bucket 8 rotates about the tilt shaft J4 according to the operation of the tilt cylinder 30. In the present embodiment, the tilt pin 80 (the tilt shaft J4) rotates (inclines) together with the bucket 8 according to the rotation of the bucket 8 about the bucket shaft J3.

In the present embodiment, the work machine 2 includes a tilt angle sensor 70 that detects tilt angle data indicating a rotation angle $\delta$ of the bucket 8 about the tilt shaft J4. The tilt angle sensor 70 detects a tilt angle (rotation angle) of the bucket 8 in relation to the horizontal plane of the global coordinate system. The tilt angle sensor 70 is a so-called biaxial angle sensor and detects inclination angles in relation to the two $\theta Xg$ and $\theta Yg$ directions described later. The tilt angle sensor 70 is provided in at least a portion of the bucket 8. The tilt angle in the global coordinate system is converted to a tilt angle $\delta$ in the local coordinate system based on a detection result of an inclination sensor 24.

The bucket 8 is not limited to the present embodiment. The inclination angle (tilt angle) of the bucket 8 may be set optionally. Another axis may be added to the axes of the inclination angles.

[Structure of Excavator]

Figure 4:
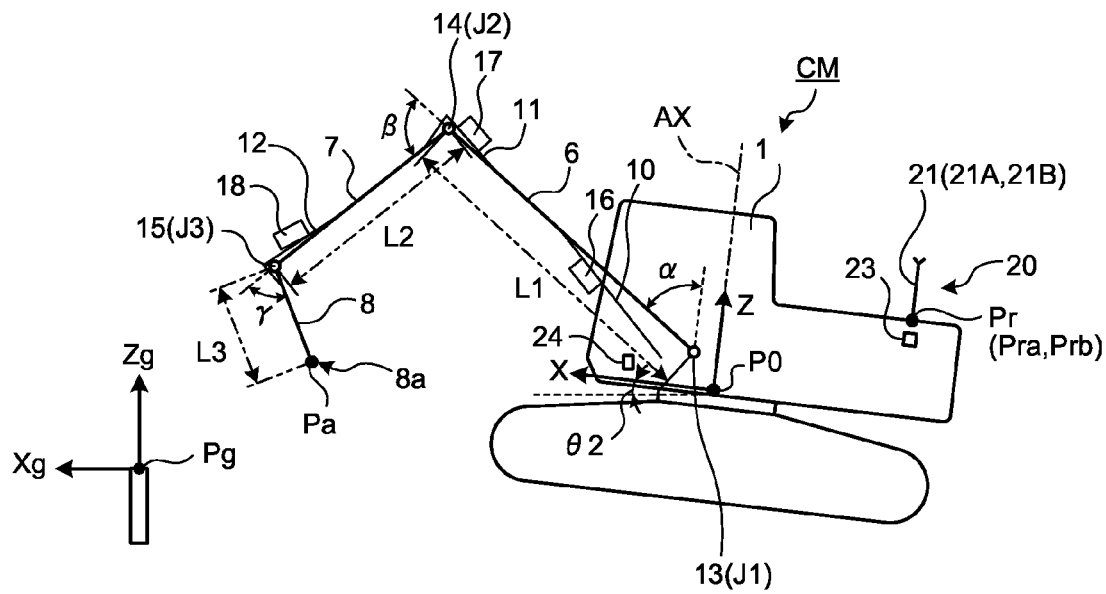
FIG. 4 is a side view schematically illustrating an example of the construction machine.
Figure 5:
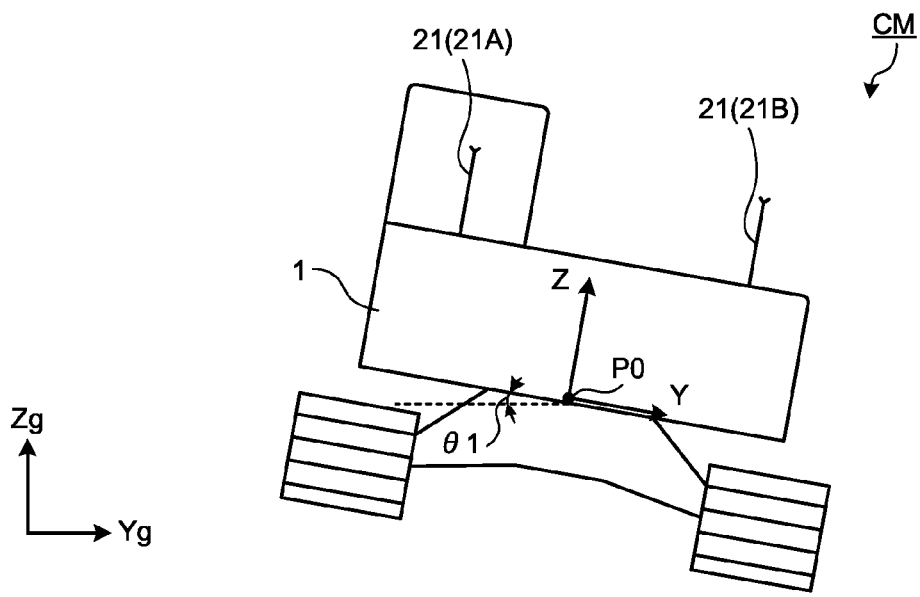
FIG. 5 is a rear view schematically illustrating an example of the construction machine.
Figure 6:
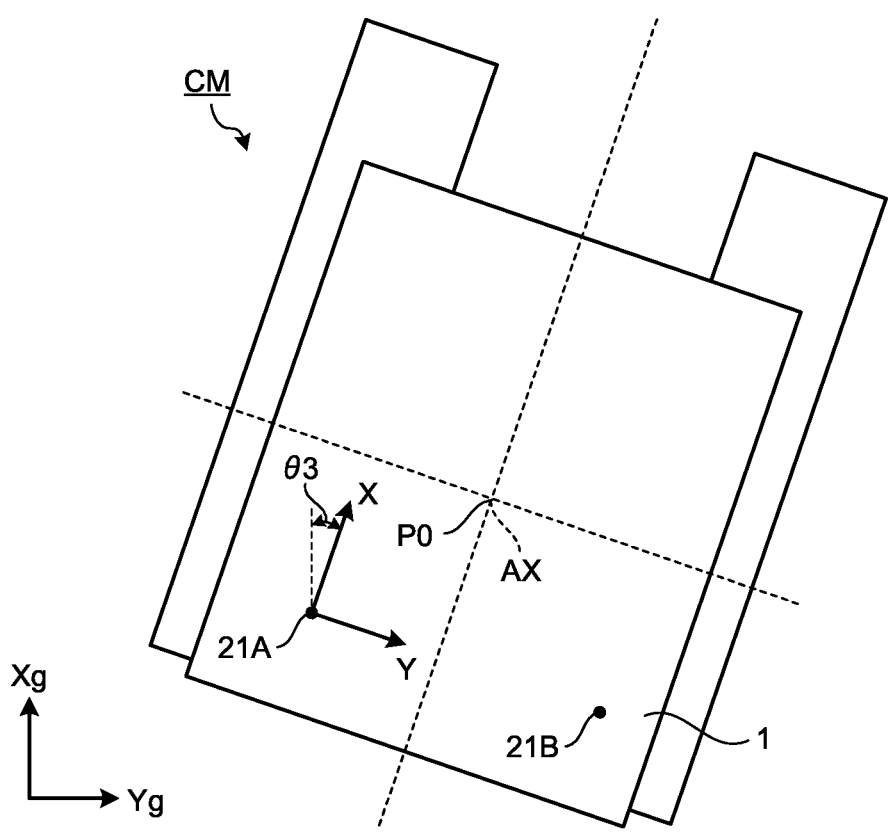
FIG. 6 is a plan view schematically illustrating an example of the construction machine.

FIG. 4 is a side view schematically illustrating the excavator CM according to the present embodiment. FIG. 5 is a rear view schematically illustrating the excavator CM according to the present embodiment. FIG. 6 is a plan view schematically illustrating the excavator CM according to the present embodiment.

In the present embodiment, the distance L1 between the boom shaft J1 and the arm shaft J2 is referred to as a boom length L1. The distance L2 between the arm shaft J2 and the bucket shaft J3 is referred to as an arm length L2. The distance L3 between the bucket shaft J3 and a distal end 8a of the bucket 8 is referred to as a bucket length L3.

The distal end of the bucket 8 includes a distal end of a tooth of the bucket 8. In the present embodiment, the distal end of the tooth of the bucket 8 has a straight shape. The bucket 8 may have a plurality of sharp teeth. In the following description, the distal ends 8a of the bucket 8 will be appropriately referred to as cutting edges 8a.

The excavator CM has an angle detection device 22 that detects the angle of the work machine 2. The angle detection device 22 detects work machine angle data including boom angle data indicating a rotation angle $\alpha$ of the boom 6 about the boom shaft J1, arm angle data indicating a rotation angle $\beta$ of the arm 7 about the arm shaft J2, and bucket angle data indicating a rotation angle $\gamma$ of the bucket 8 about the bucket shaft J3. In the present embodiment, the boom angle (rotation angle) $\alpha$ includes an inclination angle of the boom 6 in relation to the axis parallel to the Z-axis of the local coordinate system. The arm angle (rotation angle) $\beta$ includes an inclination angle of the arm 7 in relation to the boom 6. The bucket angle (rotation angle) $\gamma$ includes an inclination angle of the bucket 8 in relation to the arm 7.

In the present embodiment, the angle detection device 22 includes the first stroke sensor 16 disposed in the boom cylinder 10, the second stroke sensor 17 disposed in the arm cylinder 11, and the third stroke sensor 18 disposed in the bucket cylinder 12. The boom cylinder length is calculated based on a detection result of the first stroke sensor 16. The arm cylinder length is calculated based on a detection result of the second stroke sensor 17. The bucket cylinder length is calculated based on a detection result of the third stroke sensor 18. In the present embodiment, when the boom cylinder length is detected by the first stroke sensor 16, the boom angle $\alpha$ is derived or calculated. When the arm cylinder length is detected by the second stroke sensor 17, the arm angle $\beta$ is derived or calculated. When the bucket cylinder length is detected by the third stroke sensor 18, the bucket angle γ is derived or calculated.

The excavator CM includes a position detection device 20 capable of detecting vehicle body position data P indicating the present position of the vehicle body 1 and vehicle body attitude data Q indicating the attitude of the vehicle body 1. The present position of the vehicle body 1 includes the present position (Xg, Yg, and Zg positions) of the vehicle body 1 in the global coordinate system. The attitude of the vehicle body 1 includes the position of the revolving structure 3 in relation to the θXg, θYg, and θZg directions. The attitude of the vehicle body 1 includes an inclination angle (roll angle) θ1 in the left-right direction of the revolving structure 3 in relation to the horizontal plane (XgYg plane), an inclination angle (pitch angle) θ2 in the front-rear direction of the revolving structure 3 in relation to the horizontal plane, and an angle (yaw angle) θ3 between the reference direction (for example, the north) of the global coordinate and the direction in which the revolving structure 3 (the work machine 2) faces.

The position detection device 20 includes an antenna 21, a position sensor 23, and the inclination sensor 24. The antenna 21 is an antenna for detecting the present position of the vehicle body 1. The antenna 21 is a global navigation satellite systems (GNSS) antenna. The antenna 21 is a real time kinematic-global navigation satellite systems (RTK-GNSS) antenna. The antenna 21 is provided in the revolving structure 3. In the present embodiment, the antenna 21 is provided in the handrail 19 of the revolving structure 3. The antenna 21 may be provided in a rear direction of the engine room 9. For example, the antenna 21 may be provided in the counterweight of the revolving structure 3. The antenna 21 outputs a signal corresponding to a received radio wave (GNSS radio wave) to the position sensor 23.

The position sensor 23 includes a 3-dimensional position sensor and a global coordinate calculating unit and detects an installed position Pr of the antenna 21 in the global coordinate system. The global coordinate system is a 3-dimensional coordinate system based on the reference position Pg provided in a work area. As illustrated in FIG. 4, in the present embodiment, the reference position Pg is the position of the distal end of a reference post set in the work area.

In the present embodiment, the antenna 21 includes a first antenna 21A and a second antenna 21B provided in the revolving structure 3 so as to be separated in the Y-axis direction (the vehicle width direction of the revolving structure 3) of the local coordinate system. The position sensor 23 detects an installed position Pra of the first antenna 21A and an installed position Prb of the second antenna 21B.

The position detection device 20 acquires the vehicle body position data P and the vehicle body attitude data Q in the global coordinate using the position sensor 23. The vehicle body position data P is data indicating the reference position P0 positioned at the revolution axis (revolution center) AX of the revolving structure 3. The reference position data P may be data indicating the installed position Pr. The position detection device 20 acquires the vehicle body position data P including the reference position P0. Moreover, the position detection device 20 acquires the vehicle body attitude data Q based on the two installed positions Pra and Prb. The vehicle body attitude data Q is determined based on an angle between a reference direction (for example, the north) of the global coordinate and a line determined by the installed positions Pra and Prb. The vehicle body attitude data Q indicates a direction in which the revolving structure 3 (the work machine 2) faces.

The inclination sensor 24 is provided in the revolving structure 3. The inclination sensor 24 includes an inertial measurement unit (IMU). The inclination sensor 24 is disposed under the cab 4. A high-rigidity frame is disposed in a portion of the revolving structure 3 under the cab 4. The inclination sensor 24 may be disposed on a lateral side (right or left side) of the revolution axis AX (the reference position P2) of the revolving structure 3. The inclination sensor 24 is disposed in the frame. The position detection device 20 acquires the vehicle body attitude data Q including the roll angle θ1 and the pitch angle θ2 using the inclination sensor 24.

Figure 7:
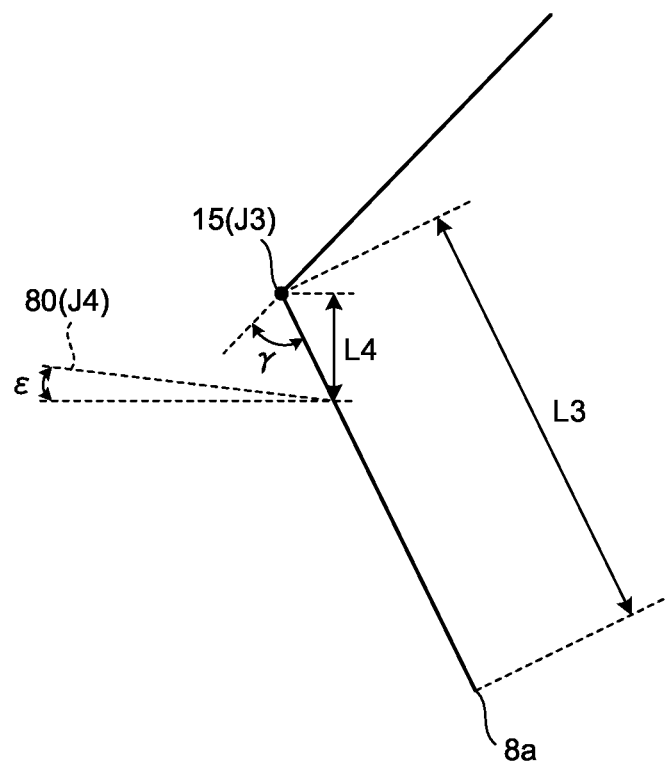
FIG. 7 is a side view schematically illustrating an example of a bucket.
Figure 8:
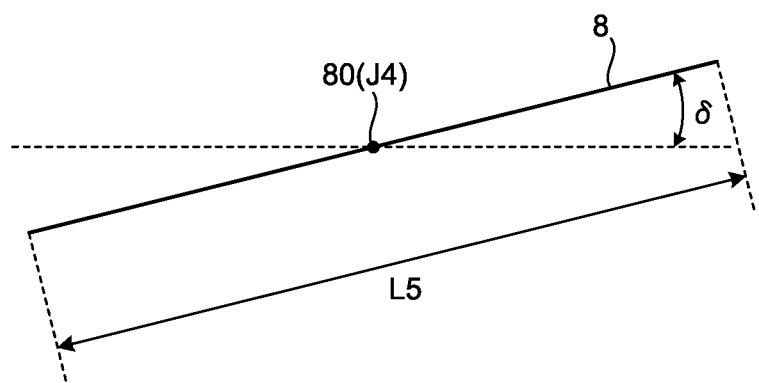
FIG. 8 is a front view schematically illustrating an example of the bucket.

FIG. 7 is a side view schematically illustrating the bucket 8 according to the present embodiment. FIG. 8 is a front view schematically illustrating the bucket 8 according to the present embodiment.

In the present embodiment, the distance L4 between the bucket shaft J3 and the tilt shaft J4 is referred to as a tilt length L4. The distance L5 between the side plate 84 and the side plate 85 is referred to as a width dimension L5 of the bucket 8. The tilt angle δ is an inclination angle of the bucket 8 in relation to the XY plane. The tilt angle data indicating the tilt angle δ is derived from the detection result of the tilt angle sensor 70. The tilt shaft angle ε is an inclination angle of the tilt shaft J4 (the tilt pin 80) in relation to the XY plane. The tilt angle data indicating the tilt shaft angle ε is derived from the detection result of the angle detection device 22.

In the present embodiment, although the tilt angle data is acquired from the detection result of the angle detection device 22, the tilt angle of the bucket 8 may be calculated and acquired from the result of detection of the stroke length (tilt cylinder length) of the tilt cylinder 30, for example.

[Configuration of Control System]

Figure 9:
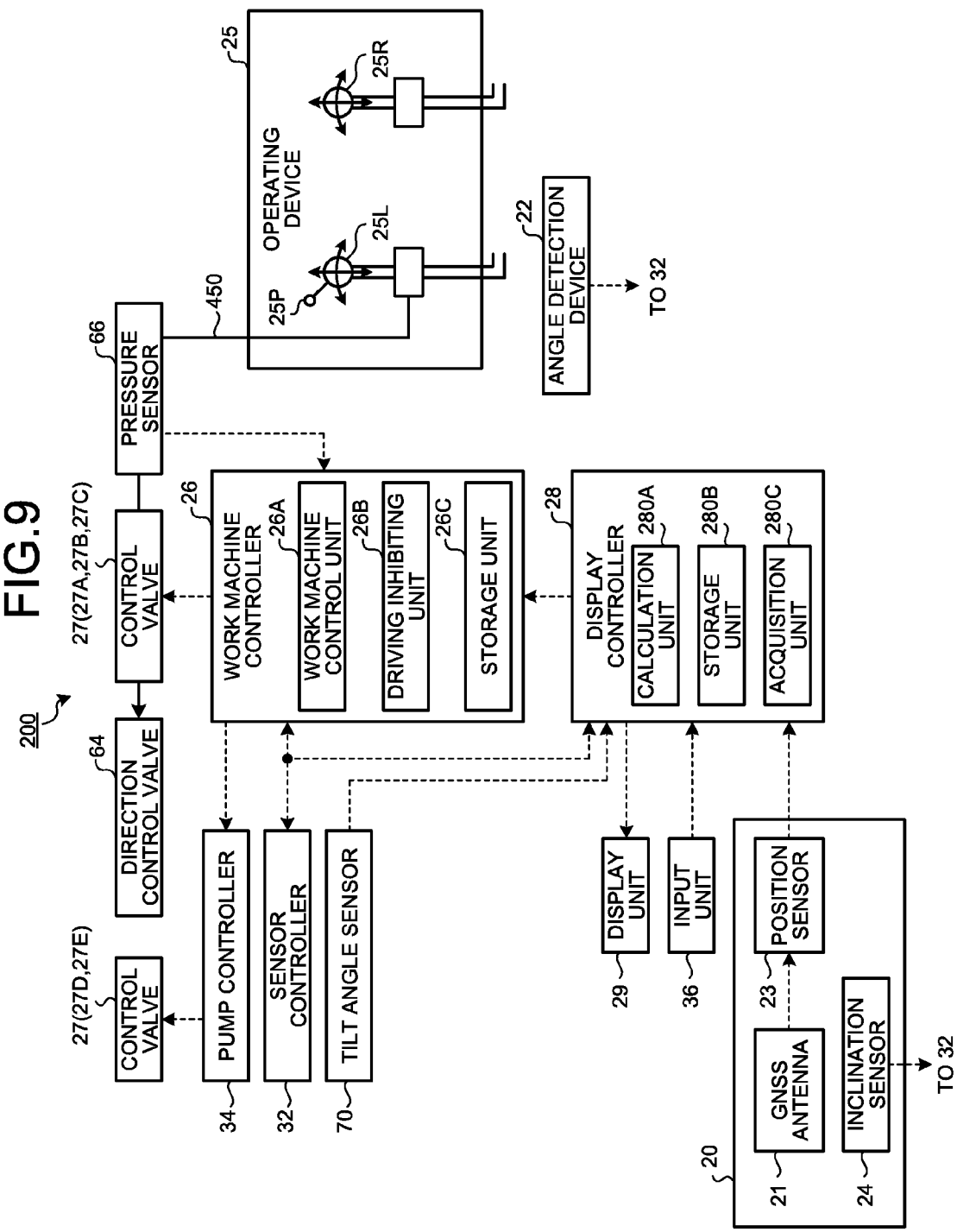
FIG. 9 is a block diagram illustrating an example of a control system.

Next, an overview of the control system 200 according to the present embodiment will be described. FIG. 9 is a block diagram illustrating a functional configuration of the control system 200 according to the present embodiment.

The control system 200 controls an excavation process of using the work machine 2. The control of excavation process includes limited excavation control. As illustrated in FIG. 9, the control system 200 includes the position detection device 20, the angle detection device 22, the tilt angle sensor 70, an operating device 25, a work machine controller 26, a pressure sensor 66, a control valve 27, a direction control valve 64, a display controller 28, a display unit 29, an input unit 36, a sensor controller 32, a pump controller 34, and an IMU 24.

The display unit 29 displays predetermined information such as a target excavation landform that is to be excavated based on control of the display controller 28. The input unit 36 is configured as a touch panel that inputs data to the display unit and is operated by an operator. When operated by the operator, the input unit 36 generates an operation signal based on the operation and outputs the operation signal to the display controller 28.

The operating device 25 is disposed in the cab 4. The operating device 25 is operated by the operator. The operating device 25 receives an operator operation that drives the work machine 2. In the present embodiment, the operating device 25 is a pilot hydraulic-type operating device.

In the following description, oil supplied to hydraulic cylinders (the boom cylinder 10, the arm cylinder 11, the bucket cylinder 12, and the tilt cylinder 30) in order to operate the hydraulic cylinders will be appropriately referred to as operating oil. In the present embodiment, the amount of operating oil supplied to the hydraulic cylinder is adjusted by the direction control valve 64. The direction control valve 64 operates with oil supplied. In the following description, oil supplied to the direction control valve 64 in order to operate the direction control valve 64 will be appropriately referred to as pilot oil. Moreover, the pressure of pilot oil will be appropriately referred to as pilot pressure.

The operating oil and the pilot oil may be delivered from the same hydraulic pump. For example, a portion of the operating oil delivered from the hydraulic pump is decompressed by a pressure-reducing valve and the decompressed operating oil may be used as the pilot oil. Moreover, a hydraulic pump (main hydraulic pump) that delivers operating oil and a hydraulic pump (pilot hydraulic pump) that delivers pilot oil may be different hydraulic pumps.

The operating device 25 includes a first operating lever 25R, a second operating lever 25L, and a third operating lever 25P. The first operating lever 25R is disposed on the right side of the driver's seat 4S, for example. The second operating lever 25L is disposed on the left side of the driver's seat 4S, for example. The third operating lever 25P is disposed in the second operating lever 25L, for example. The third operating lever 25P may be disposed in the first operating lever 25R. In the first and second operating levers 25R and 25L, the front-rear and left-right movements correspond to 2-axis operations.

The boom 6 and the bucket 8 are operated by the first operating lever 25R. The operation in the front-rear direction of the first operating lever 25R corresponds to an operation of the boom 6, and a lowering operation and a raising operation of the boom 6 are executed according to the operation in the front-rear direction. The operation in the left-right direction of the first operating lever 25R corresponds to an operation of the bucket 8, and an excavating operation and a releasing operation of the bucket 8 are executed according to the operation in the left-right direction.

The arm 7 and the revolving structure 3 are operated by the second operating lever 25L. The operation in the front-rear direction of the second operating lever 25L corresponds to an operation of the arm 7, and a raising operation and a lowering operation of the arm 7 are executed according to the operation in the front-rear direction. The operation in the left-right direction of the second operating lever 25L corresponds to revolving of the revolving structure 3, and a right revolving operation and a left revolving operation of the revolving structure 3 are executed according to the operation in the left-right direction.

The bucket 8 is operated by the third operating lever 25P. In the present embodiment, rotation of the bucket 8 about the bucket shaft J3 is operated by the first operating lever 25R. Rotation (tilting) of the bucket 8 about the tilt shaft J4 is operated by the third operating lever 25P.

In the present embodiment, the raising operation of the boom 6 corresponds to a dumping operation. The lowering operation of the boom 6 corresponds to an excavating operation. The lowering operation of the arm 7 corresponds to an excavating operation. The raising operation of the arm 7 corresponds to a dumping operation. The lowering operation of the bucket 8 corresponds to an excavating operation. The lowering operation of the arm 7 may be referred to as a bending operation. The raising operation of the arm 7 may be referred to as an extending operation.

The pilot oil which has been delivered from the pilot hydraulic pump and decompressed to pilot pressure by the control valve is supplied to the operating device 25. The pilot pressure is adjusted by the amount of operation of the operating device 25, and the direction control valve 64 via which operating oil supplied to the hydraulic cylinders (the boom cylinder 10, the arm cylinder 11, the bucket cylinder 12, and the tilt cylinder 40) is driven with the pilot pressure. The pressure sensor 66 is disposed in pilot pressure lines 450. The pressure sensor 66 detects the pilot pressure. The detection result of the pressure sensor 66 is output to the work machine controller 26.

The first operating lever 25R is operated in the front-rear direction in order to drive the boom 6. The direction control valve 64 via which the operating oil supplied to the boom cylinder 10 for driving the boom 6 is driven according to an amount of operation (amount of boom operation) of the first operating lever 25R in the front-rear direction.

The first operating lever 25R is operated in the left-right direction in order to drive the bucket 8. The direction control valve 64 via which the operating oil supplied to the bucket cylinder 12 for driving the bucket 8 is driven according to the amount of operation (amount of bucket operation) of the first operating lever 25R in the left-right direction.

The second operating lever 25L is operated in the front-rear direction in order to drive the arm 7. The direction control valve 64 via which the operating oil supplied to the arm cylinder 11 for driving the arm 7 is driven according to an amount of operation (amount of arm operation) of the second operating lever 25L in the front-rear direction.

The second operating lever 25L is operated in the left-right direction in order to drive the revolving structure 3. The direction control valve 64 via which the operating oil supplied to a hydraulic actuator for driving the revolving structure 3 is driven according to the amount of operation of the second operating lever 25L in the left-right direction.

The third operating lever 25P is operated in order to drive the bucket 8 (rotate the same about the tilt shaft J4). The direction control valve 64 via which the operating oil supplied to the tilt cylinder 30 for tilting the bucket 8 is driven according to the amount of operation of the third operating lever 25P.

The operation in the left-right direction of the first operating lever 25R may correspond to the operation of the boom 6, and the operation in the front-rear direction may correspond to the operation of the bucket 8. The operation in the left-right direction of the second operating lever 25L may correspond to the operation of the arm 7, and the operation in the front-rear direction may correspond to the operation of the revolving structure 3.

The control valve 27 operates in order to adjust the amount of operating oil supplied to the hydraulic cylinders (the boom cylinder 10, the arm cylinder 11, the bucket cylinder 12, and the tilt cylinder 30). The control valve 27 operates based on a control signal from the work machine controller 26.

The angle detection device 22 detects the work machine angle data including the boom angle data indicating the rotation angle $\alpha$ of the boom 6 about the boom shaft J1, the arm angle data indicating the rotation angle $\beta$ of the arm 7 about the arm shaft J2, and the bucket angle data indicating the rotation angle $\gamma$ of the bucket 8 about the bucket shaft J3.

In the present embodiment, the angle detection device 22 includes the first stroke sensor 16, the second stroke sensor 17, and the third stroke sensor 18. The detection result of the first stroke sensor 16, the detection result of the second stroke sensor 17, and the detection result of the third stroke sensor 18 are output to the sensor controller 32. The sensor controller 32 calculates the boom cylinder length based on the detection result of the first stroke sensor 16. The first stroke sensor 16 outputs a phase shift pulse associated with the revolving operation to the sensor controller 32. The sensor controller 32 calculates the boom cylinder length based on the phase shift pulse output from the first stroke sensor 16. Similarly, the sensor controller 32 calculates the arm cylinder length based on the detection result of the second stroke sensor 17. The sensor controller 32 calculates the bucket cylinder length based on the detection result of the third stroke sensor 18.

The sensor controller 32 calculates the rotation angle α of the boom 6 in relation to the vertical direction of the vehicle body 1 from the boom cylinder length acquired based on the detection result of the first stroke sensor 16. The sensor controller 32 calculates the rotation angle β of the arm 7 in relation to the boom 6 from the arm cylinder length acquired based on the detection result of the second stroke sensor 17. The sensor controller 32 calculates the rotation angle γ of the cutting edge 8*a* of the bucket 8 in relation to the arm 7 from the bucket cylinder length acquired based on the detection result of the third stroke sensor 18.

The rotation angle α of the boom 6, the rotation angle β of the arm 7, and the rotation angle γ of the bucket 8 may not be detected by the stroke sensor. The rotation angle α of the boom 6 may be detected by an angle detector such as a rotary encoder. The angle detector detects a bending angle of the boom 6 with respect to the revolving structure 3 to detect the rotation angle α. Similarly, the rotation angle β of the arm 7 may be detected by an angle detector attached to the arm 7. The rotation angle γ of the bucket 8 may be detected by an angle detector attached to the bucket 8.

The sensor controller 32 acquires the cylinder length data L and the work machine angle data from the first, second, and third stroke sensors 16, 17, and 18. The sensor controller 32 outputs the work machine rotation angle data α to γ to the display controller 28 and the work machine controller 26.

The display controller 28 acquires the vehicle body position data P and the vehicle body attitude data Q from the position detection device 20. Moreover, the display controller 28 acquires the tilt angle data indicating the tilt angle δ from the tilt angle sensor 70.

The display controller 28 acquires the vehicle body position data P and the vehicle body attitude data Q from the position detection device 20. Moreover, the display controller 28 acquires the tilt angle data indicating the tilt angle δ from the tilt angle sensor 70.

The display controller 28 includes a calculation unit 280A that performs a calculating process, a storage unit 280B in which data is stored, and an acquisition unit (data acquisition unit) 280C that acquires data.

The display controller 28 calculates target excavation landform data U based on stored target construction information, work machine dimensions, the vehicle body position data P, the vehicle body attitude data Q, and the rotation angle data α to γ of the respective work machines and outputs the target excavation landform data U to the work machine controller 26.

The work machine controller 26 includes a work machine control unit 26A, a driving inhibiting unit 26B, and a storage unit 26C. The work machine controller 26 receives the target excavation landform data U from the display controller 28 and acquires the rotation angle data α to γ of the respective work machines from the sensor controller 32. The work machine controller 26 generates a control command to the control valve 27 based on the target excavation landform data U and the rotation angle data α to γ of the work machines. Moreover, the work machine controller 26 outputs an operation command for operating a tilt bucket to the pump controller 34.

The pump controller 34 outputs a driving command to the hydraulic pump 41 that supplies operating oil to the work machine 2. Moreover, the pump controller 34 outputs a command to control valves 27D and 27E (described later) in order to control the tilt angle of the bucket 8.

[Stroke Sensor]

Figure 10:
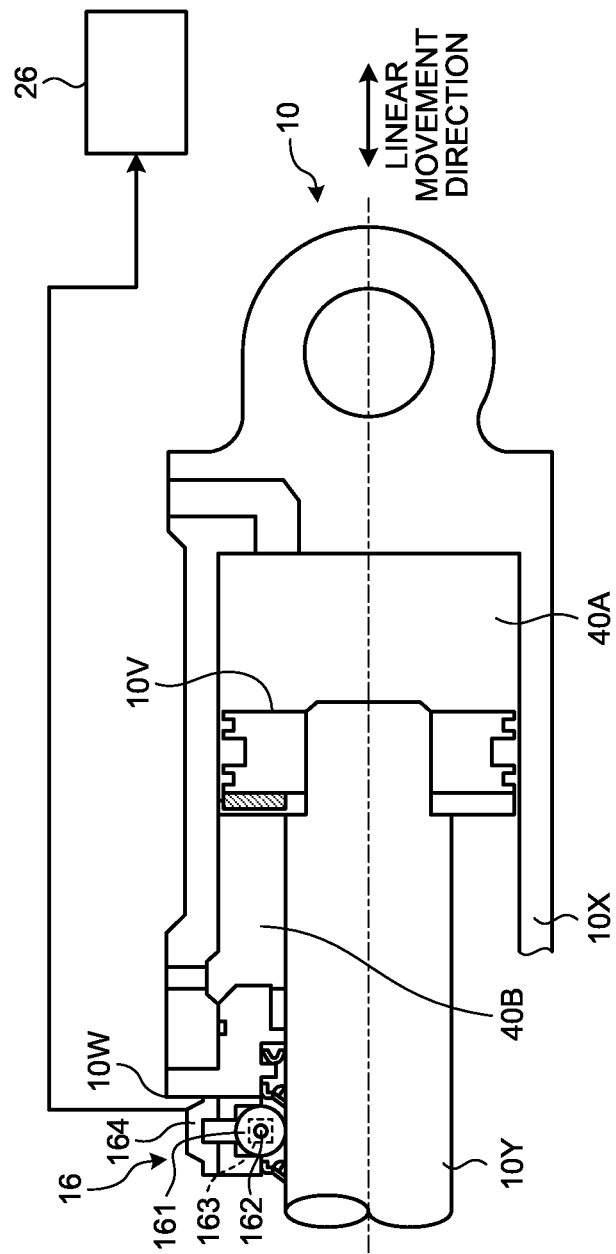
FIG. 10 is a diagram illustrating an example of a hydraulic cylinder.

Next, the stroke sensor 16 will be described with reference to FIGS. 10 and 11. In the following description, the stroke sensor 16 attached to the boom cylinder 10 will be described. The stroke sensor 17 and the like attached to the arm cylinder 11 have the same configuration as the stroke sensor 16.

The stroke sensor 16 is attached to the boom cylinder 10. The stroke sensor 16 measures the stroke of a piston. As illustrated in FIG. 10, the boom cylinder 10 includes a cylinder tube 10X and a cylinder rod 10Y configured to move within the cylinder tube 10X in relation to the cylinder tube 10X. A piston 10V is slidably provided in the cylinder tube 10X. The cylinder rod 10Y is attached to the piston 10V. The cylinder rod 10Y is slidably provided in a cylinder head 10W. A chamber formed by the cylinder head 10W, the piston 10V, and a cylinder inner wall is a rod-side oil chamber 40B. An oil chamber on the opposite side of the rod-side oil chamber 40B with the piston 10V interposed is a cap-side oil chamber 40A. A seal member is provided in the cylinder head 10W so as to seal the gap between the cylinder head 10W and the cylinder rod 10Y so that dust or the like does not enter into the rod-side oil chamber 40B.

The cylinder rod 10Y retracts when operating oil is supplied to the rod-side oil chamber 40B and the operating oil is discharged from the cap-side oil chamber 40A. Moreover, the cylinder rod 10Y extends when operating oil is discharged from the rod-side oil chamber 40B and the operating oil is supplied to the cap-side oil chamber 40A. That is, the cylinder rod 10Y moves linearly in the left-right direction in the figure.

A case 164 that covers the stroke sensor 16 and accommodates the stroke sensor 16 is provided outside the rod-side oil chamber 40B at the proximity of the cylinder head 10W. The case 164 is fixed to the cylinder head 10W by being fastened to the cylinder head 10W by bolts or the like.

The stroke sensor 16 includes a rotation roller 161, a rotation center shaft 162, and a rotation sensor portion 163. The rotation roller 161 has a surface in contact with the surface of the cylinder rod 10Y and is provided so as to rotate according to linear movement of the cylinder rod 10Y. That is, linear movement of the cylinder rod 10Y is converted into rotational movement by the rotation roller 161. The rotation center shaft 162 is disposed to be orthogonal to the direction of linear movement of the cylinder rod 10Y.

The rotation sensor portion 163 is configured to detect the amount of rotation (rotation angle) of the rotation roller 161 as an electrical signal. The signal indicating the amount of rotation (rotation angle) of the rotation roller 161 detected by the rotation sensor portion 163 is output to the sensor controller 32 via an electrical signal line and is converted to the position (stroke position) of the cylinder rod 10Y of the boom cylinder 10 by the work machine controller 26.

Figure 11:
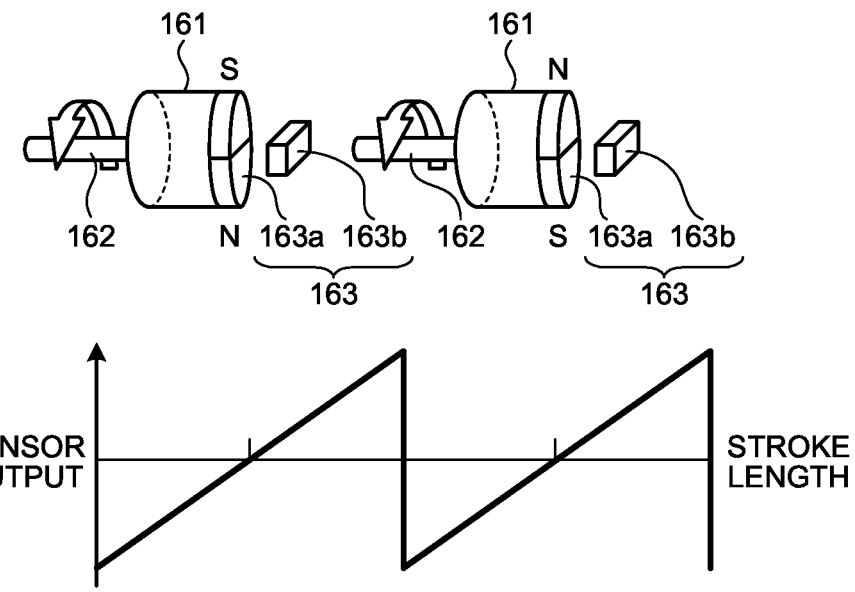
FIG. 11 is a diagram illustrating an example of a stroke sensor.

As illustrated in FIG. 11, the rotation sensor portion 163 includes a magnet 163*a* and a hall IC 163*b*. The magnet 163*a* which is a detecting medium is attached to the rotation roller 161 so as to rotate integrally with the rotation roller 161. The magnet 163*a* rotates with rotation of the rotation roller 161 around the rotation center shaft 162. The magnet 163*a* is configured such that the N pole and the S pole alternate according to the rotation angle of the rotation roller 161. The magnet 163*a* is configured such that magnetic force (magnetic flux density) detected by the hall IC 163*b* changes periodically every rotation of the rotation roller 161.

The hall IC 163*b* is a magnetic force sensor that detects the magnetic force (magnetic flux density) generated by the magnet 163*a* as an electrical signal. The hall IC 163*b* is provided along the axial direction of the rotation center shaft 162 at a position separated by a predetermined distance from the magnet 163*a*.

The electrical signal detected by the hall IC 163*b* is output to the work machine controller 26, and the electrical signal of the hall IC 163*b* is converted to the amount of rotation of the rotation roller 161 (that is, the displacement amount (stroke length) of the cylinder rod 10Y of the boom cylinder 10) by the work machine controller 26.

Here, referring to FIG. 11, a relation between the rotation angle of the rotation roller 161 and the electrical signal (voltage) detected by the hall IC 163*b* will be described. When the rotation roller 161 rotates and the magnet 163*a* rotates with the rotation, the magnetic force (magnetic flux density) that passes through the hall IC 163*b* changes periodically according to the rotation angle and the electrical signal (voltage) which is the sensor output changes periodically. The rotation angle of the rotation roller 161 can be measured from the magnitude of the voltage output from the hall IC 163*b*.

Moreover, by counting the number of repetitions of each cycle of the electrical signal (voltage) output from the hall IC 163*b*, it is possible to measure the number of rotations of the rotation roller 161. Moreover, the displacement amount (stroke length) of the cylinder rod 10Y of the boom cylinder 10 is detected based on the rotation angle of the rotation roller 161 and the number of rotations of the rotation roller 161.

Moreover, the stroke sensor 16 can detect the moving speed (cylinder speed) of the cylinder rod 10Y based on the rotation angle of the rotation roller 161 and the number of rotations of the rotation roller 161.

[Hydraulic System]

Next, an example of a hydraulic system 300 according to the present embodiment will be described. The control system 200 includes the hydraulic system 300 and the work machine controller 26. The boom cylinder 10, the arm cylinder 11, the bucket cylinder 12, and the tilt cylinder 30 are hydraulic cylinders. These hydraulic cylinders are operated by the hydraulic system 300.

Figure 13:
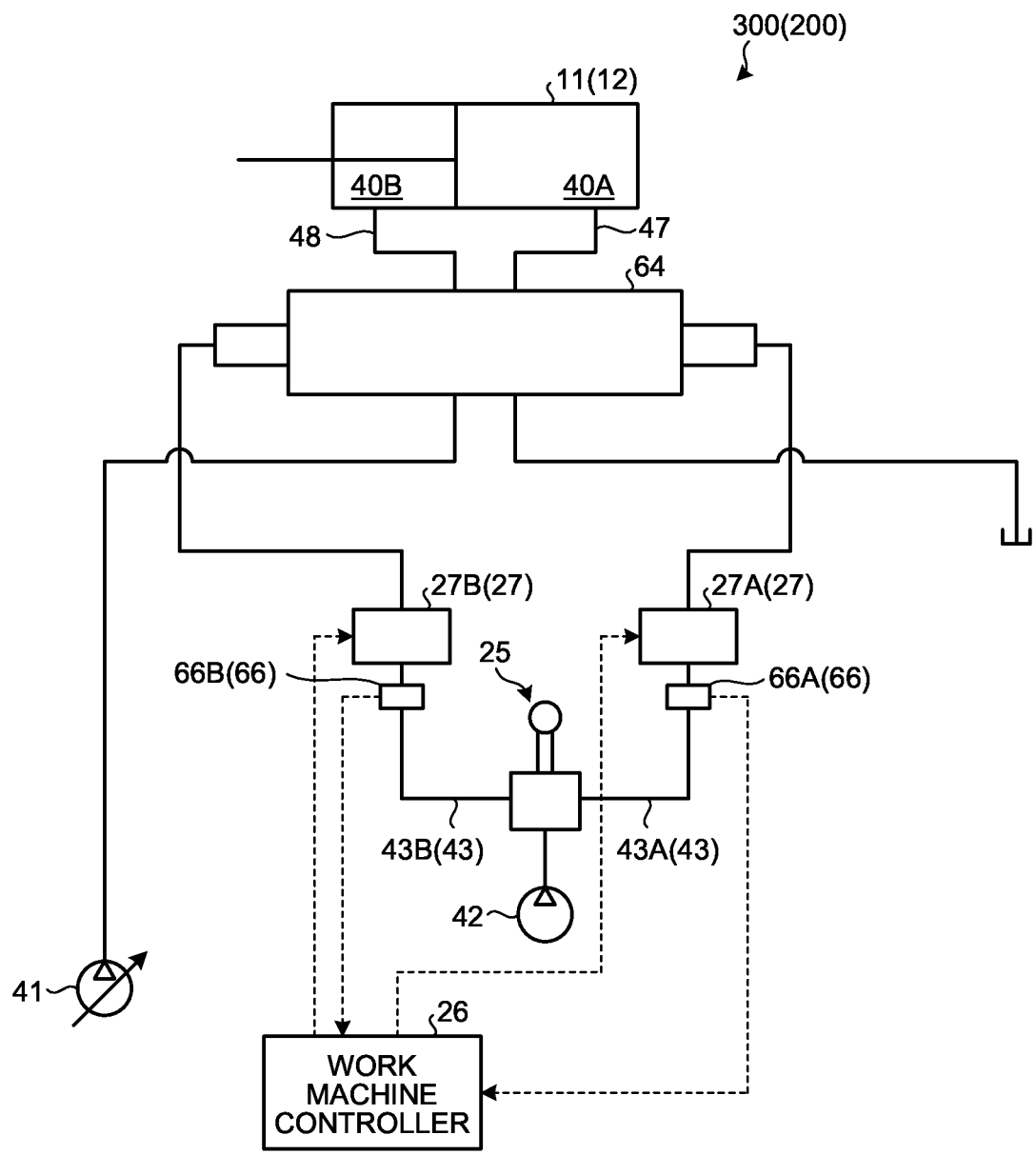
FIG. 13 is a diagram illustrating an example of a hydraulic system.

FIG. 13 is a diagram schematically illustrating an example of the hydraulic system 300 including the arm cylinder 11. The same is true for the bucket cylinder 12. The hydraulic system 300 includes a variable capacitance main hydraulic pump 41 that supplies operating oil to the arm cylinder 11 via the direction control valve 64, a pilot hydraulic pump 42 that supplies pilot oil, the operating device 25 that adjusts the pilot pressure of the pilot oil to the direction control valve 64, an oil passage 43 (43A and 43B) through which the pilot oil flows, the control valve 27 (27A and 27B) disposed in the oil passage 43, the pressure sensor 66 (66A and 66B) disposed in the oil passage 43, and the work machine controller 26 that controls the control valve 27. The oil passage 43 is the same as the pilot pressure line 450 of FIG. 9.

The direction control valve 64 controls the direction in which operating oil flows. The operating oil supplied from the main hydraulic pump 41 is supplied to the arm cylinder 11 via the direction control valve 64. The direction control valve 64 is a spool-type valve in which a rod-shaped spool is moved to change the flowing direction of operating oil. When the spool moves in an axial direction, the supply of operating oil to the cap-side oil chamber 40A (an oil passage 47) of the arm cylinder 11 and the supply of operating oil to the rod-side oil chamber 40B (an oil passage 48) are switched. Moreover, when the spool moves in the axial direction, the amount (the amount of supply per unit time) of operating oil supplied to the arm cylinder 11 is adjusted. When the amount of operating oil supplied to the arm cylinder 11 is adjusted, the cylinder speed is adjusted.

The driving of the direction control valve 64 is adjusted by the operating device 25. In the present embodiment, the operating device 25 is a pilot hydraulic-type operating device. Pilot oil which has been delivered from the pilot hydraulic pump 42 is supplied to the operating device 25. Pilot oil which has been delivered from the main hydraulic pump 41 and decompressed by the pressure-reducing valve may be supplied to the operating device 25. The operating device 25 includes a pilot pressure adjustment valve. The pilot pressure is adjusted based on the amount of operation of the operating device 25. The direction control valve 64 is driven with the pilot pressure. When the pilot pressure is adjusted by the operating device 25, the movement amount and the moving speed of the spool in the axial direction are adjusted.

Two oil passages 43 through which pilot oil flows are provided in each direction control valve 64. Pilot oil supplied to one space (first pressure receiving chamber) of a spool of the direction control valve 64 flows through one oil passage 43A of the two oil passages 43A and 43B. Pilot oil supplied to the other space (second pressure receiving chamber) of the spool of the direction control valve 64 flows through the other oil passage 43B.

The pressure sensor 66 is disposed in the oil passage 43. The pressure sensor 66 detects the pilot pressure. The pressure sensor 66 includes the pressure sensor 66A that detects the pilot pressure of the oil passage 43A and the pressure sensor 66B that detects the pilot pressure of the oil passage 43B. The detection result of the pressure sensor 66 is output to the work machine controller 26.

The control valve 27 is an electromagnetic proportional control valve and can adjust the pilot pressure based on the control signal from the work machine controller 26. The control valve 27 includes a control valve 27A that can adjust the pilot pressure of the oil passage 43A and a control valve 27B that can adjust the pilot pressure of the oil passage 43B.

When the pilot pressure is adjusted by the operation of the operating device 25, the control valve 27 is open to its full width. When the operating lever of the operating device 25 is operated to one side from the neutral position, pilot pressure corresponding to the amount of operation of the operating lever acts on the first pressure receiving chamber of the spool of the direction control valve 64. When the operating lever of the operating device 25 is operated to the other side from the neutral position, pilot pressure corresponding to the amount of operation of the operating lever acts on the second pressure receiving chamber of the spool of the direction control valve 64.

The spool of the direction control valve 64 is moved by the distance corresponding to the pilot pressure adjusted by the operating device 25. For example, when the pilot pressure acts on the first pressure receiving chamber, the operating oil from the main hydraulic pump 41 is supplied to the cap-side oil chamber 40A of the arm cylinder 11 and the arm cylinder 11 is extended. When the pilot pressure acts on the second pressure receiving chamber, the operating oil from the main hydraulic pump 41 is supplied to the rod-side oil chamber 40B of the arm cylinder 11 and the arm cylinder 11 is retracted. Based on the movement amount of the spool of the direction control valve 64, the amount of operating oil supplied per unit time from the main hydraulic pump 41 to the arm cylinder 11 via the direction control valve 64 is adjusted. When the amount of operating oil supplied per unit time is adjusted, the cylinder speed is adjusted.

The work machine controller 26 can control the control valve 27 to adjust the pilot pressure. For example, in limited excavation control (intervention control), the work machine controller 26 drives the control valve 27. For example, when the control valve 27A is driven by the work machine controller 26, the spool of the direction control valve 64 is moved by the distance corresponding to the pilot pressure adjusted by the control valve 27A. In this way, the operating oil from the main hydraulic pump 41 is supplied to the cap-side oil chamber 40A of the arm cylinder 11 and the arm cylinder 11 is extended. When the control valve 27B is driven by the work machine controller 26, the spool of the direction control valve 64 is moved by the distance corresponding to the pilot pressure adjusted by the control valve 27B. In this way, the operating oil from the main hydraulic pump 41 is supplied to the rod-side oil chamber 40B of the arm cylinder 11 and the arm cylinder 11 is retracted. Based on the movement amount of the spool of the direction control valve 64, the amount of operating oil supplied per unit time from the main hydraulic pump 41 to the arm cylinder 11 via the direction control valve 64 is adjusted. When the amount of operating oil supplied per unit time is adjusted, the cylinder speed is adjusted.

Figure 14:
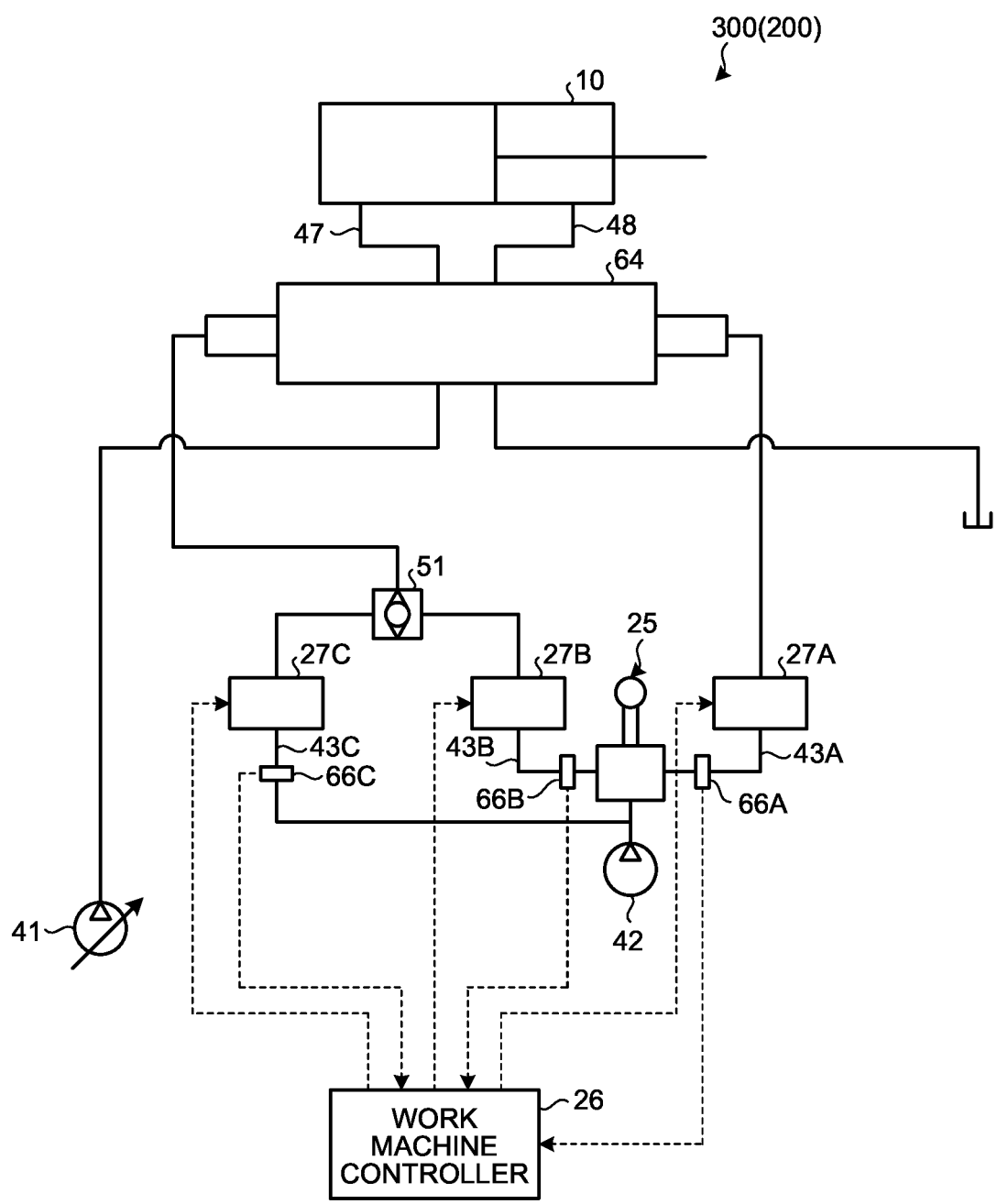
FIG. 14 is a diagram illustrating an example of a hydraulic system.

FIG. 14 is a diagram schematically illustrating an example of the hydraulic system 300 including the boom cylinder 10. According to the operation of the operating device 25, the boom 6 executes two operations of the lowering operation and the raising operation. As described above with reference to FIG. 13, when the operating device 25 is operated, the pilot pressure corresponding to the amount of operation of the operating device 25 acts on the direction control valve 64. The spool of the direction control valve 64 is moved based on the pilot pressure. Based on the movement amount of the spool, the amount of operating oil supplied per unit time from the main hydraulic pump 41 to the boom cylinder 10 via the direction control valve 64 is adjusted.

Moreover, the work machine controller 26 can drive the control valve 27A to adjust the pilot pressure acting on the second pressure receiving chamber. The work machine controller 26 can drive the control valve 27B to adjust the pilot pressure acting on the first pressure receiving chamber. In the example illustrated in FIG. 14, when the pilot oil is supplied to the direction control valve 64 via the control valve 27A, the lowering operation of the boom 6 is executed. When the pilot oil is supplied to the direction control valve 64 via the control valve 27B, the raising operation of the boom 6 is executed.

In the present embodiment, an oil passage 43C is connected to a control valve 27C that operates based on an intervention control signal output from the work machine controller 26 in order to perform intervention control. The pilot oil delivered from the pilot hydraulic pump 42 flows through the oil passage 43C. The oil passage 43C is connected to the oil passage 43B with a shuttle valve 51 interposed. The shuttle valve 51 selects the input from an oil passage having the larger pressure among the oil passages connected thereto and outputs the same.

The control valve 27C and a pressure sensor 66C that detects the pilot pressure of the oil passage 43C are provided in the oil passage 43C. The control valve 27C is controlled based on a control signal output from the work machine controller 26 in order to execute intervention control.

When intervention control is not executed, the work machine controller 26 does not output a control signal to the control valve 27C so that the direction control valve 64 is driven based on the pilot pressure adjusted by the operation of the operating device 25. For example, the work machine controller 26 opens the control valve 27B to its full width and closes the control valve 27C and the oil passage 43C so that the direction control valve 64 is driven based on the pilot pressure adjusted by the operation of the operating device 25.

When intervention control is executed, the work machine controller 26 controls the respective control valves 27 so that the direction control valve 64 is driven based on the pilot pressure adjusted by the control valve 27C. For example, when intervention control of limiting the movement of the boom 6 is executed, the work machine controller 26 controls the control valve 27C so that the pilot pressure adjusted by the control valve 27C is higher than the pilot pressure adjusted by the operating device 25. The pilot pressure supplied from the oil passage 43C becomes larger than the pilot pressure supplied from the oil passage 43B. In this way, the pilot oil from the control valve 27C is supplied to the direction control valve 64 via the shuttle valve 51.

When the pilot oil is supplied to the direction control valve 64 via at least one of the oil passages 43B and 43C, the operating oil is supplied to the cap-side oil chamber 40A through the oil passage 47. In this way, the boom 6 is raised.

When the boom 6 is raised at a high speed by the operating device 25 so that the bucket 8 does not dig into the target excavation landform, the intervention control is not executed. When the operating device 25 is operated so that the boom 6 is raised at a high speed and the pilot pressure is adjusted based on the amount of operation, the pilot pressure adjusted by the operation of the operating device 25 becomes higher than the pilot pressure adjusted by the control valve 27C. In this way, the pilot oil having the pilot pressure adjusted by the operation of the operating device 25 is supplied to the direction control valve 64 via the shuttle valve 51.

Figure 15:
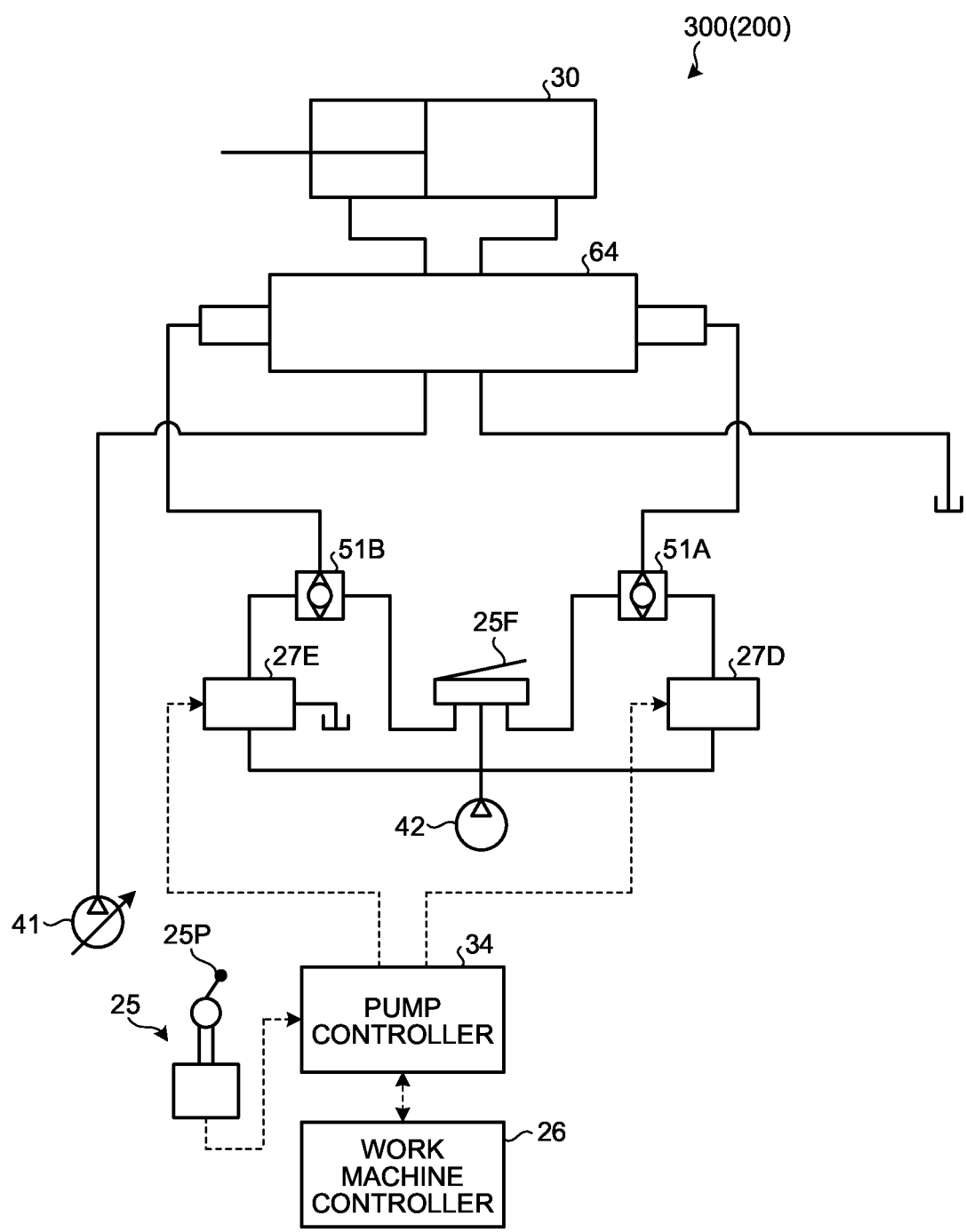
FIG. 15 is a diagram illustrating an example of a hydraulic system.

FIG. 15 is a diagram schematically illustrating an example of the hydraulic system 300 including the tilt cylinder 30. The hydraulic system 300 includes the direction control valve 64 that adjusts the amount of operating oil supplied to the tilt cylinder 30, the control valve 27D and the control valve 27D that adjust the pressure of the pilot oil supplied to the direction control valve 64, an operation pedal 25F, and the pump controller 34. The pump controller 34 outputs a command signal to a swash plate of the main hydraulic pump 41 and controls the amount of operating oil supplied to the hydraulic cylinder. The control valve 27 is controlled based on a control signal generated by the pump controller 34 based on an operation signal of the operating device 25 (the third operating lever 25P).

In the present embodiment, the operation signal generated by the operation of the third operating lever 25P is output to the pump controller 34. The operation signal generated by the operation of the third operating lever 25P may be output to the work machine controller 26. The control valve 27 may be controlled by the pump controller 34 and may be controlled by the work machine controller 26.

In the present embodiment, the operating device 25 includes the operation pedal 25F for adjusting the pilot pressure to the direction control valve 64. The operation pedal 25F is disposed in the cab 4 and is operated by the operator. The operation pedal 25F is connected to the pilot hydraulic pump 42. Moreover, the operation pedal 25F is connected to an oil passage through which the pilot oil delivered from the control valve 27D flows with a shuttle valve 51A interposed. Moreover, the operation pedal 25F is connected to an oil passage through which the pilot oil delivered from the control valve 27E flows with a shuttle valve 51B interposed.

When the operation pedal 25F is operated, the pressure of the oil passage between the operation pedal 25F and the shuttle valve 51A and the pressure of the oil passage between the operation pedal 25F and the shuttle valve 51B are adjusted.

When the third operating lever 25P is operated, an operation signal (command signal) based on the operation of the third operating lever 25P is output to the pump controller 34 (or the work machine controller 26). The pump controller 34 outputs a control signal to at least one of the control valve 27D and the control valve 27E based on the operation signal output from the third operating lever 25P. The control valve 27D having acquired the control signal is driven in such a manner to open and close the oil passage. The control valve 27B having acquired the control signal is driven in such a manner to open and close the oil passage.

According to the operation of at least one of the operation pedal 25F and the third operating lever 25P, when the pilot pressure adjusted by the control valve 27D is higher than the pilot pressure adjusted by the operation pedal 25F, the pilot oil having the pilot pressure, selected by the shuttle valve 51A and adjusted by the control valve 27D is supplied to the direction control valve 64. When the pilot pressure adjusted by the operation pedal 25F is higher than the pilot pressure adjusted by the control valve 27D, the pilot oil having the pilot pressure adjusted by the operation pedal 25F is supplied to the direction control valve 64.

According to the operation of at least one of the operation pedal 25F and the third operating lever 25P, when the pilot pressure adjusted by the control valve 27E is higher than the pilot pressure adjusted by the operation pedal 25F, the pilot oil having the pilot pressure, selected by the shuttle valve 51B and adjusted by the control valve 27E is supplied to the direction control valve 64. When the pilot pressure adjusted by the operation pedal 25F is higher than the pilot pressure adjusted by the control valve 27E, the pilot oil having the pilot pressure adjusted by the operation pedal 25F is supplied to the direction control valve 64.

[Limited Excavation Control]

Figure 12:
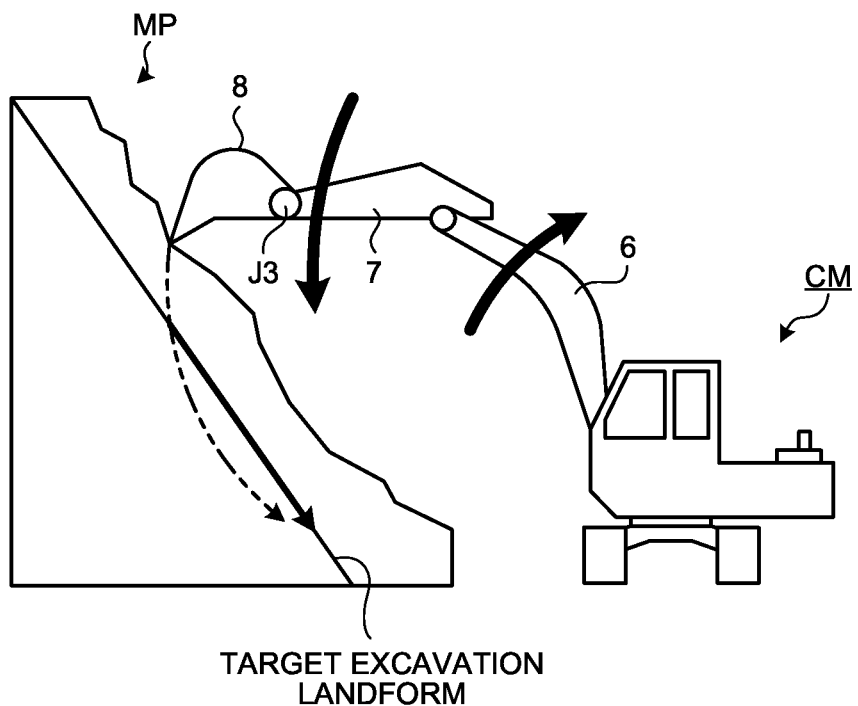
FIG. 12 is a diagram for describing an example of limited excavation control.

FIG. 12 is a diagram schematically illustrating an example of the operation of the work machine 2 when limited excavation control is performed. In the present embodiment, limited excavation control is performed so that the bucket 8 does not dig into a target excavation landform indicating a 2-dimensional target shape of an excavation object in a working plane MP orthogonal to the bucket shaft J3.

When the bucket 8 performs excavation, the hydraulic system 300 operates so that the boom 6 is raised in relation to the excavation operation of the arm 7 and the bucket 8. During the excavation, intervention control including the raising operation of the boom 6 is executed so that the bucket 8 does not dig into the target excavation landform.

[Control Method]

Next, an example of a method of controlling the excavator CM according to the present embodiment will be described with reference to the flowchart of FIG. 16. The display controller 28 acquires various parameters used for excavation control (step SP1). The parameters are acquired by an acquisition unit 28C of the display controller 28.

Figure 17A:
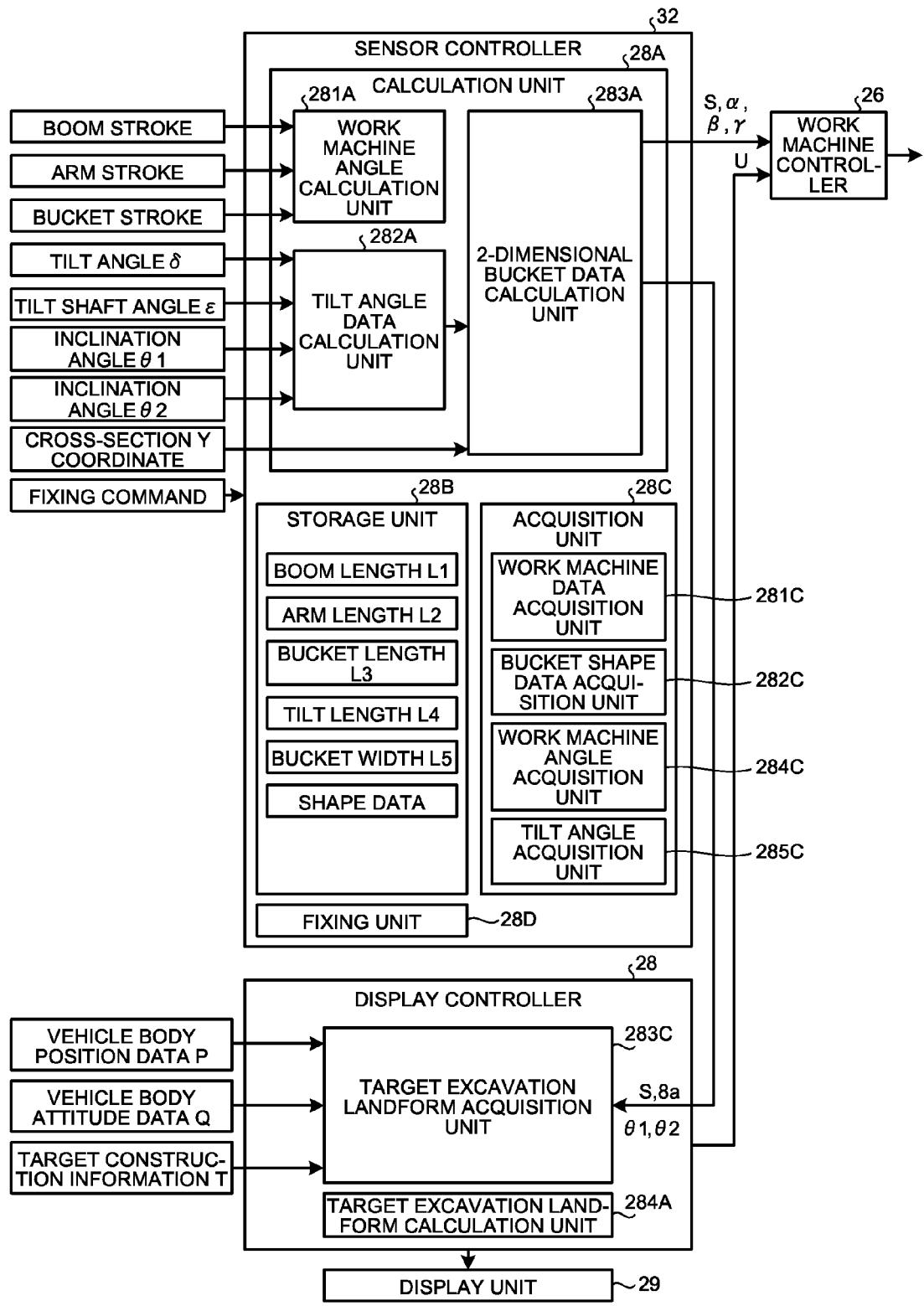
FIG. 17A is a functional block diagram illustrating an example of a control system.

FIG. 17A is a functional block diagram illustrating an example of the display controller 28, the work machine controller 26, and the sensor controller 32 according to the present embodiment. The sensor controller 32 includes a calculation unit 28A, a storage unit 28B, and the acquisition unit 28C. The calculation unit 28A includes a work machine angle calculation unit 281A, a tilt angle data calculation unit 282A, and a 2-dimensional bucket data calculation unit 283A. The acquisition unit 28C includes a work machine data acquisition unit 281C, a bucket shape data acquisition unit 282C, a work machine angle acquisition unit 284C, and a tilt angle acquisition unit 285C.

Figure 17B:
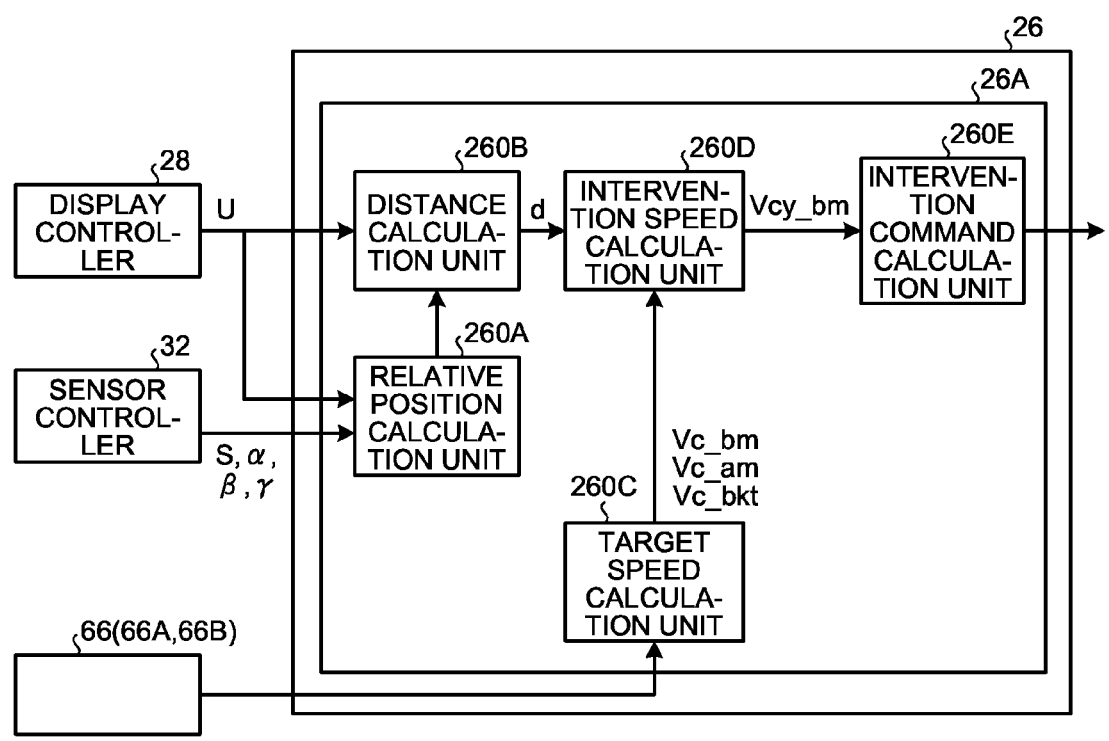
FIG. 17B is a functional block diagram illustrating an example of a control system.

FIG. 17B is a functional block diagram illustrating an example of the work machine control unit 26A of the work machine controller 26 according to the present embodiment. As illustrated in FIG. 17B, the work machine control unit 26A of the work machine controller 26 includes a relative position calculation unit 260A, a distance calculation unit 260B, a target speed calculation unit 260C, an intervention speed calculation unit 260D, an intervention command calculation unit 260E. The work machine control unit 26A limits the speed of the boom 6 based on the target excavation landform data U indicating the target excavation landform which is a target shape of an excavation object and the bucket position data indicating the position of the bucket 8 (the cutting edge 8a) so that a relative speed at which the bucket 8 approaches the target excavation landform decreases according to the distance d between the target excavation landform and the bucket 8 (the cutting edge 8a). The work machine controller 26 performs calculation in the local coordinate system.

As illustrated in FIG. 17A, the display controller 283C includes a target excavation landform acquisition unit 283C and a target excavation landform calculation unit 284A.

The acquisition unit 28C includes the work machine data acquisition unit (first acquisition unit) 281C, the bucket shape data acquisition unit (fourth acquisition unit) 282C, the work machine angle acquisition unit (third acquisition unit) 284C that acquires work machine angle data, and the tilt angle acquisition unit (fifth acquisition unit) 285C that acquires tilt angle data. The target excavation landform acquisition unit (third acquisition unit) 283C is included in the display controller 28.

The calculation unit 28A includes the work machine angle calculation unit 281A that calculates a work machine angle and the 2-dimensional bucket data calculation unit 283A that calculate 2-dimensional bucket data. The relative position calculation unit 260A that calculates the relative position of the bucket 8 in relation to the target excavation landform is included in the work machine controller 26 (the work machine control unit 26A). The target excavation landform calculation unit 284A is included in the display controller 28.

The work machine controller 26 outputs a control signal for controlling the work machine 2. The work machine controller 26 includes the work machine control unit 26A that outputs a control signal. As illustrated in FIG. 9, in the present embodiment, the work machine controller 26 includes a driving inhibiting unit 26B that inhibits driving of the bucket 8. The driving inhibiting unit 26B inhibits rotation (tilting) of the bucket 8 about the tilt shaft J4. The driving inhibiting unit 26B may inhibit rotation (vertical movement) of the bucket 8 about the bucket shaft J3. In the present embodiment, the driving inhibiting unit 26B stops the driving (tilting) of the bucket 8 by disabling the operation signal output from the operating device 25 in order to operate the tilt cylinder 30 that tilts the bucket 8.

The work machine angle calculation unit 281A acquires the boom cylinder length from the first stroke sensor 16 to calculate a boom angle α. The work machine angle calculation unit 281A acquires the arm cylinder length from the second stroke sensor 17 to calculate an arm angle β. The work machine angle calculation unit 281A acquires the bucket cylinder length from the third stroke sensor 18 to calculate a bucket angle γ. The work machine angle acquisition unit 284C acquires work machine angle data including the boom angle data, the arm angle data, and the bucket angle data (step SP1.2).

The boom angle α, the arm angle ρ, and the bucket angle γ may not be detected by the stroke sensor. The boom angle α may be detected by an inclination angle sensor attached to the boom 6. The arm angle ρ may be detected by an inclination sensor attached to the arm 7. The bucket angle γ may be detected by an inclination angle sensor attached to the bucket 8. When the angle detection device 22 includes an inclination angle sensor, the work machine angle data acquired by the angle detection device 22 is output to the sensor controller 32.

The acquisition unit 28C (the work machine angle acquisition unit 284C) of the sensor controller 32 acquires work machine angle data including the boom angle data indicating the boom angle α, the arm angle data indicating the arm angle β, and the bucket angle data indicating the bucket angle γ based on the detection result of the angle detection device 22. Moreover, the acquisition unit 28C (the tilt angle acquisition unit 285C) acquires tilt angle data including a tilt angle δ' indicating the rotation angle of the bucket about the tilt shaft based on the detection result of the tilt angle sensor 70. Moreover, the acquisition unit 28C (the tilt angle acquisition unit 285C) acquires tilt shaft angle data including a tilt shaft angle ϵ' indicating the rotation angle of the bucket about the tilt shaft based on the detection result of the angle detection device 22. During the driving of the work machine 2, the angle detection device 22 and the tilt angle sensor 70 monitors the boom angle α, the arm angle β, the bucket angle γ, the tilt angle δ, and the tilt shaft angle ϵ. The acquisition unit 28C acquires these items of angle data in realtime during the driving of the work machine 2.

The tilt angle sensor 70 detects tilt angle data indicating the tilt angle δ of the bucket 8 about the tilt shaft J4. The tilt angle data acquired by the tilt angle sensor 70 is output to the sensor controller 32 via the display controller 28. The tilt angle acquisition unit 285C acquires the tilt angle data indicating the rotation angle of the bucket about the tilt shaft (step SP1.4).

In the present embodiment, the tilt angle data is output from the tilt angle sensor 70 to the acquisition unit 28C (the tilt angle acquisition unit 285C). A fixing unit 28D fixes the tilt angle data (monitor data) output from the tilt angle sensor 70 to the acquisition unit 28C based on a fixing command to generate fixed data.

When the bucket 8 rotates about the bucket shaft J3, the tilt pin 80 (the tilt shaft J4) is also rotated (inclined) in the θY direction. The tilt angle acquisition unit 285C acquires the tilt shaft angle data indicating the inclination angle ϵ of the tilt shaft J4 in relation to the XY plane based on the detection result of the angle detection device 22.

The storage unit 28B of the sensor controller 32 stores work machine data. The work machine data includes dimension data of the work machine 2 and the shape data of the bucket 8.

The dimension data of the work machine 2 includes the dimension data of the boom 6, the dimension data of the arm 7, and the dimension data of the bucket 8. The dimension data of the work machine 2 includes a boom length L1, an arm length L2, a bucket length L3, and a tilt length L4. The boom length L1, the arm length L2, the bucket length L3, and the tilt length L4 are dimensions in the XZ plane (the vertical rotation plane).

The work machine data acquisition unit 281C acquires the dimension data of the work machine 2, including the dimension data of the boom 6, the dimension data of the arm 7, and the dimension data of the bucket 8, from the storage unit 28B.

The shape data of the bucket 8 includes outline data of the outer surface of the bucket 8. The shape data of the bucket 8 is data for specifying the dimensions and the shape of the bucket 8. The shape data of the bucket 8 includes distal end position data indicating the position of the distal end 8a of the bucket 8. The shape data of the bucket 8 includes coordinate data of a plurality of positions of the outer surface of the bucket 8 based on the distal end 8a, for example.

The shape data of the bucket 8 includes a dimension L5 of the bucket 8 in relation to the width direction of the bucket 8. When the bucket 8 is not tilted, the width dimension L5 of the bucket 8 is the dimension of the bucket 8 in the Y-axis direction of the local coordinate system. When the bucket 8 is tilted, the width dimension L5 of the bucket 8 is different from the dimension of the bucket 8 in relation to the Y-axis direction of the local coordinate system.

The bucket shape data acquisition unit 282C acquires the shape data of the bucket 8 from the storage unit 28B.

In the present embodiment, both the work machine dimension data including the boom length L1, the arm length L2, the bucket length L3, the tilt length L4, and the bucket width L5 and the bucket shape data including the shape data of the bucket 8 are stored in the storage unit 28B.

The work machine angle calculation unit 281A calculates work machine angle data indicating the rotation angles of the respective work machines from the respective cylinder strokes of the boom 6, the arm 7, and the bucket 8.

The tilt angle calculation unit 282A acquires the tilt shaft angle ϵ' and the tilt angle δ' which is the tilt angle data indicating the rotation angle of the bucket about the tilt shaft from the tilt angle δ, the tilt shaft angle ϵ, and the inclination angles θ1 and θ2.

The data fixed by the fixing unit 28D is the tilt angle data calculated by the tilt angle data calculation unit 282A.

The 2-dimensional bucket data calculation unit 283A generates 2-dimensional bucket data S indicating the outer shape of the bucket 8 in a working plane MP described later and the cutting edge position Pa of the cutting edge 8a of the bucket 8 based on the work machine angle data, the work machine dimension data, the bucket shape data, the Y coordinate of a cross-section represented by the Y coordinate of the working plane MP, and the tilt angle data indicating the rotation angle of the bucket about the tilt shaft.

The target excavation landform acquisition unit 283C acquires target construction information T indicating a 3-dimensional designed landform which is a 3-dimensional target shape of an excavation object and acquires the vehicle body position data P and the vehicle body attitude data Q from the position detection device 20. The target excavation landform calculation unit 284A generates target excavation landform data U indicating the target excavation landform which is a 2-dimensional target shape of an excavation object in the working plane MP orthogonal to the bucket shaft J3 from the data acquired from the target excavation landform acquisition unit 283C, the inclination angles θ1 and θ2 acquired from the 2-dimensional bucket data calculation unit 283A, the 2-dimensional bucket data S indicating the outer shape of the bucket 8, and the cutting edge 8a of the bucket 8.

The relative position calculation unit 260A calculates a relative position on the bucket 8 at which the distance on an outline point Ni (described later) of the bucket 8 to the target excavation landform is the shortest based on the rotation angle data α to γ of the respective work machines input from the sensor controller 32, the 2-dimensional bucket data S, and the target excavation landform data U input from the display controller 28 and outputs the relative position to the distance calculation unit 260B. The distance calculation unit 260B calculates the shortest distance d between the target excavation landform and the bucket 8 based on the relative position of the bucket 8 and the target excavation landform.

The target speed calculation unit 260C receives the pressure of the pilot pressure sensors 66A and 66B based on the lever operations of respective work machine levers (described later). The target speed calculation unit 260C derives target speeds Vc_bm, Vc_am, and Vc_bk of the respective work machines using a table that defines the relation of the target speeds of the respective work machines with respect to the pressure stored in the storage unit 27C by the pressure sensors 66A and 66B and outputs the target speeds to the intervention speed calculation unit 260D.

The intervention speed calculation unit 260D calculates a speed limit corresponding to the distance d between the relative position of the bucket 8 and the target excavation landform based on the target speeds of the respective work machines, the distance d between the target excavation landform data U and the bucket 8. The speed limit is output to the intervention command calculation unit 260E as an intervention speed of the boom work machine.

The intervention command calculation unit 260E determines an intervention command corresponding to the speed limit for extending the boom cylinder 10. The intervention command calculation unit 260E outputs the intervention command so as to open the control valve 27C so that the pilot pressure is generated in the control valve 27C. The boom 6 is driven according to the command from the work machine controller 28 so that the speed in the direction in which the work machine 2 approaches the target excavation landform is the speed limit. In this way, the limited excavation control on the cutting edge 8a is executed, and the speed of the bucket 8 in relation to the target excavation landform is adjusted.

Moreover, the display controller 28 displays the target excavation landform on the display unit 29 based on the target excavation landform data U. Moreover, the display controller 28 displays the target excavation landform data U and the 2-dimensional bucket data S on the display unit 29. The display unit 29 is a monitor, for example, and displays various types of information on the excavator CM. In the present embodiment, the display unit 29 includes a human machine interface (HMI) monitor as a guidance monitor for information-oriented construction.

The display controller 28 can calculate the local coordinate position when seen in the global coordinate system based on the detection result of the position detection device 20. The local coordinate system is a 3-dimensional coordinate system based on an excavator 100. In the present embodiment, the reference position P0 of the local coordinate system is the reference position P0 positioned at the revolution center AX of the revolving structure 3, for example. For example, although the target excavation landform data output to the work machine controller 26 is converted into a local coordinate, calculations in the display controller 28 are performed in the global coordinate system. The input from the sensor controller 32 is also converted into a global coordinate system in the display controller 28.

During the driving of the work machine 2, the boom angle α, the arm angle β, and the bucket angle γ are detected by the angle detection device 22. The tilt angle δ is detected by the tilt angle sensor 70. Moreover, the tilt shaft angle ε is detected by the angle detection device 22.

Moreover, the acquisition unit 28C acquires the dimension data of the work machine 2, including the boom length L1, the arm length L2, the bucket length L3, the tilt length L4, and the width dimension L5 of the bucket 8, from the work machine data stored in the storage unit 28B. The work machine data including the dimension data of the work machine 2 may be supplied to the acquisition unit 28C (the work machine data acquisition unit 281C) via the input unit 36.

Moreover, the acquisition unit 28C (the bucket shape data acquisition unit 282C) acquires the shape data of the bucket 8. The shape data of the bucket 8 may be stored in the storage unit 28B, and may be acquired by the acquisition unit 28C (the bucket shape data acquisition unit 282C) via the input unit 36.

Moreover, the acquisition unit 28C acquires the vehicle body position data P and the vehicle body attitude data Q based on the position detection result of the position detection device 20. The acquisition unit 28C acquires these items of data in realtime during the driving of the excavator CM.

Moreover, the acquisition unit 28C (the target excavation landform acquisition unit 283C) acquires target construction information (3-dimensional designed landform data) T indicating a 3-dimensional designed landform which is a 3-dimensional target shape of an excavation object of a work area. The target construction information T includes target excavation landform data (2-dimensional designed landform data) U indicating a target excavation landform which is a 2-dimensional target shape of an excavation object. In the present embodiment, the target construction information T is stored in the storage unit 28B of the display controller 28. The target construction information T includes coordinate data and angle data required for generating the target excavation landform data U. The target construction information T may be supplied to the display controller 28 via a radio communication device, for example and may be supplied to the display controller 28 via an external memory or the like.

As described above, in the present embodiment, the tilt angle sensor 70 detects the tilt angle in the global coordinate system. In the display controller 28, the tilt angle in the global coordinate system is converted into the tilt angle δ in the local coordinate system based on the vehicle body attitude data Q. The tilt angle δ may be calculated by calculating the attitude information of the IMU and the retraction information of the tilt cylinder 30 according to the same method as the respective work machines and calculating the inclination angle.

Subsequently, in the present embodiment, the target excavation landform data U indicating the target excavation landform which is a 2-dimensional target shape of an excavation object in the working plane MP orthogonal to the bucket shaft J3 is designated (step SP2). The designation of the target excavation landform data U includes designating a cross-section of the target construction information T parallel to the XZ plane. The designation of the target excavation landform data U includes designating the position (Y coordinate) in the Y-axis direction at which the target construction information T is cut along a cross-section. The target construction information T on the cross-section parallel to the XZ plane having the Y coordinate is the designated target excavation landform data U.

Figure 18:
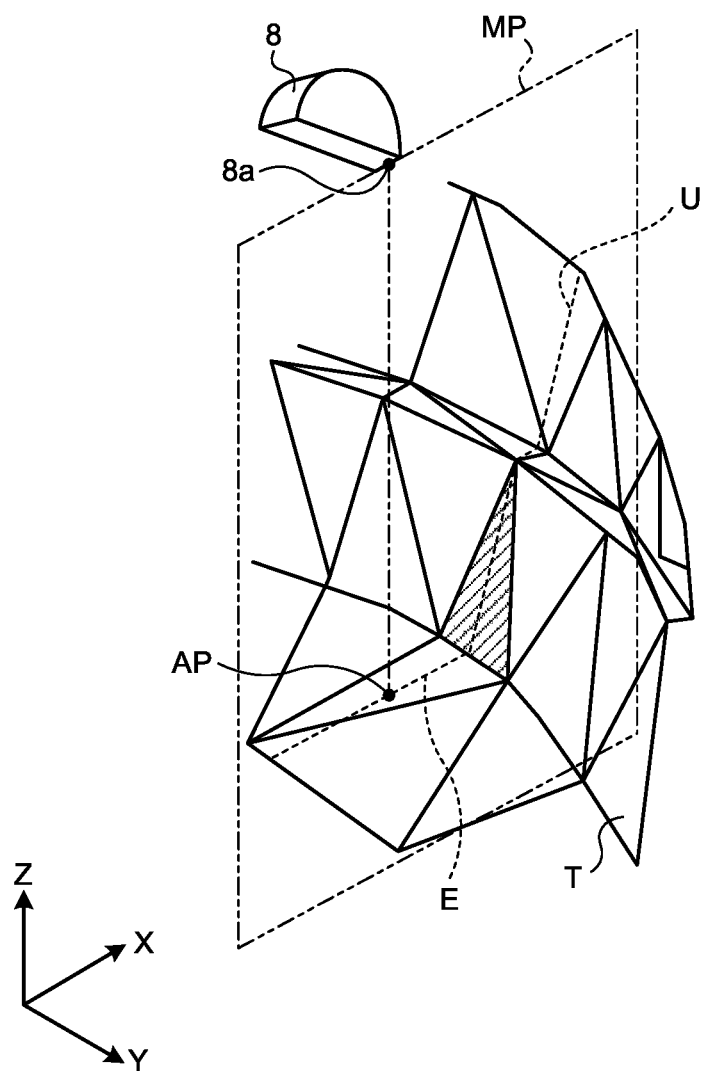
FIG. 18 is a diagram for describing an example of limited excavation control.

As illustrated in FIG. 18, the target construction information T is represented by a plurality of triangular polygons. In the target construction information T, the working plane MP orthogonal to the bucket shaft J3 is designated. The working plane MP is a working plane (vertical rotation plane) of the work machine 2 defined in the front-rear direction of the revolving structure 3. In the present embodiment, the working plane MP is the working plane of the arm 6. The working plane MP is parallel to the XZ plane.

The position (the Y coordinate of the working plane MP) of the cutting edge 8a of the bucket 8 may be designated by an operator. For example, the operator may input data on the Y coordinate designated by the input unit 36. The designated Y coordinate is acquired by the acquisition unit 28C. The acquisition unit 28C calculates the cross-section of the target construction information T in the working plane MP having the Y coordinate. In this way, the target excavation landform calculation unit 283C acquires the target excavation landform data U of the designated Y coordinate.

The Y coordinate of a point on the surface of the target construction information at which the distance to the bucket 8 is the shortest may be designated as the Y coordinate of the working plane MP.

For example, the display controller 28 acquires a nodal line E between the working plane MP and the target construction information as a candidate line of the target excavation landform based on the target construction information T and the designated working plane MP as illustrated in FIG. 18.

The display controller 28 sets a point of the candidate line of the target excavation landform located immediately below the cutting edge 8a as a reference point AP of the target excavation landform. The display controller 28 determines a single or a plurality of inflection points appearing before and after the reference point AP of the target excavation landform and lines appearing before and after the inflection points as the target excavation landform which serves as an excavation object. The display controller 28 generates the target excavation landform data U in the working plane MP.

Subsequently, the calculation unit 28A (the 2-dimensional bucket data calculation unit 283A) of the sensor controller 32 calculates the 2-dimensional bucket data S indicating the outer shape of the bucket 8 in the working plane MP based on the parameters (data) acquired in step SP1 (step SP3).

Figure 19:
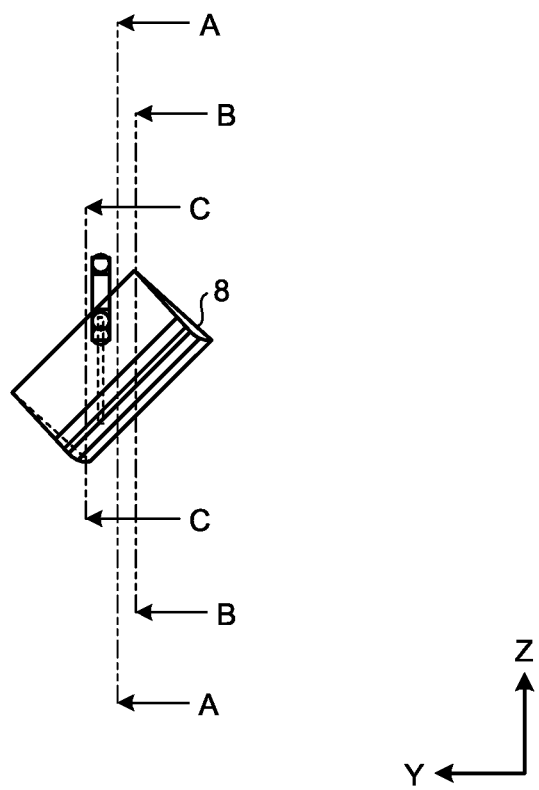
FIG. 19 is a diagram schematically illustrating an example of a bucket.
Figure 20:
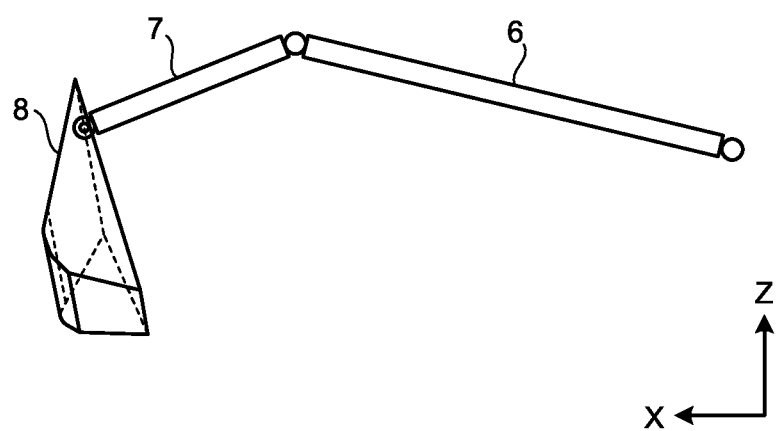
FIG. 20 is a diagram schematically illustrating an example of a bucket.
Figure 21:
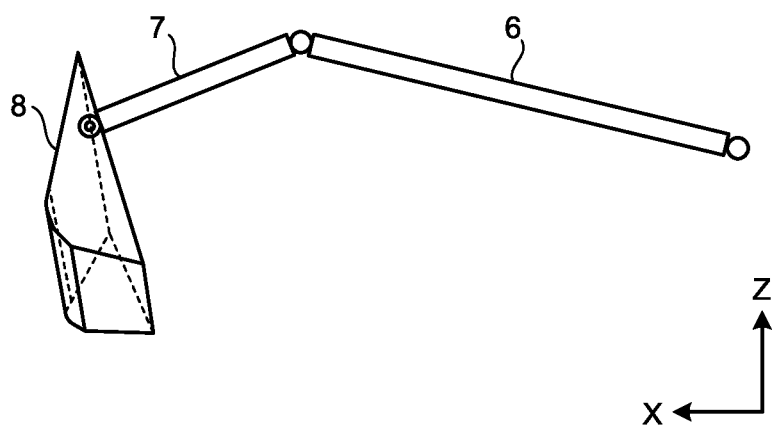
FIG. 21 is a diagram schematically illustrating an example of a bucket.
Figure 22:
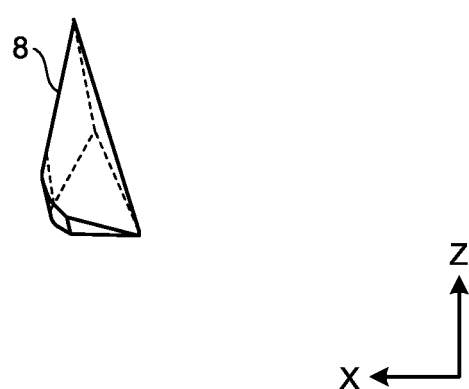
FIG. 22 is a diagram schematically illustrating an example of a bucket.

FIG. 19 is a rear view schematically illustrating an example of the bucket 8 in a tilted state. FIG. 20 is a side sectional view taken along the line A-A in FIG. 19. FIG. 21 is a side sectional view taken along the line B-B in FIG. 19. FIG. 22 is a side sectional view taken along the line C-C in FIG. 19.

In the present embodiment, since the bucket 8 is tilted, the outer shape (outline) of the bucket 8 in the XZ plane changes according to the tilt angle δ. Moreover, as illustrated in FIGS. 20, 21, and 22, when the Y coordinates of the cross-sections parallel to the XZ plane are different, the outer shapes (outlines) of the bucket 8 in the respective cross-sections are different. Moreover, when the bucket 8 is tilted, the distance between the target excavation landform and the bucket 8 changes.

In a bucket (a so-called standard bucket) having no tilting mechanism, even when the Y coordinate of the cross-section parallel to the XZ plane changes, the outer shapes (outlines) of the bucket 8 in the respective cross-sections are substantially the same. However, in the case of a tilt bucket, the outer shape of the bucket 8 in the cross-section parallel to the XZ plane changes according to the Y coordinate and the tilt (tilt angle δ) of the bucket 8. Due to this, when the bucket 8 is tilted, the distance between the target excavation landform and the bucket 8 and the outer shape of the bucket 8 may change and at least a portion of the bucket 8 may dig into the target excavation landform. Thus, unless the shape (cross-sectional shape in the XZ plane) of the bucket 8 for realizing limited excavation control is specified, it may be difficult to perform the limited excavation control with high accuracy.

In the present embodiment, the sensor controller 32 (2-dimensional bucket calculation unit 283A) calculates the 2-dimensional bucket data S indicating the outer shape of the cross-section of the bucket 8 along the working plane MP which serves as a control object. The work machine control unit 26A of the work machine controller 26 derives the distance d between the target excavation landform and the bucket 8 based on the 2-dimensional bucket data S and the 2-dimensional designed landform data U along the working plane MP (step SP4) and performs limited excavation control of the work machine 2 (step SP5). Moreover, as will be described later, the sensor controller 32 displays the target excavation landform and the like on the display unit 29 (step SP6). In this way, the control object is specified based on the working plane MP and the limited excavation control is performed with high accuracy.

Figure 23:
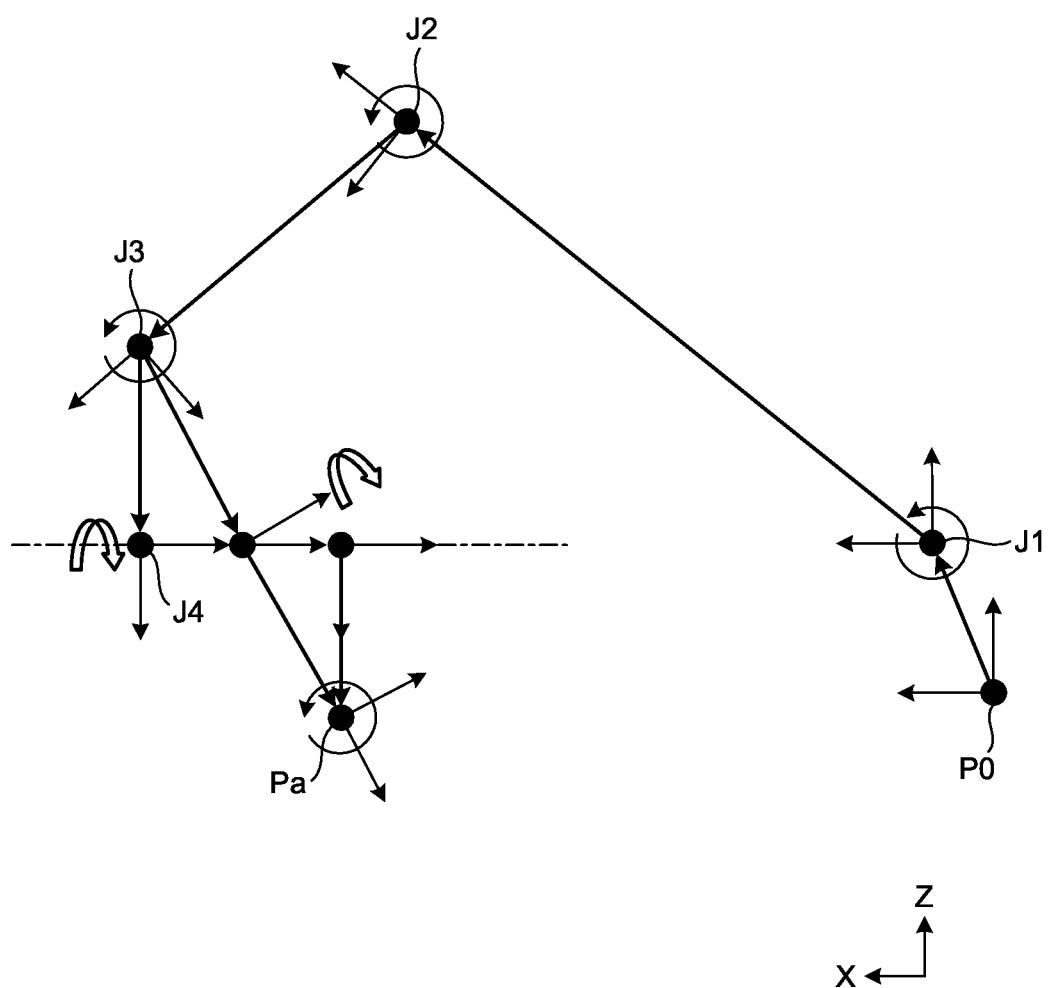
FIG. 23 is a diagram schematically illustrating an example of a work machine.

Hereinafter, an example of a method of deriving the 2-dimensional bucket data S will be described. FIG. 23 is a diagram schematically illustrating the work machine 2 according to the present embodiment. The origin of the local coordinate system is the reference position P0 positioned at the revolution center of the revolving structure 3. The position of the distal end 8a of the bucket 8 in the local coordinate system is Pa.

The work machine 2 includes a first joint that rotates about the boom shaft J1, a second joint that rotates about the arm shaft J2, a third joint that rotates about the bucket shaft J3, and a fourth joint that rotates about the tilt shaft J4. Moreover, as described above, the tilt shaft J4 is tilted in the θY direction with the rotation of the bucket 8 about the bucket shaft J3. The movements of the respective joints can be expressed by Expressions (1) to (6) below. Expression (1) is an expression for performing coordinate conversion between the origin (the reference position) P0 and the boom foot. Expression (2) is an expression for performing coordinate conversion between the boom foot and the boom top. Expression (3) is an expression for performing coordinate conversion between the boom top and the arm top. Expression (4) is an expression for performing coordinate conversion between the arm top and one end of the tilt shaft J4. Expression (5) is an expression for performing coordinate conversion between one end and the other end of the tilt shaft J4. Expression (6) is an expression for performing coordinate conversion between the other end of the tilt shaft J4 and the bucket 8.

$$T_{local}^{boom\text{-}foot} = \begin{pmatrix} 1 & 0 & 0 & x_{boom\text{-}foot} \\ 0 & 1 & 0 & y_{boom\text{-}foot} \\ 0 & 0 & 1 & z_{boom\text{-}foot} \\ 0 & 0 & 0 & 1 \end{pmatrix} \quad (1)$$

$$T_{boom\text{-}foot}^{boom\text{-}top} = \begin{pmatrix} \cos\theta_{boom} & 0 & \sin\theta_{boom} & 0 \\ 0 & 1 & 0 & 0 \\ -\sin\theta_{boom} & 0 & \cos\theta_{boom} & 0 \\ 0 & 0 & 0 & 1 \end{pmatrix} \begin{pmatrix} 1 & 0 & 0 & 0 \\ 0 & 1 & 0 & 0 \\ 0 & 0 & 1 & L_{boom} \\ 0 & 0 & 0 & 1 \end{pmatrix} \quad (2)$$

-continued $$T^{arm\text{-}top}_{boom\text{-}top} = \begin{pmatrix} \cos\theta_{arm} & 0 & \sin\theta_{arm} & 0 \\ 0 & 1 & 0 & 0 \\ -\sin\theta_{arm} & 0 & \cos\theta_{arm} & 0 \\ 0 & 0 & 0 & 1 \end{pmatrix} \begin{pmatrix} 1 & 0 & 0 & 0 \\ 0 & 1 & 0 & 0 \\ 0 & 0 & 1 & L_{arm} \\ 0 & 0 & 0 & 1 \end{pmatrix} \quad (3)$$

$$T^{tilt\_A}_{arm\text{-}top} = \quad (4)$$
$$\begin{pmatrix} \cos(\theta_{bucket} + \theta_{tilt\_y}) & 0 & \sin(\theta_{bucket} + \theta_{tilt\_y}) & 0 \\ 0 & 1 & 0 & 0 \\ -\sin(\theta_{bucket} + \theta_{tilt\_y}) & 0 & \cos(\theta_{bucket} + \theta_{tilt\_y}) & 0 \\ 0 & 0 & 0 & 1 \end{pmatrix} \begin{pmatrix} 1 & 0 & 0 & 0 \\ 0 & 1 & 0 & 0 \\ 0 & 0 & 1 & L_{tilt} \\ 0 & 0 & 0 & 1 \end{pmatrix}$$

$$T^{tilt\_B}_{tilt\_A} = \begin{pmatrix} 1 & 0 & 0 & 0 \\ 0 & \cos\theta_{tilt\_x} & -\sin\theta_{tilt\_x} & 0 \\ 0 & \sin\theta_{tilt\_x} & \cos\theta_{tilt\_x} & 0 \\ 0 & 0 & 0 & 1 \end{pmatrix} \begin{pmatrix} 1 & 0 & 0 & -L_{tilt\_x} \\ 0 & 1 & 0 & 0 \\ 0 & 0 & 1 & 0 \\ 0 & 0 & 0 & 1 \end{pmatrix} \quad (5)$$

$$T^{bucket}_{tilt\_B} = \quad (6)$$
$$\begin{pmatrix} 1 & 0 & 0 & 0 \\ 0 & 1 & 0 & 0 \\ 0 & 0 & 1 & L_{bucket\_corrected} \\ 0 & 0 & 0 & 1 \end{pmatrix} \begin{pmatrix} \cos(-\theta_{tilt\_y}) & 0 & \sin(-\theta_{tilt\_y}) & 0 \\ 0 & 1 & 0 & 0 \\ -\sin(-\theta_{tilt\_y}) & 0 & \cos(-\theta_{tilt\_y}) & 0 \\ 0 & 0 & 0 & 1 \end{pmatrix}$$

In Expressions (1) to (6), xboom-foot, yboom-foot, and zboom-foot are the coordinates of the boom foot in the local coordinate system. Lboom corresponds to the boom length L1. Larm corresponds to the arm length L2. Lbucket_corrected is a corrected bucket length illustrated in FIG. 2. Ltilt corresponds to the tilt length L4. θboom corresponds to the boom angle α. θarm corresponds to the arm angle β. θbucket corresponds to the bucket angle γ. θtilt_x corresponds to the tilt angle δ. θtilt_y is the angle illustrated in FIG. 2.

Thus, the coordinates (xarm-top, yarm-top, and zarm-top) of the arm top in relation to the origin of the local coordinate system are derived from Expression (7) below.

$$\begin{pmatrix} x_{arm\text{-}top} \\ y_{arm\text{-}top} \\ z_{arm\text{-}top} \\ 1 \end{pmatrix} = T^{arm\text{-}top}_{local} \begin{pmatrix} 0 \\ 0 \\ 0 \\ 1 \end{pmatrix} \quad (7)$$

where, $$T^{arm\text{-}top}_{local} = T^{boom\text{-}foot}_{local} T^{boom\text{-}top}_{boom\text{-}foot} T^{arm\text{-}top}_{boom\text{-}top}$$

here

Figure 24:
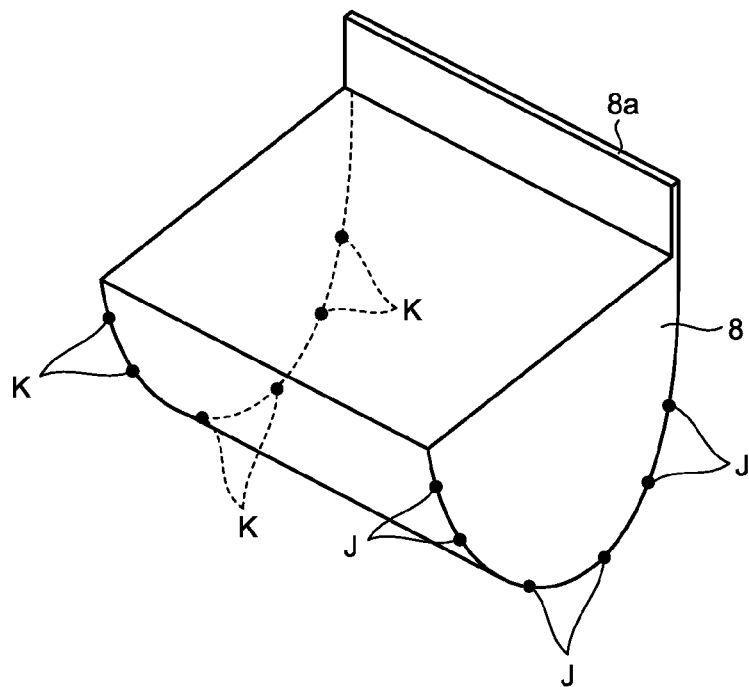
FIG. 24 is a diagram schematically illustrating an example of a bucket.

The shape data of the bucket 8 includes the cutting edge 8a of the bucket 8 and the coordinate data of a plurality of positions (points) of the outer surface of the bucket 8. In the present embodiment, as illustrated in FIG. 24, the shape data of the bucket 8 includes first outline data of the outer surface of the bucket 8 at one end in the width direction of the bucket 8 and second outline data of the outer surface of the bucket 8 at the other end. The first outline data includes the coordinates of six outline points J at one end of the bucket 8. The second outline data includes the coordinates of six outline points K at the other end of the bucket 8. The coordinates of the outline points J and the coordinates of the outline points K are the coordinate (position Pa) of the distal end 8a and reference coordinate data. Due to the shape data of the bucket 8, the positional relation between the coordinate of the distal end 8a, the coordinates of the outline points J, and the coordinates of the outline points K is known. Thus, by calculating the positional relation between the origin of the local coordinate system and the coordinate of the distal end 8a, the coordinates of the outline points J and the outline points K in relation to the origin of the local coordinate system can be calculated.

When the shape data (the coordinates of the outline) of the bucket 8 is (xbucket-outline, ybucket-outline, zbucket-outline), the coordinate of the outline points of the bucket 8 are derived from Expression (8) below.

$$\begin{pmatrix} x_n \\ y_n \\ z_n \\ 1 \end{pmatrix} = T^{tooth}_{local} \begin{pmatrix} x_{bucket\text{-}outline} \\ y_{bucket\text{-}outline} \\ z_{bucket\text{-}outline} \\ 1 \end{pmatrix} \quad (8)$$

where, $$T^{tooth}_{local} = T^{boom\text{-}foot}_{local} T^{boom\text{-}top}_{boom\text{-}foot} T^{arm\text{-}top}_{boom\text{-}top} T^{tilt\_A}_{arm\text{-}top} T^{tilt\_B}_{tilt\_A} T^{bucket}_{tilt\_B}$$

here

In the present embodiment, the number of outline points J and K is 12. When the coordinates of the outline points J and K of the shape data of the bucket 8 are (x1, y1, z1), (x2, y2, z2), . . . , and (x12, y12, z12), the coordinates (x1', y1', z1'), (x2', y2', z2'), . . . , and (x12', y12', z12') of the outline points J and K of the bucket 8 in relation to the origin are derived from Expression (9) below.

$$\begin{pmatrix} x'_1 & x'_2 & \ldots & x'_{12} \\ y'_1 & y'_2 & \ldots & y'_{12} \\ z'_1 & z'_2 & \ldots & z'_{12} \\ 1 & 1 & \ldots & 1 \end{pmatrix} = T^{bucket}_{local} \begin{pmatrix} x_1 & x_2 & \ldots & x_{12} \\ y_1 & y_2 & \ldots & y_{12} \\ z_1 & z_2 & \ldots & z_{12} \\ 1 & 1 & \ldots & 1 \end{pmatrix} \quad (9)$$

After the coordinates of the plurality of outline points J and K are calculated based on the work machine angle data, the work machine dimension data, the shape data of the bucket 8, and the tilt angle data, the calculation unit 28A calculates the 2-dimensional bucket data S indicating the outer shape of the bucket 8 in the working plane MP.

Figure 25:
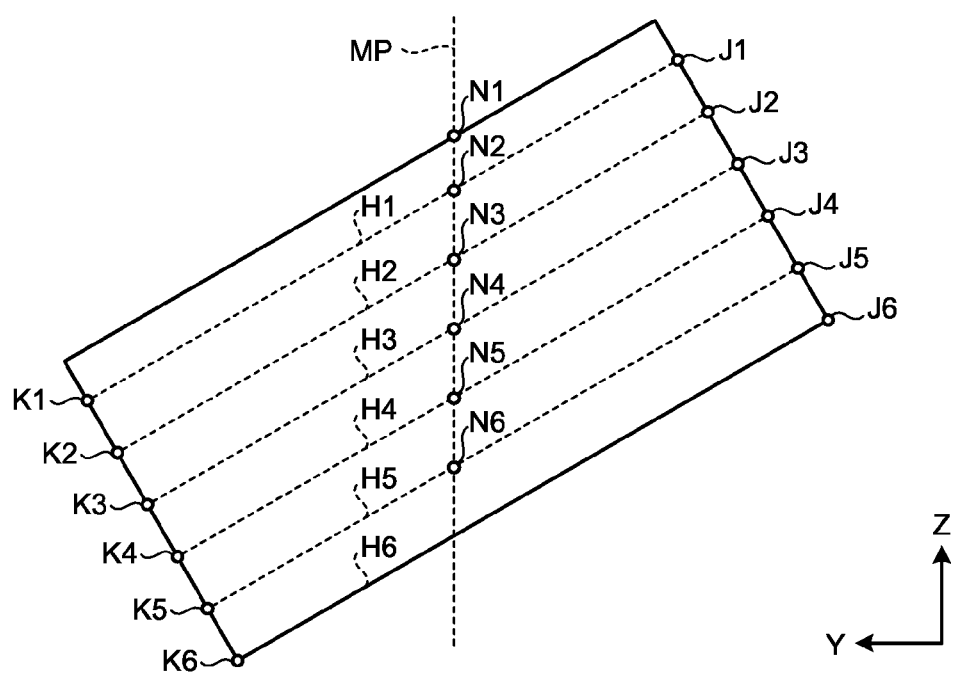
FIG. 25 is a schematic diagram for describing an example of a method of controlling a construction machine.

FIG. 25 is a diagram schematically illustrating the relation between the outline points J and K and the working plane MP. As described above, when the coordinates of the plurality of outline points Ji (i=1, 2, 3, 4, 5, 6) and the plurality of outline points Ki (i=1, 2, 3, 4, 5, 6) in the local coordinate system are calculated, the lines Hi (i=1, 2, 3, 4, 5, 6) connecting the outline points Li and Ki are calculated. Moreover, the position (Y coordinate) of the working plane MP in the direction parallel to the bucket shaft J3 is designated in step SP2. Thus, the calculation unit 28A (the 2-dimensional bucket data calculation unit 283A) can calculate the 2-dimensional bucket data S indicating the outer shape of the bucket 8 in the working plane MP based on the nodal points Ni (i=1, 2, 3, 4, 5, 6) between the working plane MP and the lines Hi. In this way, in the present embodiment, the calculation unit 28A can calculate the 2-dimensional bucket data S including the plurality of outline points (nodal points) Ni based on the first outline point data including the coordinate data of the plurality of outline points Ji in the local coordinate system, the second outline point data including the coordinate data of the plurality of outline points Ki in the local coordinate system, and the position of the working plane MP in relation to the Y-axis direction parallel to the bucket shaft J3.

The above-described method of deriving the coordinates of the outline points Ji and Ki in the local coordinate system is an example. The 2-dimensional bucket data S may be calculated by calculating the coordinates of the outline points Ji and Ki in the local coordinate system when the work machine 2 is driven based on the work machine angle data including the boom angle α, the arm angle β, and the bucket angle γ, the work machine dimension data including the boom length L1, the arm length L2, the bucket length L3, and the tilt length L4, the shape data of the bucket 8 including the width dimension L5 of the bucket 8, the coordinate data of the outline points Ji and Ki, and the tilt angle data indicating the tilt angle δ. A change in the coordinates of the outline points J and K associated with a change in the tilt shaft angle ε can be uniquely calculated based on the bucket angle γ and the tilt length L4.

For example, the coordinate of the cutting edge 8a in the local coordinate system of the bucket 8 having no tilting mechanism can be derived from the dimensions of the work machine 2 (the dimensions of the boom 6, the dimensions of the arm 7, and the dimensions of the bucket 8) and the work machine angles (the rotation angle α, the rotation angle β, and the rotation angle γ). After the coordinate of the cutting edge 8 of the bucket 8 or the coordinate of the arm top is calculated, the outline points Ji, the outline points Ki, and the 2-dimensional bucket data S may be calculated based on the tilt length L4, the width dimension L5, the tilt angle δ, and the shape data of the bucket 8 by referring to the coordinate.

The 2-dimensional bucket data S indicates the present position of the bucket 8 in the local coordinate system. That is, the 2-dimensional bucket data S includes the bucket position data indicating the present position of the bucket 8 in the working plane MP. The 2-dimensional bucket data S is output from the display controller 28 to the work machine controller 26. The work machine control unit 26A of the work machine controller 26 controls the work machine 2 based on the 2-dimensional bucket data S (step SP5).

The work machine controller 26 acquires the 2-dimensional bucket data S and the target excavation landform data U from the display controller 28. The work machine control unit 26A of the work machine controller 26 limits the speed of the boom 6 so that the speed at which the bucket 8 approaches the target excavation landform decreases according to the distance d between the bucket 8 and the target excavation landform in the working plane MP based on the target excavation landform data U and the 2-dimensional bucket data S including the bucket position data. The work machine control unit 26A determines a speed limit according to the distance between the bucket 8 and the target excavation landform based on the target excavation landform data U and the 2-dimensional bucket data including the bucket position data and controls the work machine 2 so that the speed at which the work machine 2 approaches the target excavation landform is equal to or smaller than the speed limit.

Figure 26:
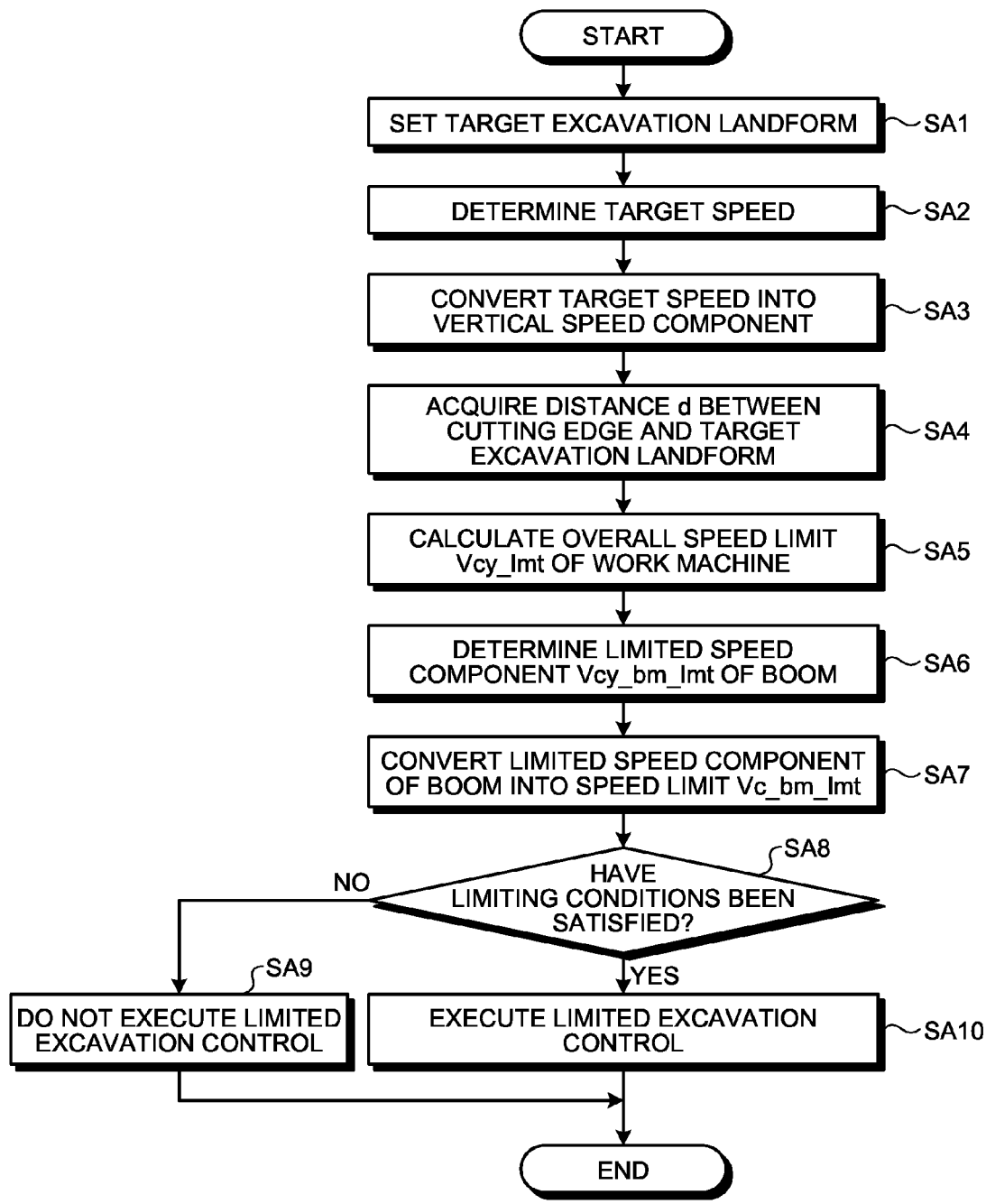
FIG. 26 is a flowchart illustrating an example of limited excavation control.

Next, an example of limited excavation control according to the present embodiment will be described with reference to the flowchart of FIG. 26 and the schematic diagrams of FIGS. 27 to 34. FIG. 26 is a flowchart illustrating an example of limited excavation control according to the present embodiment.

As described above, the target excavation landform is set (step SA1). After the target excavation landform is set, the work machine controller 26 determines the target speed Vc of the work machine 2 (step SA2). The target speed Vc of the work machine 2 includes a boom target speed Vc_bm, an arm target speed Vc_am, and a bucket target speed Vc_bkt. The boom target speed Vc_bm is the speed of the cutting edge 8a when the boom cylinder 10 only is driven. The arm target speed Vc_am is the speed of the cutting edge 8a when the arm cylinder 11 only is driven. The bucket target speed Vc_bkt is the speed of the cutting edge 8a when the bucket cylinder 12 only is driven. The boom target speed Vc_bm is calculated based on the amount of boom operation. The arm target speed Vc_am is calculated based on the amount of arm operation. The bucket target speed Vc_bkt is calculated based on the amount of bucket operation.

Target speed information that defines the relation between the boom target speed Vc_bm and the pilot pressure acquired from the pressure sensor 66A or 66B corresponding to the amount of boom operation is stored in a storage unit of the work machine controller 26. The work machine controller 26 determines the boom target speed Vc_bm corresponding to the amount of boom operation based on the target speed information. The target speed information is a map in which the magnitude of the boom target speed Vc_bm corresponding to the amount of boom operation, for example, is described. The target speed information may be in the form of a table, a numerical expression, or the like. The target speed information includes information that defines the relation between the arm target speed Vc_am and the pilot pressure acquired from the pressure sensor 66A or 66B corresponding to the amount of arm operation. The target speed information includes information that defines the relation between the bucket target speed Vc_bkt and the pilot pressure acquired from the pressure sensor 66A or 66B corresponding to the amount of bucket operation. The work machine controller 26 determines the arm target speed Vc_am corresponding to the amount of arm operation based on the target speed information. The work machine controller 26 determines the bucket target speed Vc_bkt corresponding to the amount of bucket operation based on the target speed information.

Figure 27:
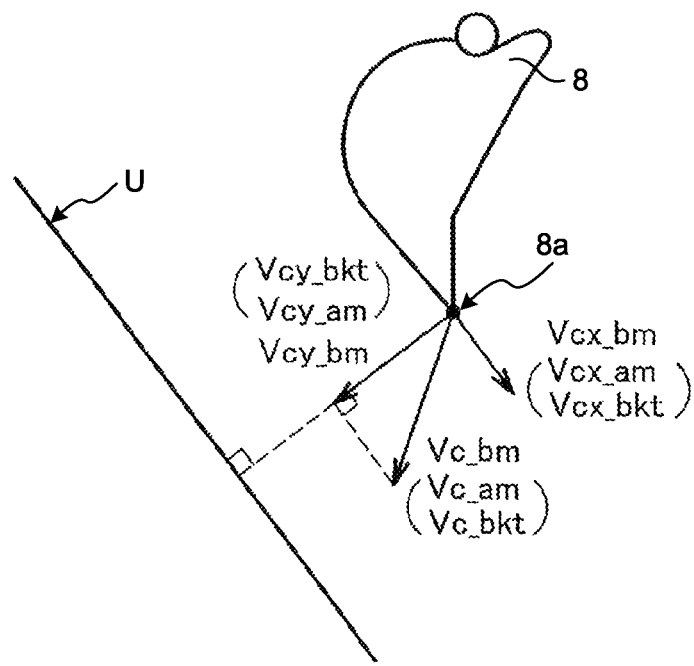
FIG. 27 is a diagram for describing an example of limited excavation control.

As illustrated in FIG. 27, the work machine controller 26 converts the boom target speed Vc_bm into a speed component (vertical speed component) Vcy_bm in the direction vertical to the surface of the target excavation landform and a speed component (horizontal speed component) Vcx_bm in the direction parallel to the surface of the target excavation landform (step SA3).

The work machine controller 26 calculates an inclination of the vertical axis (the revolution axis AX of the revolving structure 3) of the local coordinate system with respect to the vertical axis of the global coordinate system and an inclination in the vertical direction of the surface of the target excavation landform with respect to the vertical axis of the global coordinate system from the reference position data P, the target excavation landform, and the like. The work machine controller 26 calculates an angle β1 indicating the inclination between the vertical axis of the local coordinate system and the vertical direction of the surface of the target excavation landform from these inclinations.

Figure 28:
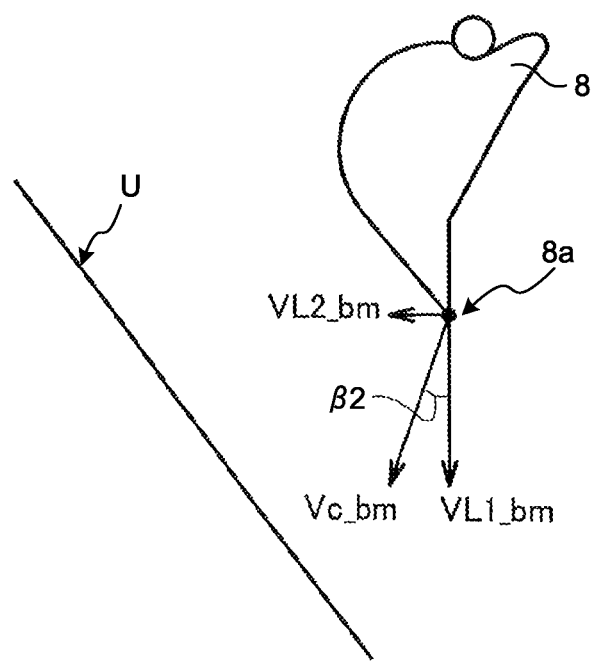
FIG. 28 is a diagram for describing an example of limited excavation control.
Figure 29:
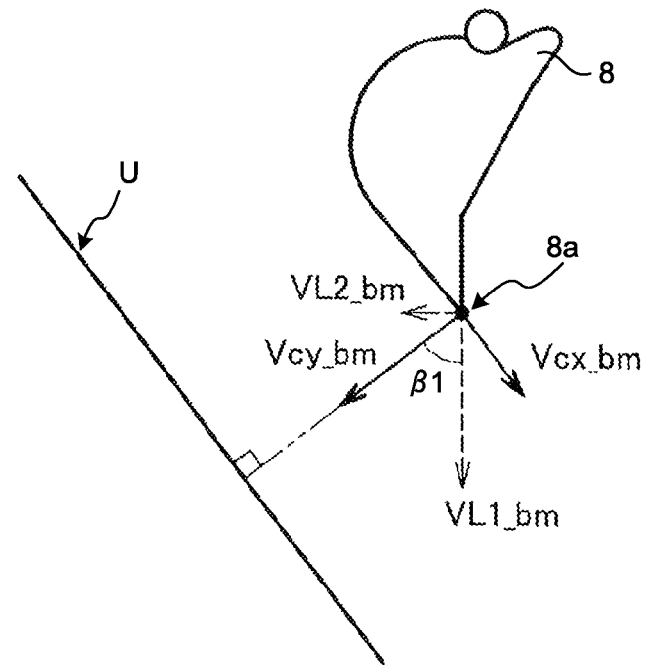
FIG. 29 is a diagram for describing an example of limited excavation control.

As illustrated in FIG. 28, the work machine controller 26 converts the boom target speed Vc_bm into a speed component VL1_bm in the vertical axis direction of the local coordinate system and a speed component VL2_bm in the horizontal axis direction according to the theorem of trigonometric function from an angle β2 between the vertical axis of the local coordinate system and the direction of the boom target speed Vc_bm.

As illustrated in FIG. 9, the work machine controller 26 converts the speed component $VL1\_bm$ in the vertical axis direction of the local coordinate system and the speed component $VL2\_bm$ in the horizontal axis direction into a vertical speed component $Vcy\_bm$ and a horizontal speed component $Vcx\_bm$ with respect to the target excavation landform according to the theorem of trigonometric function from the inclination $\beta1$ between the vertical axis of the local coordinate system and the vertical direction of the surface of the target excavation landform. Similarly, the work machine controller 26 converts the arm target speed $Vc\_am$ into a vertical speed component $Vcy\_am$ and a horizontal speed component $Vcx\_am$ in the vertical axis direction of the local coordinate system. The work machine controller 26 converts the bucket target speed $Vc\_bkt$ into a vertical speed component $Vcy\_bkt$ and a horizontal speed component $Vcx\_bkt$ in the vertical axis direction of the local coordinate system.

Figure 30:
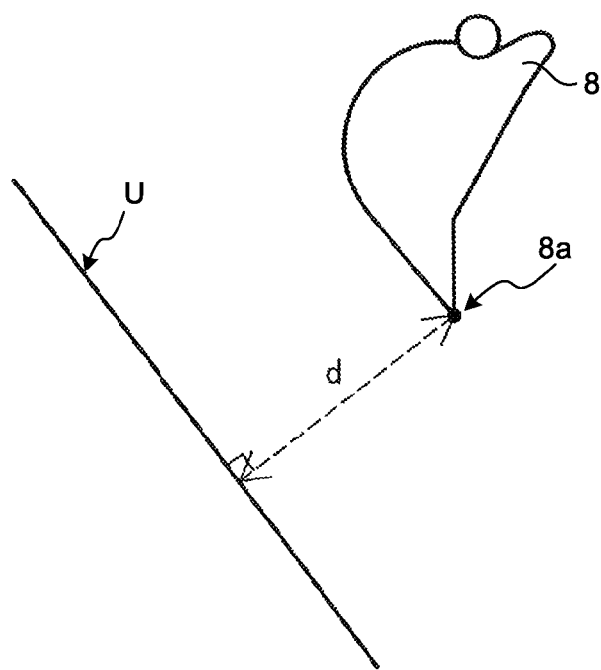
FIG. 30 is a diagram for describing an example of limited excavation control.

As illustrated in FIG. 30, the work machine controller 26 acquires the distance d between the cutting edge 8a of the bucket 8 and the target excavation landform (step SA4). The work machine controller 26 calculates the shortest distance d between the surface of the target excavation landform and the cutting edge 8a of the bucket 8 from the position information of the cutting edge 8a, the target excavation landform, and the like. In the present embodiment, the limited excavation control is executed based on the shortest distance d between the surface of the target excavation landform and the cutting edge 8a of the bucket 8.

The work machine controller 26 calculates an overall speed limit $Vcy\_lmt$ of the work machine 2 based on the distance d between the surface of the target excavation landform and the cutting edge 8a of the bucket 8 (step SA5). The overall speed limit $Vcy\_lmt$ of the work machine 2 is an allowable moving speed of the cutting edge 8a in the direction in which the cutting edge 8a of the bucket 8 approaches the target excavation landform. Speed limit information that defines the relation between the distance d and the speed limit $Vcy\_lmt$ is stored in the storage unit of the work machine controller 26.

Figure 31:
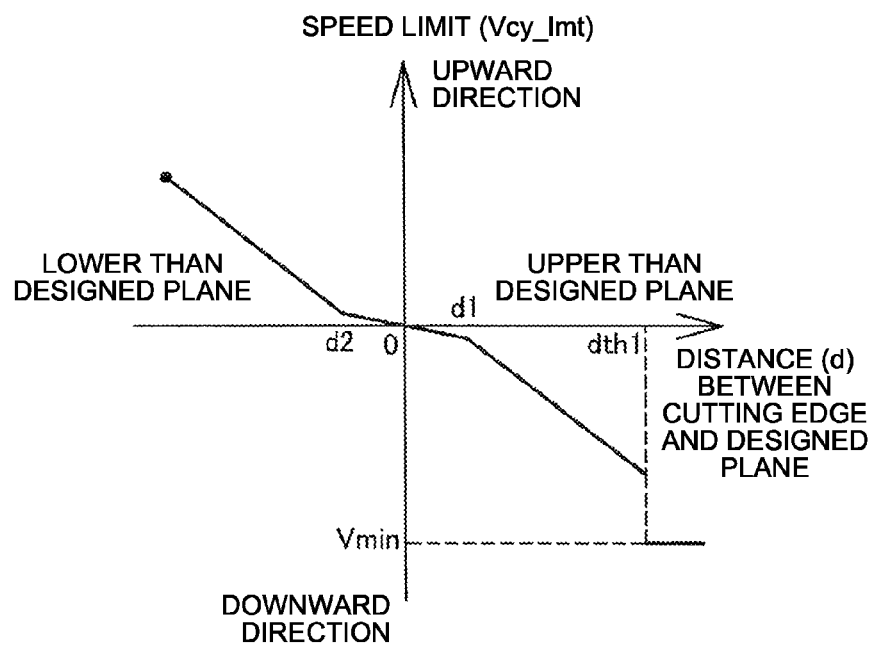
FIG. 31 is a diagram for describing an example of limited excavation control.
Figure 32:
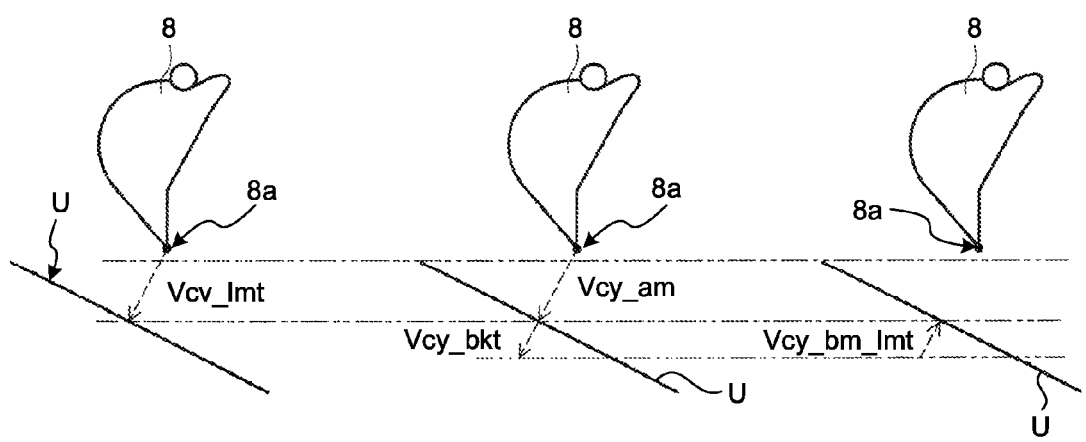
FIG. 32 is a diagram for describing an example of limited excavation control.

FIG. 31 illustrates an example of the speed limit information according to the present embodiment. In the present embodiment, the distance d has a positive value when the cutting edge 8a is positioned on the outer side of the surface of the target excavation landform (that is, on the side close to the work machine 2 of the excavator 100), and the distance d has a negative value when the cutting edge 8a is positioned on the inner side of the surface of the target excavation landform (that is, on the inner side of the excavation object than the target excavation landform). As illustrated in FIG. 30, the distance d has a positive value when the cutting edge 8a is positioned above the surface of the target excavation landform. The distance d has a negative value when the cutting edge 8a is positioned under the surface of the target excavation landform. Moreover, the distance d has a positive value when the cutting edge 8a is positioned at such a position that the cutting edge 8a does not dig into the target excavation landform. The distance d has a negative value when the cutting edge 8a is positioned at such a position that the cutting edge 8a digs into the target excavation landform. The distance d is 0 when the cutting edge 8a is positioned on the target excavation landform (that is, when the cutting edge 8a is in contact with the target excavation landform).

In the present embodiment, the speed has a positive value when the cutting edge 8a moves from the inner side of the target excavation landform toward the outer side, and the speed has a negative value when the cutting edge 8a moves from the outer side of the target excavation landform toward the inner side. That is, the speed has a positive value when the cutting edge 8a moves toward the upper side of the target excavation landform, and the speed has a negative value when the cutting edge 8a moves toward the lower side of the target excavation landform.

In the speed limit information, an inclination of the speed limit $Vcy\_lmt$ when the distance d is between d1 and d2 is smaller than an inclination when the distance d is equal to or larger than d1 or equal to or smaller than d2. d1 is larger than 0. d2 is smaller than 0. In operations near the surface of the target excavation landform, in order to set the speed limit more accurately, the inclination when the distance d is between d1 and d2 is smaller than the inclination when the distance d is equal to or larger than d1 or equal to or smaller than d2. The speed limit $Vcy\_lmt$ has a negative value when the distance d is equal to or larger than d1, and the larger the distance d, the smaller the speed limit $Vcy\_lmt$. That is, when the distance d is equal to or larger than d1, the farther the cutting edge 8a above the target excavation landform from the surface of the target excavation landform, the larger the speed of moving toward the lower side of the target excavation landform and the larger the absolute value of the speed limit $Vcy\_lmt$. When the distance d is equal to or smaller than 0, the speed limit $Vcy\_lmt$ has a positive value, and the smaller the distance d, the larger the speed limit $Vcy\_lmt$. That is, when the distance d of the cutting edge 8a of the bucket 8 from the target excavation landform is equal to or smaller than 0, the farther the cutting edge 8a on the lower side of the target excavation landform from the target excavation landform, the larger the speed of moving toward the upper side of the target excavation landform, and the larger the absolute value of the speed limit $Vcy\_lmt$.

When the distance d is equal to or larger than a predetermined value dth1, the speed limit $Vcy\_lmt$ is Vmin. The predetermined value dth1 is a positive value and is larger than d1. Vmin is smaller than a smallest value of the target speed. That is, when the distance d is equal to or larger than the predetermined value dth1, the operation of the work machine 2 is not limited. Thus, when the cutting edge 8a is separated greatly from the target excavation landform on the upper side of the target excavation landform, the operation of the work machine 2 is not limited (that is, the limited excavation control is not performed). When the distance d is smaller than the predetermined value dth1, the operation of the work machine 2 is limited. When the distance d is smaller than the predetermined value dth1, the operation of the boom 6 is limited.

The work machine controller 26 calculates a vertical speed component (limited vertical speed component) $Vcy\_bm\_lmt$ of the speed limit of the boom 6 from the overall speed limit $Vcy\_lmt$ of the work machine 2, the arm target speed $Vc\_am$, and the bucket target speed $Vc\_bkt$ (step SA6).

As illustrated in FIG. 12, the work machine controller 26 calculates the limited vertical speed component $Vcy\_bm\_lmt$ of the boom 6 by subtracting the vertical speed component $Vcy\_am$ of the arm target speed and the vertical speed component $Vcy\_bkt$ of the bucket target speed from the overall speed limit $Vcy\_lmt$ of the work machine 2.

Figure 33:
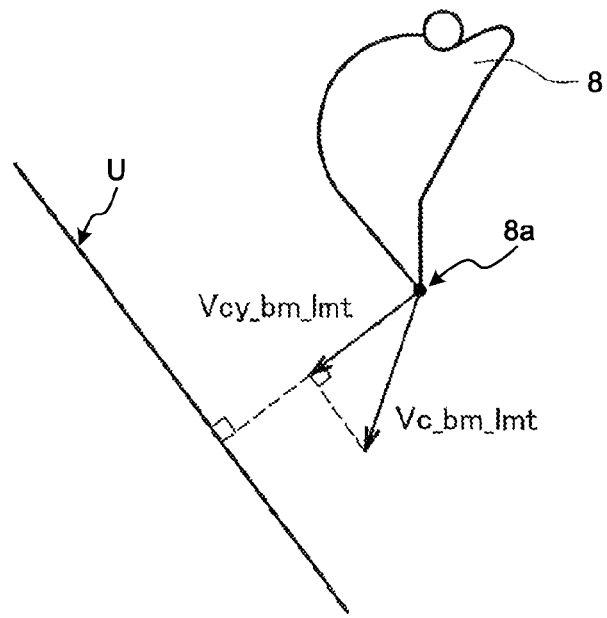
FIG. 33 is a diagram for describing an example of limited excavation control.

As illustrated in FIG. 33, the work machine controller 26 converts the limited vertical speed component $Vcy\_bm\_lmt$ of the boom 6 into a speed limit (boom speed limit) $Vc\_bm\_lmt$ (step SA7). The work machine controller 26 obtains a relation between a direction vertical to the surface of the target excavation landform and the direction of the boom speed limit $Vc\_bm\_lmt$ from a rotation angle $\alpha$ of the boom 6, a rotation angle β of the arm 7, a rotation angle of the bucket 8, vehicle body position data P, the target excavation landform, and the like and converts the limited vertical speed component Vcy_bm_lmt of the boom 6 into a boom speed limit Vc_bm_lmt. This calculation is performed in a reverse order to that of the calculation of calculating the vertical speed component Vcy_bm in the direction vertical to the surface of the target excavation landform from the boom target speed Vc_bm. After that, a cylinder speed corresponding to a boom intervention amount is determined, and a release command corresponding to the cylinder speed is output to the control valve 27C.

The pilot pressure based on the lever operation is filled in an oil passage 43B and the pilot pressure based on boom intervention is filled in an oil passage 43C. A shuttle valve 51 selects the oil passage having the larger pressure (step SA8).

For example, when the boom 6 is lowered, and the magnitude of the boom speed limit Vc_bm_lmt in the downward direction of the boom 6 is smaller than the magnitude of the boom target speed Vc_bm in the downward direction, limiting conditions are satisfied. Moreover, when the boom 6 is raised, and the magnitude of the boom speed limit Vc_bm_lmt in the upward direction of the boom 6 is larger than the magnitude of the boom target speed Vc_bm in the upward direction, the limiting conditions are satisfied.

The work machine controller 26 controls the work machine 2. When controlling the boom 6, the work machine controller 26 controls the boom cylinder 10 by transmitting a boom command signal to the control valve 27C. The boom command signal has a current value corresponding to a boom command speed. If necessary, the work machine controller 26 controls the arm 7 and the bucket 8. The work machine controller 26 controls the arm cylinder 11 by transmitting an arm command signal to the control valve 27. The arm command signal has a current value corresponding to the arm command speed. The work machine controller 26 controls the bucket cylinder 12 by transmitting a bucket command signal to the control valve 27. The bucket command signal has a current value corresponding to the bucket command speed.

When the limiting conditions are not satisfied, the shuttle valve 51 selects the supply of operating oil from the oil passage 43B, and a normal operation is performed (step SA9). The work machine controller 26 operates the boom cylinder 10, the arm cylinder 11, and the bucket cylinder 12 according to the amount of boom operation, the amount of arm operation, and the amount of bucket operation, respectively. The boom cylinder 10 operates at the boom target speed Vc_bm. The arm cylinder 11 operates at the arm target speed Vc_am. The bucket cylinder 12 operates at the bucket target speed Vc_bkt.

When the limiting conditions are satisfied, the shuttle valve 51 selects the supply of operating oil from the oil passage 43C, and the limited excavation control is executed (step SA10).

The limited vertical speed component Vcy_bm_lmt of the boom 6 is calculated by subtracting the vertical speed component Vcy_am of the arm target speed and the vertical speed component Vcy_bkt of the bucket target speed from the overall speed limit Vcy_lmt of the work machine 2. Thus, when the overall speed limit Vcy_lmt of the work machine 2 is smaller than the sum of the vertical speed component Vcy_am of the arm target speed and the vertical speed component Vcy_bkt of the bucket target speed, the limited vertical speed component Vcy_bm_lmt of the boom 6 has a negative value, in which case the boom is raised.

Thus, the boom speed limit Vc_bm_lmt has a negative value. In this case, the work machine controller 27 lowers the boom 6 at a speed lower than the boom target speed Vc_bm. Thus, it is possible to prevent the bucket 8 from digging into the target excavation landform while suppressing the sense of incongruity the operator might feel.

When the overall speed limit Vcy_lmt of the work machine 2 is larger than the sum of the vertical speed component Vcy_am of the arm target speed and the vertical speed component Vcy_bkt of the bucket target speed, the limited vertical speed component Vcy_bm_lmt of the boom 6 has a positive value. Thus, the boom speed limit Vc_bm_lmt has a positive value. In this case, even when the operating device 25 is operated in a direction where the boom 6 is lowered, the work machine controller 26 raises the boom 6. Thus, it is possible to quickly suppress expansion of a digged area of the target excavation landform.

When the cutting edge 8a is positioned above the target excavation landform, the closer the cutting edge 8a approaches the target excavation landform, the smaller the absolute value of the limited vertical speed component Vcy_bm_lmt of the boom 6, and the smaller the absolute value of the speed component (limited horizontal speed component) Vcx_bm_lmt of the speed limit of the boom 6 in the direction parallel to the surface of the target excavation landform. Thus, when the cutting edge 8a is positioned above the target excavation landform, the closer the cutting edge 8a approaches the target excavation landform, the more the speed of the boom 6 in the direction vertical to the surface of the target excavation landform and the speed of the boom 6 in the direction parallel to the surface of the target excavation landform are decelerated. When the left operating lever 25L and the right operating lever 25R are operated simultaneously by the operator of the excavator 100, the boom 6, the arm 7, and the bucket 8 are operated simultaneously. In this case, the above-described control when target speeds Vc_bm, Vc_am, and Vc_bkt of the boom 6, the arm 7, and the bucket 8 are input will be described below.

Figure 34:
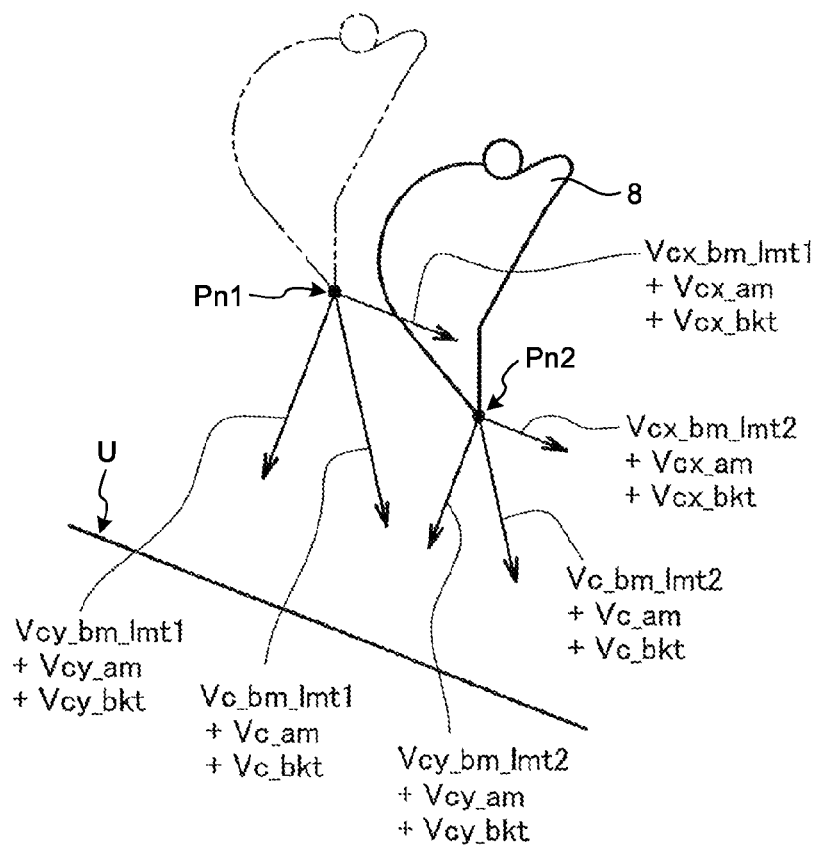
FIG. 34 is a diagram for describing an example of limited excavation control.

FIG. 34 illustrates an example of a change in the speed limit of the boom 6 when the distance d between the target excavation landform and the cutting edge 8a of the bucket 8 is smaller than the predetermined value dth1 and the cutting edge 8a of the bucket 8 moves from the position Pn1 to the position Pn2. The distance between the cutting edge 8a and the target excavation landform at the position Pn2 is smaller than the distance between the cutting edge 8a and the target excavation landform at the position Pn1. Due to this, the limited vertical speed component Vcy_bm_lmt2 of the boom 6 at the position Pn2 is smaller than the limited vertical speed component Vcy_bm_lmt1 of the boom 6 at the position Pn1. Thus, the boom speed limit Vc_bm_lmt2 at the position Pn2 is smaller than the boom speed limit Vc_bm_lmt1 at the position Pn1. Moreover, the limited horizontal speed component Vcx_bm_lmt2 of the boom 6 at the position Pn2 is smaller than the limited horizontal speed component Vcx_bm_lmt1 of the boom 6 at the position Pn1. However, in this case, the arm target speed Vc_am and the bucket target speed Vc_bkt are not limited. Due to this, the vertical speed component Vcy_am and the horizontal speed component Vcx_am of the arm target speed and the vertical speed component Vcy_bkt and the horizontal speed component Vcx_bkt of the bucket target speed are not limited.

As described above, since no limitation is applied to the arm 7, a change in the amount of arm operation corresponding to the operator's intention to excavate is reflected as a change in the speed of the cutting edge 8a of the bucket 8. Thus, the present embodiment can suppress the sense of incongruity during the excavation operation of the operator while suppressing expansion of a digged area of the target excavation landform.

In this manner, in the present embodiment, the work machine controller 26 limits the speed of the boom 6 based on the target excavation landform indicating the designed landform which is a target shape of an excavation object and the cutting edge position data S indicating the position of the cutting edge 8a of the bucket 8 so that a relative speed at which the bucket 8 approaches the target excavation landform decreases according to the distance d between the target excavation landform and the cutting edge 8a of the bucket 8. The work machine controller 26 determines the speed limit according to the distance d between the target excavation landform and the cutting edge 8a of the bucket 8 based on the target excavation landform indicating the designed landform which is a target shape of an excavation object and the cutting edge position data S indicating the position of the cutting edge 8a of the bucket 8 and controls the work machine 2 so that the speed in the direction in which the work machine 2 approaches the target excavation landform is equal to or smaller than the speed limit. In this way, limited excavation control on the cutting edge 8a is executed, and the position of the cutting edge 8a in relation to the target excavation landform is automatically adjusted.

In the limited excavation control (intervention control), a control signal is output to the control valve 27 connected to the boom cylinder 10 and the position of the boom 6 is controlled so that digging of the cutting edge 8a into the target excavation landform is suppressed. The intervention control is executed when the relative speed Wa is larger than the speed limit V. The intervention control is not executed when the relative speed Wa is smaller than the speed limit V. The fact that the relative speed Wa is smaller than the speed limit V includes the fact that the bucket 8 moves in relation to the target excavation landform so that the bucket 8 is separated from the target excavation landform.

Figure 35:
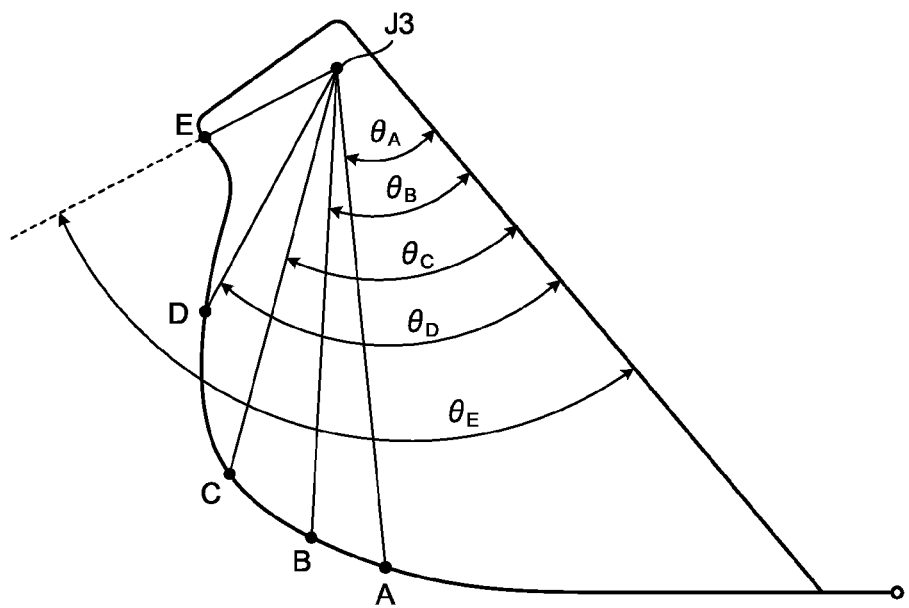
FIG. 35 is a schematic diagram for describing an example of a method of controlling a construction machine.

In the present embodiment, the 2-dimensional bucket data S may be used for deriving the relative position between the bucket 8 and the target excavation landform and the 2-dimensional bucket data S of which the coordinate is converted from the local coordinate system to a polar coordinate system may be used for control of the work machine 2. For example, as illustrated in FIG. 35, the arm top (bucket shaft J3) may be the origin of the polar coordinate system and a plurality of outline points A, B, C, D, and E of the bucket 8 in the working plane MP may be represented by the distance to the origin and the angles θA, θB, θC, θD, and θE with respect to a reference line. The reference line may be a line connecting the bucket shaft J3 and the distal end 8a of the bucket 8. By using the polar coordinate system, the target excavation landform, the distal end 8a of the bucket 8, and the outline of the cross-section of the bucket 8 in the working plane MP when the bucket 8 is tilted can be calculated properly, the distance between the target excavation landform and the distal end 8a of the bucket 8 can be calculated accurately, and the accuracy of excavation control can be secured.

As described above, in the present embodiment, the tilt angle sensor 70 detects the tilt angle of the bucket 8 with respect to the horizontal plane in the global coordinate system. The tilt angle sensor 70 is disposed in the bucket 8, and when the bucket 8 is inclined with respect to the horizontal plane, the tilt angle sensor 70 outputs tilt angle data corresponding to the inclination angle to the acquisition unit 28C.

Figure 36:
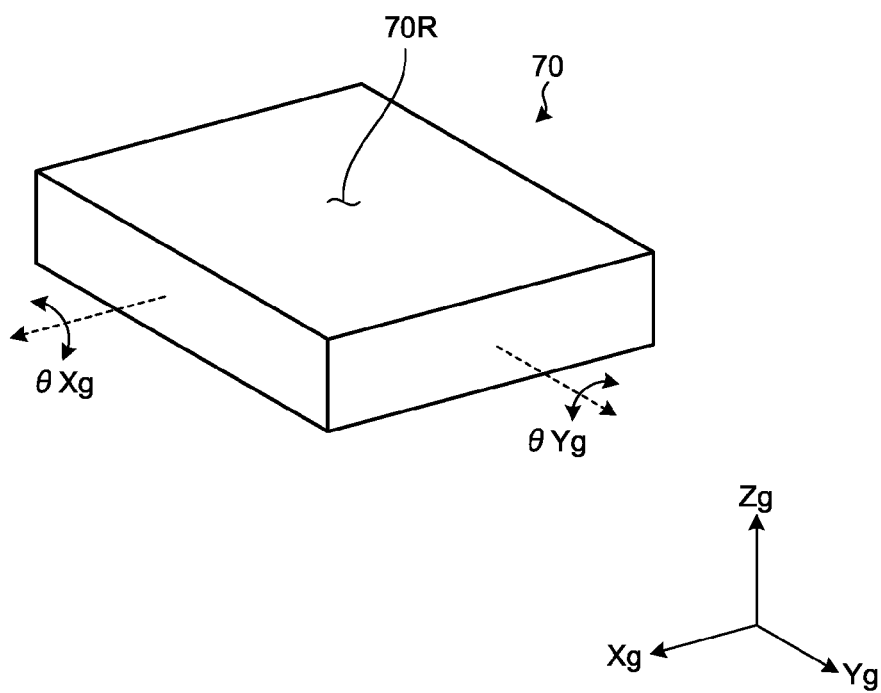
FIG. 36 is a schematic diagram illustrating an example of a tilt angle sensor.

FIG. 36 is a schematic diagram for describing the principle of the tilt angle sensor 70 according to the present embodiment. As illustrated in FIG. 36, the tilt angle sensor 70 detects the tilt angle (rotation angle and inclination angle) with respect to the horizontal plane (XgYg plane) in the global coordinate system. That is, the tilt angle sensor 37 is a biaxial angle sensor that detects inclination angles in relation to the two θXg and θYg directions. The tilt angle sensor 70 has a reference surface 70R and detects an inclination angle of the reference surface 70R with respect to the horizontal plane.

The bucket 8 has an installation surface which is located near the tilt pin and on which the tilt angle sensor 70 is provided. When the installation surface of the bucket 8 is parallel to the horizontal plane, the bucket 8 is in an initial attitude (horizontal attitude). When the bucket 8 is in an initial attitude, the tilt angle sensor 70 is provided on the installation surface of the bucket 8 so that the reference surface 70R is parallel to the horizontal plane (installation surface).

In a state where the reference surface 70R and the horizontal plane are parallel to each other, the detection accuracy of the tilt angle sensor 70 detecting the inclination angle is highest. In a state where the reference surface 70R and the horizontal plane are orthogonal to each other, the detection accuracy of the tilt angle sensor 70 detecting the inclination angle is lowest. That is, the detection accuracy of the tilt angle sensor 70 increases when the reference surface 70R is horizontal and the detection accuracy of the tilt angle sensor 70 decreases when the reference surface 70R is vertical.

Thus, when the attitude of the bucket 8 provided in the tilt angle sensor 70 changes, the detection accuracy of the tilt angle sensor 70 changes. For example, when the bucket 8 in the initial attitude rotates about the tilt shaft J4, the detection accuracy of the tilt angle sensor 70 provided in the bucket 8 may decrease. Moreover, when the attitude of the bucket 8 changes due to the raising operation or the lowering operation of at least one of the boom 6 and the bucket 7, the detection accuracy of the tilt angle sensor 70 provided in the bucket 8 may decrease. For example, when the work machine 2 is extended and the angle of the reference surface 70R approaches the vertical direction, the detection accuracy of the tilt angle sensor 70 decreases.

Moreover, the bucket 8 rotates about the tilt shaft J4 with the driving of the tilt cylinder 30. The bucket 8 is inclined in relation to the horizontal plane according to the raising operation or the lowering operation of at least one of the boom 6 and the arm 7 as well as the driving of the tilt cylinder 30. Due to this, even when the tilt cylinder 30 is not driven, the tilt angle sensor 70 outputs the tilt angle data based on the raising operation or the lowering operation of at least one of the boom 6 and the arm 7 to the acquisition unit 28C.

In this manner, the tilt angle data output from the tilt angle sensor 70 includes a tilt angle component based on the raising operation or the lowering operation of at least one of the boom 6 and the arm 7 as well as a tilt angle component corresponding to the stroke length of the tilt cylinder 30. Due to this, it may be difficult to acquire accurate tilt angle data based on the driving of the tilt cylinder 30 using the tilt angle sensor 70.

As described above, the tilt angle sensor 70 is a biaxial (θXg and θYg direction) angle sensor in relation to the horizontal plane, and may not be possible to detect an accurate tilt angle depending on the attitude of the bucket 8, for example, when the angle of the reference surface 70R of the tilt angle sensor 70 approaches the vertical direction of the global coordinate system. That is, it may be difficult to secure dynamic detection accuracy of the tilt angle sensor 70 based on the driving of the work machine 2 and static detection accuracy of the tilt angle sensor 70 based on the attitude of the bucket 8, and to output an accurate detection result.

As a result, when limited excavation control is executed based on the tilt angle data (monitor data) acquired in realtime from the tilt angle sensor 70, limited excavation control may be performed based on the tilt angle data output from the tilt angle sensor 70 having decreased detection accuracy and the excavation accuracy may decrease.

In the present embodiment, the detection value of the tilt angle sensor 70 can be fixed according to a fixing command. In this way, according to an operation of an operator, the tilt angle data output from the tilt angle sensor 70 to the acquisition unit 28C is fixed when the detection accuracy of the tilt angle sensor 70 is high (when the angle of the reference surface 70R approaches the horizontal direction), and the fixed data is determined. After that, the work machine 2 is controlled based on the fixed data. In this way, even when the work machine 2 is driven or the attitude of the bucket 8 changes after that, it is possible to prevent limited excavation control from being performed based on the tilt angle data output from the tilt angle sensor 70 having decreased detection accuracy.

In the present embodiment, a fixing command for fixing the tilt angle data is output to at least one of the work machine controller 26 and the sensor controller 32. When the fixing command is output, the tilt angle data is fixed and the fixed data is generated.

The control of the work machine 2 based on the fixed data is performed until the fixing command is disabled. The work machine control unit 26A controls the work machine 2 based on the fixed data until the fixing command is disabled. The fixing command is disabled when a fixing disable command is output. When the fixing command is disabled, the tilt angle data is output in realtime from the tilt angle sensor 70 to the work machine controller 26 and the sensor controller 32. After the fixing command is disabled, the work machine 2 is controlled based on the tilt angle data output from the tilt angle sensor 70.

The fixing command is output to the fixing unit 28D so that the work machine 2 is controlled based on the fixed data in at least a portion of the period where the limited excavation control is performed. In the present embodiment, the fixing command is output to the fixing unit 28D at the start of limited excavation control and is disabled at the end of the limited excavation control.

In the present embodiment, the limited excavation control period includes at least one of a period where a limited excavation control mode is set and a limited excavation control state period.

The limited excavation control mode is set according to an operation of the input unit 36. In the present embodiment, the input unit 36 includes a button (excavation control mode switch button) for instructing whether limited excavation control is performed or not. When the excavation control mode switch button is operated by the operator, a command signal corresponding to at least one of the start and the end of the limited excavation control mode is output to the work machine controller 26. That is, according to the operation of the input unit 36, at least one of a start command and an end command for the limited excavation control mode is output to the work machine controller 26. The start time of the limited excavation control mode is the time when the excavation control mode switch button is operated so that the limited excavation control mode starts. The ending time of the limited excavation control mode is the time when the excavation control mode switch button is operated so that the limited excavation control mode ends.

In the present embodiment, a fixing command is output according to an operation of the excavation control mode switch button for starting the limited excavation control. Moreover, a fixing disable command is output according to an operation of the excavation control mode switch button for ending the limited excavation control. That is, in the present embodiment, a limited excavation control mode start command includes the fixing command. A limited excavation control mode ending command includes the fixing disable command. When the fixing command is output, the fixing command is output to the fixing unit 28D and the tilt angle data when the fixing command is output to the fixing unit 28D is maintained (fixed).

The input unit 36 may include a dedicated button (tilt angle fixing button) capable of generating a command signal including a fixing disable command and a fixing command for fixing the tilt angle data. The command signal generated when the tilt angle fixing button is operated is output to the sensor controller for controlling the tilt angle sensor 70. For example, after the tilt angle fixing button is operated and the fixing command is output, the fixed data may be output from the tilt angle sensor 70 to the acquisition unit 28C.

The tilt angle fixing button may be operated and the fixing command may be output before the limited excavation control mode starts (before the excavation control mode switch button for starting the limited excavation control mode is operated). The tilt angle fixing button may be operated and the fixing command may be output when the limited excavation control mode starts (when the excavation control mode switch button for starting the limited excavation control mode is operated). The tilt angle fixing button may be operated and the fixing command may be output when the limited excavation control mode ends (when the excavation control mode switch button for ending the limited excavation control mode is operated). The tilt angle fixing button may be operated and the fixing command may be output after the limited excavation control mode ends (after the excavation control mode switch button for ending the limited excavation control mode is operated).

The limited excavation control state includes a state where the relative speed Wa of the cutting edge 8*a* exceeds the speed limit V. The start time of the limited excavation control state is the time when the relative speed Wa of the cutting edge 8*a* exceeds the speed limit V. The ending time of the excavation control state is the time when the relative speed Wa of the cutting edge 8*a* is equal to or smaller than the speed limit V.

The fixing command may be output from the work machine controller 26 to the fixing unit 28D at the start time of the limited excavation control state. The fixing disable command may be output from the work machine controller 26 to the fixing unit 28D at the ending time of the limited excavation control state.

In the excavation operation, when the input unit 36 is operated by the operator and the fixing command is output, the fixing unit 28D fixes the tilt angle data which is the monitor data of the tilt angle sensor 70 based on the fixing command to generate fixed data.

The calculation unit 28A calculates the bucket position data indicating the present position of the bucket 8 based on the fixed data, the work machine angle data, and the work machine dimension data. The work machine control unit 26A executes limited excavation control of limiting the speed of the boom 6 so that the speed at which the bucket 8 approaches the target excavation landform according to the distance between the bucket 8 and the target excavation landform based on the target excavation landform and the bucket position data calculated using the fixed data.

That is, according to the above-described example, the calculation unit 28A calculates the 2-dimensional bucket data S indicating the outer shape of the bucket 8 in the working plane MP including the bucket position data based on the work machine angle data, the work machine dimension data, the shape data of the bucket 8, and the fixed data, and the work machine control unit 28 controls the work machine 2 based on the 2-dimensional bucket data S.

In the present embodiment, the driving of the bucket 8 is inhibited in the limited excavation control state period. That is, in the limited excavation control, the rotation of the bucket 8 about the tilt shaft J4 is stopped. In the limited excavation control, the rotation of the bucket 8 about the bucket shaft J3 is not inhibited.

As described above, the work machine 2 includes the tilt cylinder 30 capable of driving the bucket 8, and the bucket 8 rotates about the tilt shaft J4 according to the operation of the tilt cylinder 30. In the present embodiment, in limited excavation control, the driving inhibiting unit 26B of the work machine controller 26 performs a driving inhibiting process so that the tilt cylinder 30 does not operated.

As described above, the tilt cylinder 30 is operated by the operating device 25 that includes the third operating lever 25P. The tilt cylinder 30 operates according to an operation signal output from the operating device 25. In the present embodiment, when an operation signal for operating the tilt cylinder 30 is output from the operating device 25, the driving inhibiting unit 26B disables the operation signal output from the operating device 25.

Figure 37:
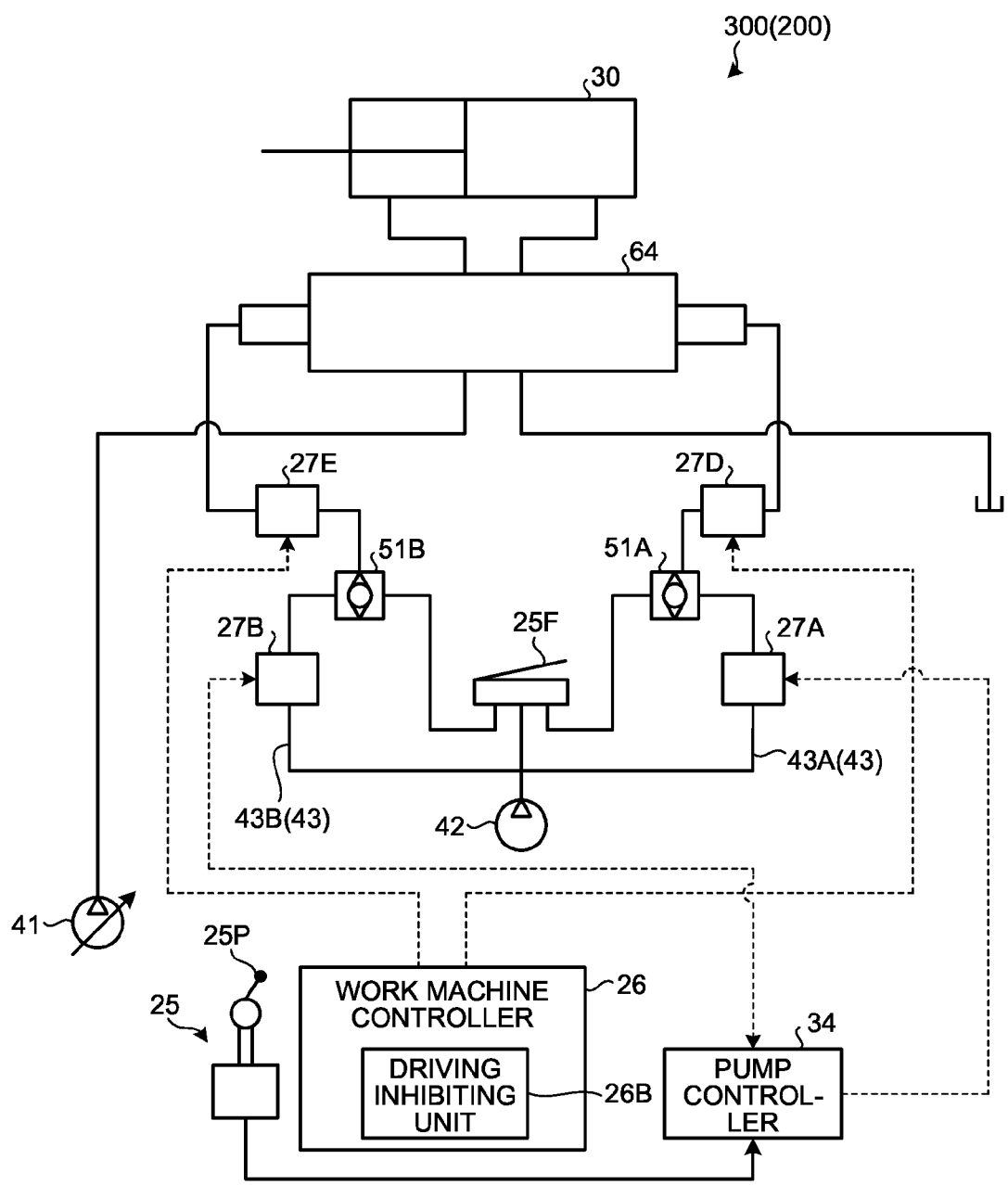
FIG. 37 is a diagram illustrating an example of a hydraulic system.

In the present embodiment, disabling the operation signal includes fixing the operation of the tilt cylinder 30 while maintaining the pilot pressure of the pilot pressure line 450. FIG. 37 is a diagram illustrating an example of the hydraulic system 300 according to the present embodiment.

As illustrated in FIG. 37, the hydraulic system 300 includes the direction control valve 64 capable of adjusting the amount of operating oil supplied to the tilt cylinder 30, the control valves 27D and 27E that adjust the pressure of the pilot oil supplied to the direction control valve 64, the operation pedal 25F, the pump controller 34, and the work machine controller 26.

The control valves 27D and 27E operate based on a control signal (driving inhibition signal) output from the driving inhibiting unit 26B of the work machine controller 26. The control valve 27D is disposed in an oil passage between the shuttle valve 51A and the direction control valve 64. The control valve 27E is disposed in an oil passage between the shuttle valve 51B and the direction control valve 64.

When a driving inhibiting process is performed, the driving inhibiting unit 26B of the work machine controller 26 outputs a driving inhibition signal based on a fixing command. Based on the driving inhibition signal output from the driving inhibiting unit 26B, a control signal is output to the control valves 27D and 27E so that the oil passage 43 (43A and 43B) is closed. In this way, the pilot pressure of the oil passage 43 (the pilot pressure line) is maintained to a constant value. Thus, the spool of the direction control valve 64 does not move. Thus, the tilt cylinder 30 does not operate and the driving of the bucket 8 is inhibited. That is, the rotation of the bucket 8 about the tilt shaft J4 is stopped (fixed).

The work machine 2 performs an excavation operation while maintaining the attitude of the bucket 8 in relation to the rotation direction about the tilt shaft J4 at the start time of the limited excavation control state. When the limited excavation control state ends (is disabled), the inhibition of the driving of the bucket 8 is disabled.

In the present embodiment, in the limited excavation control, the tilt angle data is fixed and fixed data is generated. Based on the fixed data, when the bucket 8 rotates about the tilt shaft J4 in the limited excavation control state period, the possibility of the bucket 8 digging into the target excavation landform increases. In the present embodiment, in the limited excavation control state, the position of the bucket 8 in relation to the rotation direction about the tilt shaft J4 as well as the tilt angle data are fixed. Due to this, a difference between the fixed data value and the actual tilt angle of the bucket 8 is decreased and excavation following the target excavation landform is possible.

The driving of the bucket 8 may be inhibited in the limited excavation control mode period as well as the limited excavation control state period.

In the limited excavation control, although the fixed data is generated, the driving of the bucket 8 may not be inhibited.

When the input unit 36 is operated by the operator in order to end the limited excavation control mode, a fixing disable command is output. In this way, the excavation operation ends. A fixing disabling means may be independent from inputting of the input unit 36 for ending the excavation control mode.

[Display Unit]

Figure 38:
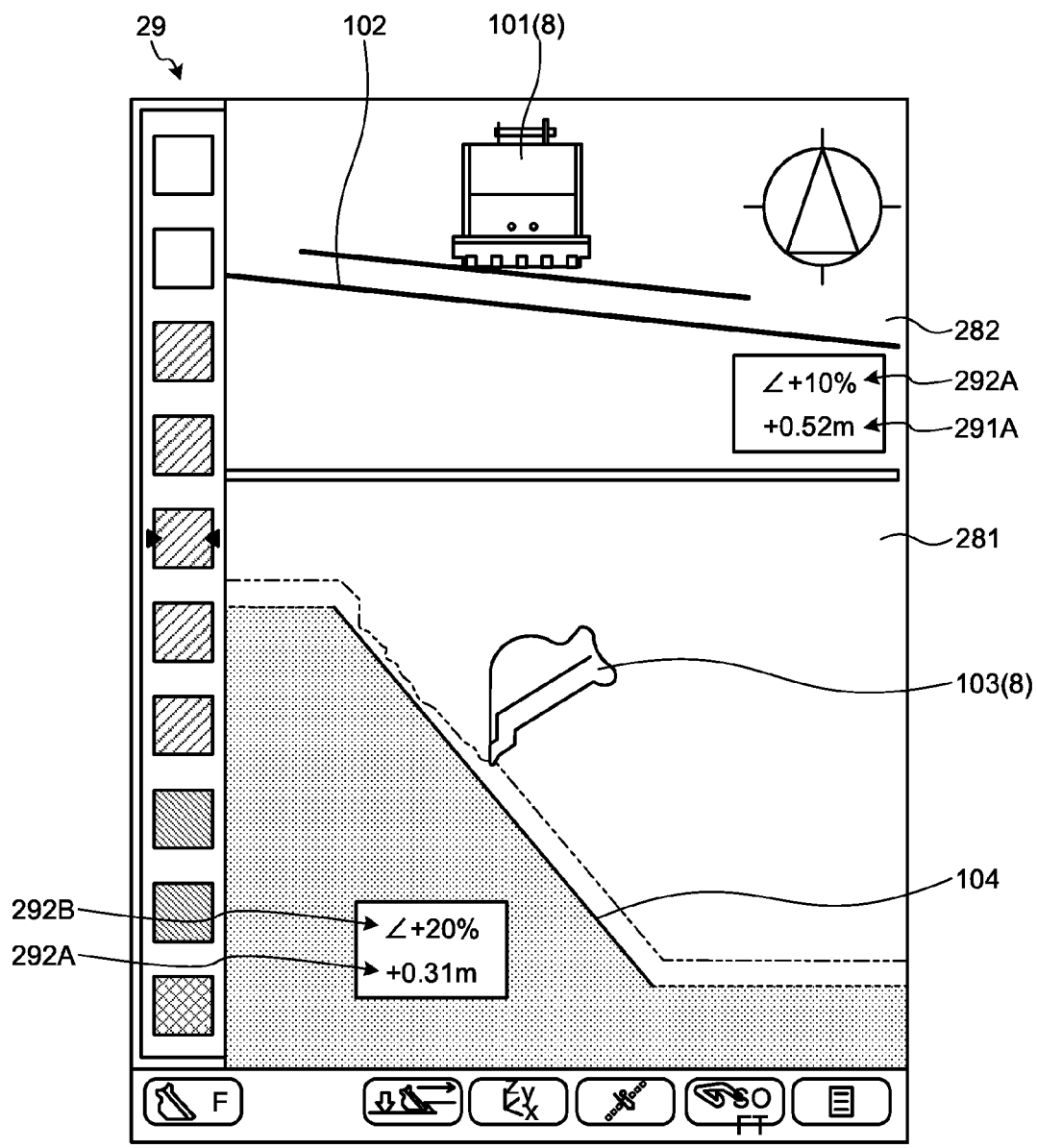
FIG. 38 is a diagram illustrating an example of a display unit.

FIG. 38 is a diagram illustrating an example of the display unit 29. In the present embodiment, the display unit 29 displays the 2-dimensional bucket data S including the 2-dimensional designed landform data U and the bucket position data. The display unit 29 displays at least one of distance data indicating the distance between the bucket 8 and the target excavation landform in the working plane MP and shape data indicating the outer shape of the bucket 8 in the working plane MP.

The screen of the display unit 29 includes a front view 282 illustrating the target excavation landform and the bucket 8 and a side view 281 illustrating the target excavation landform and the bucket 8. The front view 282 includes an icon 101 indicating the bucket 8 and a line 102 indicating the cross-section of the target construction information. Moreover, the front view 282 includes distance data 291A indicating the distance (the distance in the Z-axis direction) between the bucket 8 and the target excavation landform and angle data 292A indicating the angle between the cutting edge 8a and the target excavation landform.

The side view 281 includes an icon 103 indicating the bucket 8 and a line 104 indicating the surface of the target excavation landform in the working plane MP. The icon 103 indicates the outer shape of the bucket 8 in the working plane MP. Moreover, the side view 281 includes distance data 292A indicating the distance (the shortest distance between the bucket 8 and the target excavation landform) between the bucket 8 and the target excavation landform and angle data 292B indicating the angle between the bottom surface of the bucket 8 and the target excavation landform.

[Effects]

As described above, according to the present embodiment, a fixing command means capable of outputting a fixing command when accurate tilt angle data is output from the tilt angle sensor 70 even when the tilt angle sensor 70 provided in the tilt bucket 8 cannot output accurate tilt angle data due to the attitude or the like of the bucket 8 is provided. The tilt angle data is fixed according to the operation of the operator based on the fixing command, whereby an excavation operation can be performed accurately using the fixed data.

According to the present embodiment, the outer shape of the tilt bucket 8 and the target excavation landform along the working plane MP which serves as a control object of the limited excavation control can be specified. Thus, even when the distance between the bucket 8 and the target excavation landform changes due to tilting of the bucket 8, it is possible to perform limited excavation control with high accuracy so that the bucket 8 does not dig into the target excavation landform.

In the present embodiment, the 2-dimensional bucket data indicating the outer shape of the bucket 8 in the working plane MP is calculated based on the dimension data of the work machine 2, the shape data of the bucket 8, the work machine angle data, and the tilt angle data. Thus, even when the tilt angle of the bucket 8 changes, it is possible to detect the position of the cutting edge 8a of the bucket 8 in the working plane MP. Therefore, it is possible to detect the relative position between the cutting edge 8a and the target excavation landform accurately to execute intended construction while suppressing a decrease in the excavation accuracy.

In the present embodiment, the dimension data of the work machine 2, the target excavation landform data, and the work machine angle data are acquired, and the work machine control unit 26A determines the speed limit according to the distance between the bucket 8 and the target excavation landform based on the target excavation landform data U and the bucket position data and controls the work machine 2 so that the speed in the direction in which the work machine 2 approaches the target excavation landform is equal to or smaller than the speed limit. Due to this, the bucket 8 is suppressed from digging into the target excavation landform and a decrease in excavation accuracy is suppressed.

In the present embodiment, the fixing command is output to the data fixing unit 28D so that the work machine 2 is controlled based on the fixed data in at least a portion of the limited excavation control period. Thus, the tilt angle data is fixed based on the fixing command, and limited excavation control can be performed with high accuracy.

In the present embodiment, the fixing command is output to the data fixing unit 28D at the start of the limited excavation control and is disabled at the end of the limited excavation control. Thus, limited excavation control is performed with high accuracy. In a normal excavation operation, the excavation operation can be performed without fixing the tilt angle data.

In the present embodiment, in the limited excavation control, the driving of the bucket 8 is inhibited by the driving inhibiting unit 26B, and the position of the bucket 8 in a rotation direction about the tilt shaft J4 as well as the tilt angle data are fixed. Thus, it is possible to perform excavation while moving the bucket 8 along the target excavation landform.

In the present embodiment, since the driving inhibiting unit 26B disables the operation signal output from the operating device 25, it is possible to smoothly inhibit the driving of the bucket 8.

In the present embodiment, the work machine 2 is controlled by the work machine control unit 26A based on 2-dimensional bucket data. Due to this, the work machine control unit 26A can derive the distance d between the bucket 8 and the target excavation landform based on the 2-dimensional bucket data S and the target excavation landform along the working plane MP and perform limited excavation control of the work machine 2.

In the present embodiment, the relative position between the bucket 8 and the target excavation landform is calculated based on the 2-dimensional bucket data, the vehicle body position data P indicating the present position of the vehicle body 1, and the vehicle body attitude data Q indicating the attitude of the vehicle body 1. Due to this, it is possible to calculate the accurate relative position between the bucket 8 and the target excavation landform.

In the present embodiment, the target excavation landform data and the bucket position data are displayed on the display unit 26. Due to this, a control object is specified based on the working plane MP and the limited excavation control is performed with high accuracy.

In the present embodiment, the vehicle body position data P and the vehicle body attitude data Q of the excavator CM in the global coordinate system are acquired, and the relative position between the bucket 8 and the target excavation landform in the global coordinate system is acquired using the position (2-dimensional bucket data S) of the bucket 8 calculated in the local coordinate system, the vehicle body position data P, and the vehicle body attitude data Q. The target excavation landform data may be defined in the local coordinate system and the relative position between the bucket 8 and the target excavation landform in the local coordinate system may be acquired. The same is true for the following embodiments.

In the present embodiment, the limited excavation control (intervention control) is performed using the 2-dimensional bucket data S. The limited excavation control may not be performed. For example, the operator may operate the operating device 25 while monitoring the display unit 29 so that the bucket 8 moves along the target excavation landform in the working plane MP. The same is true for the following embodiments.

While the embodiments of the present invention have been described, the present invention is not limited to the embodiments and various changes can be made without departing from the spirit of the present invention.

In the above-described embodiments, although an excavator has been described as an example of the construction machine, the construction machine is not limited to the excavator, and the present invention may be applied to other types of construction machine.

The position of the excavator CM in the global coordinate system may be acquired by other position measurement means without being limited to GNSS. Thus, the distance d between the target excavation landform and the cutting edge 8a may be acquired by other position measurement means without being limited to GNSS.

The amount of boom operation, the amount of arm operation, and the amount of bucket operation may be acquired based on an electrical signal indicating the position of the operating lever (25R and 25L).

REFERENCE SIGNS LIST

1 VEHICLE BODY
2 WORK MACHINE

3 REVOLVING STRUCTURE
4 CAB
5 TRAVELING DEVICE
5Cr CRAWLER BELT
6 BOOM
7 ARM
8 BUCKET
9 ENGINE ROOM
10 BOOM CYLINDER
11 ARM CYLINDER
12 BUCKET CYLINDER
13 BOOM PIN
14 ARM PIN
15 BUCKET PIN
16 FIRST STROKE SENSOR
17 SECOND STROKE SENSOR
18 THIRD STROKE SENSOR
19 HANDRAIL
20 POSITION DETECTION DEVICE
21 ANTENNA
22 ANGLE DETECTION DEVICE
23 POSITION SENSOR
24 INCLINATION SENSOR
25 OPERATING DEVICE
25F OPERATION PEDAL
25L SECOND OPERATING LEVER
25R FIRST OPERATING LEVER
25P THIRD OPERATING LEVER
26 WORK MACHINE CONTROLLER
27 CONTROL VALVE
28 DISPLAY CONTROLLER
29 DISPLAY UNIT
30 TILT CYLINDER
32 SENSOR CONTROLLER
36 INPUT UNIT
40A CAP-SIDE OIL CHAMBER
40B ROD-SIDE OIL CHAMBER
41 MAIN HYDRAULIC PUMP
42 PILOT HYDRAULIC PUMP
43 MAIN VALVE
51 SHUTTLE VALVE
70 TILT ANGLE SENSOR
80 TILT PIN
81 BOTTOM PLATE
82 BACK PLATE
83 TOP PLATE
84 SIDE PLATE
85 SIDE PLATE
86 OPENING
87 BRACKET
88 BRACKET
90 CONNECTION MEMBER
91 PLATE MEMBER
92 BRACKET
93 BRACKET
94 FIRST LINK MEMBER
94P FIRST LINK PIN
95 SECOND LINK MEMBER
95P SECOND LINK PIN
96 BUCKET CYLINDER TOP PIN
97 BRACKET
161 ROTATION ROLLER
162 ROTATION CENTER SHAFT
163 ROTATION SENSOR PORTION
164 CASE
200 CONTROL SYSTEM
300 HYDRAULIC SYSTEM
AX REVOLUTION AXIS
CM CONSTRUCTION MACHINE (EXCAVATOR)
J1 BOOM SHAFT
J2 ARM SHAFT
J3 BUCKET SHAFT
J4 TILT SHAFT
L1 BOOM LENGTH
L2 ARM LENGTH
L3 BUCKET LENGTH
L4 TILT LENGTH
L5 WIDTH DIMENSION OF BUCKET
P VEHICLE BODY POSITION DATA
Q VEHICLE BODY ATTITUDE DATA (REVOLVING STRUCTURE DIRECTION DATA)
S 2-DIMENSIONAL BUCKET DATA
T TARGET CONSTRUCTION INFORMATION
U TARGET EXCAVATION LANDFORM DATA
α BOOM ANGLE
β ARM ANGLE
γ BUCKET ANGLE
δ TILT ANGLE
ε TILT SHAFT ANGLE

The invention claimed is:

1. A construction machine control system for a construction machine that includes a work machine comprising:
a boom capable of rotating in relation to a vehicle body about a boom shaft;
an arm capable of rotating in relation to the boom about an arm shaft parallel to the boom shaft; and
a bucket capable of rotating in relation to the arm about each of a bucket shaft parallel to the arm shaft and a tilt shaft orthogonal to the bucket shaft, the system comprising:
a tilt angle sensor that is provided in the bucket so as to detect tilt angle data including a rotation angle of the bucket about at least the tilt shaft, the tilt angle sensor being capable of detecting an inclination angle with respect to a horizontal plane;
a data acquisition unit to which the tilt angle data is output from the tilt angle sensor;
a data fixing unit that fixes the tilt angle data output to the data acquisition unit based on a fixing command to generate fixed data; and
a work machine control unit that controls the work machine based on the fixed data until the fixing command is disabled.

2. The construction machine control system according to claim 1, further comprising:
a first acquisition unit that acquires dimension data including dimensions of the boom, the arm, and the bucket;
a second acquisition unit that acquires target excavation landform data indicating a target excavation landform which is a target shape of an excavation object;
a third acquisition unit that acquires work machine angle data including boom angle data indicating a rotation angle of the boom about the boom shaft, arm angle data indicating a rotation angle of the arm about the arm shaft, and bucket angle data indicating a rotation angle of the bucket about the bucket shaft; and
a calculation unit that calculates bucket position data indicating a present position of the bucket based on the work machine angle data, the dimension data, and the fixed data, wherein
the work machine control unit determines a speed limit according to a distance between the bucket and the target excavation landform based on the target excavation landform data and the bucket position data and executes limited excavation control so that a speed in a direction in which the work machine approaches the target excavation landform is equal to or smaller than the speed limit, and the fixing command is output to the data fixing unit so that the work machine is controlled based on the fixed data in at least a portion of a period in which the limited excavation control is executed.

3. The construction machine control system according to claim 2, wherein
the fixing command is output to the data fixing unit when the limited excavation control starts and is disabled when the limited excavation control ends.

4. The construction machine control system according to claim 2, further comprising:
a driving inhibiting unit that inhibits driving of the bucket in the limited excavation control.

5. The construction machine control system according to claim 4, further comprising:
an operating device that outputs an operation signal for operating a hydraulic cylinder capable of driving the bucket, wherein
the driving inhibiting unit disables the operation signal output from the operating device.

6. The construction machine control system according to any one of claim 2, further comprising:
a fourth acquisition unit that acquires shape data of the bucket, wherein
the target excavation landform data is 2-dimensional target shape of the excavation object in a working plane orthogonal to the bucket shaft,
the calculation unit calculates 2-dimensional bucket data which indicates an outer shape of the bucket in the working plane and includes the bucket position data based on the work machine angle data, the dimension data, the shape data, and the fixed data, and
the work machine control unit controls the work machine based on the 2-dimensional bucket data.

7. The construction machine control system according to claim 6, wherein
the calculation unit calculates a relative position between the bucket and the target excavation landform based on the 2-dimensional bucket data, vehicle body position data indicating a present position of the vehicle body, and vehicle body attitude data indicating an attitude of the vehicle body.

8. A construction machine comprising:
a lower traveling structure;
an upper revolving structure that is supported by the lower traveling structure;
a work machine that includes a boom, an arm and a bucket and is supported by the upper revolving structure; and
the control system according to claim 1.

9. A method of controlling a construction machine that includes a work machine comprising:
a boom capable of rotating in relation to a vehicle body about a boom shaft;
an arm capable of rotating in relation to the boom about an arm shaft parallel to the boom shaft; and
a bucket capable of rotating in relation to the arm about a bucket shaft parallel to the arm shaft and a tilt shaft orthogonal to the bucket shaft, the method comprising:
detecting tilt angle data indicating a rotation angle of the bucket about the tilt shaft using a tilt angle sensor that is provided in the bucket and that can detect an inclination angle with respect to a horizontal plane;
acquiring the tilt angle data output from the tilt angle sensor;
fixing the tilt angle data based on a fixing command to generate fixed data; and
controlling the work machine based on the fixed data until the fixing command is disabled.

* * * * *